(12) United States Patent
Hiramoto et al.

(10) Patent No.: US 9,143,436 B2
(45) Date of Patent: Sep. 22, 2015

(54) INFORMATION PROCESSING APPARATUS, PARALLEL COMPUTER SYSTEM, AND CONTROL METHOD OF PARALLEL COMPUTER SYSTEM

(75) Inventors: Shinya Hiramoto, Kawasaki (JP);
Yuichiro Ajima, Kawasaki (JP);
Tomohiro Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 13/359,635

(22) Filed: Jan. 27, 2012

(65) Prior Publication Data
US 2012/0250514 A1  Oct. 4, 2012

(30) Foreign Application Priority Data

Mar. 31, 2011 (JP) ................. 2011-080916

(51) Int. Cl.
| | |
|---|---|
| *H04L 12/801* | (2013.01) |
| *H04L 12/729* | (2013.01) |
| *H04L 12/727* | (2013.01) |
| *H04L 12/721* | (2013.01) |
| *H04L 12/26* | (2006.01) |

(52) U.S. Cl.
CPC ............ *H04L 45/125* (2013.01); *H04L 45/121* (2013.01); *H04L 45/127* (2013.01); *H04L 45/70* (2013.01); *H04L 47/115* (2013.01); *H04L 43/0882* (2013.01)

(58) Field of Classification Search
None
See application file for complete search history.

(56) References Cited

U.S. PATENT DOCUMENTS 7,680,048 B2  3/2010  Archer et al.
7,706,275 B2  4/2010  Archer et al.
8,031,614 B2  10/2011 Archer et al.
8,499,072 B2 *  7/2013  Plummer et al. .............. 709/224
(Continued)

FOREIGN PATENT DOCUMENTS

| GB | 2417391 A | 2/2006 |
|---|---|---|
| JP | 5-30139 A | 2/1993 |

(Continued)

OTHER PUBLICATIONS

Extended European Search Report dated Jul. 18, 2012 for corresponding European Application No. 12152259.3.

(Continued)

*Primary Examiner* — Rhonda Murphy
(74) *Attorney, Agent, or Firm* — Fujitsu Patent Center

(57) ABSTRACT

An information processing apparatus connected to another information apparatus in a parallel computer system via a plurality of routes, includes: an arithmetic processing device to issue an instruction for collection of congestion information and for communication; a route information holding unit to hold route information for performing communication; a transmission unit to transmit a congestion information collection packet to any of the plurality of routes; a reception unit to receive a congestion information collection response packet corresponding to the congestion information collection packet from any of the plurality of routes; and a control unit to cause the transmission unit to transmit a congestion information collection packet, to select route information from the route information holding unit based on congestion information included in the congestion information collection response packet, and to cause the transmission unit to perform communication instructed by the arithmetic processing device based on the selected route information.

10 Claims, 35 Drawing Sheets

(56) References Cited

U.S. PATENT DOCUMENTS

| | | | |
|---|---|---|---|
| 2007/0230369 A1* | 10/2007 | McAlpine | 370/256 |
| 2008/0084889 A1 | 4/2008 | Archer et al. | |
| 2008/0144504 A1* | 6/2008 | Marcondes et al. | 370/235 |
| 2011/0261696 A1 | 10/2011 | Crisan et al. | |
| 2011/0261697 A1 | 10/2011 | Crisan et al. | |

FOREIGN PATENT DOCUMENTS

| | | |
|---|---|---|
| JP | 8-503799 A | 4/1996 |
| JP | 11-331216 A | 11/1999 |
| JP | 2005-269460 A | 9/2005 |
| JP | 2005-277923 A | 10/2005 |
| JP | 2006-146391 A | 6/2006 |
| JP | 2006-203313 A | 8/2006 |
| JP | 3980488 B | 9/2007 |
| WO | WO-94/12939 | 6/1994 |
| WO | WO-02/084509 | 10/2002 |

OTHER PUBLICATIONS

Chinese Office Action issued Jun. 4, 2014 for corresponding Chinese Application No. 201210046987.1, with English Translation, 22 pages.

Franco, D. et al., "A new method to make communication latency uniform: Distributed routing balancing", ACM International Conference on Supercomputing (ICS), Greece, 1999; pp. 210-219.

Japanese Office Action mailed Nov. 18, 2014 for corresponding Japanese Patent Application No. 2011-080916, with Partial English Translation, 14 pages.

Chinese Office Action issued Dec. 16, 2014 for corresponding Chinese Patent Application No. 201210046987.1, with English Translation, 25 pages.

Chinese Office Action mailed Jun. 25, 2015 for corresponding Chinese Patent Application No. 201210046987.1, with English Translation, 22 pages.

* cited by examiner

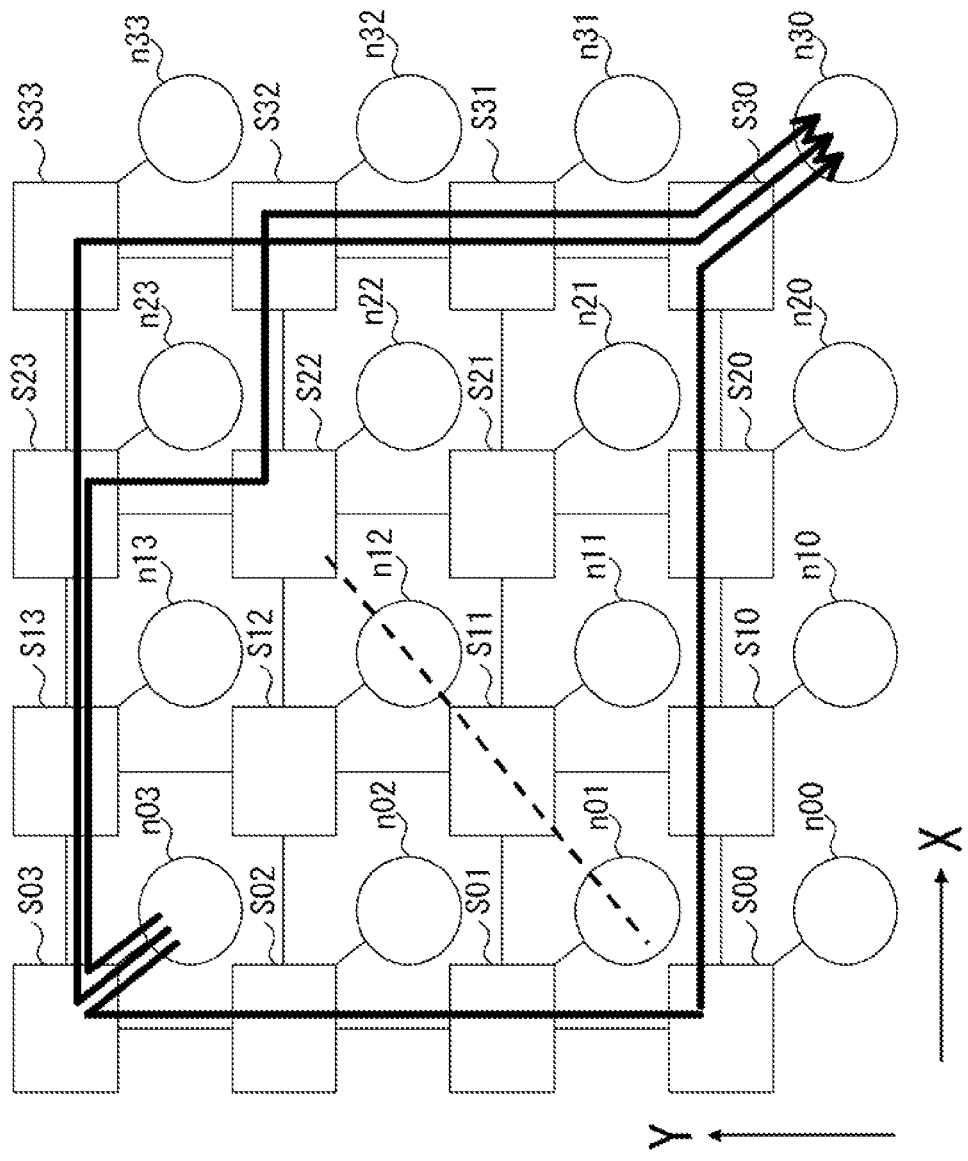
F I G. 2

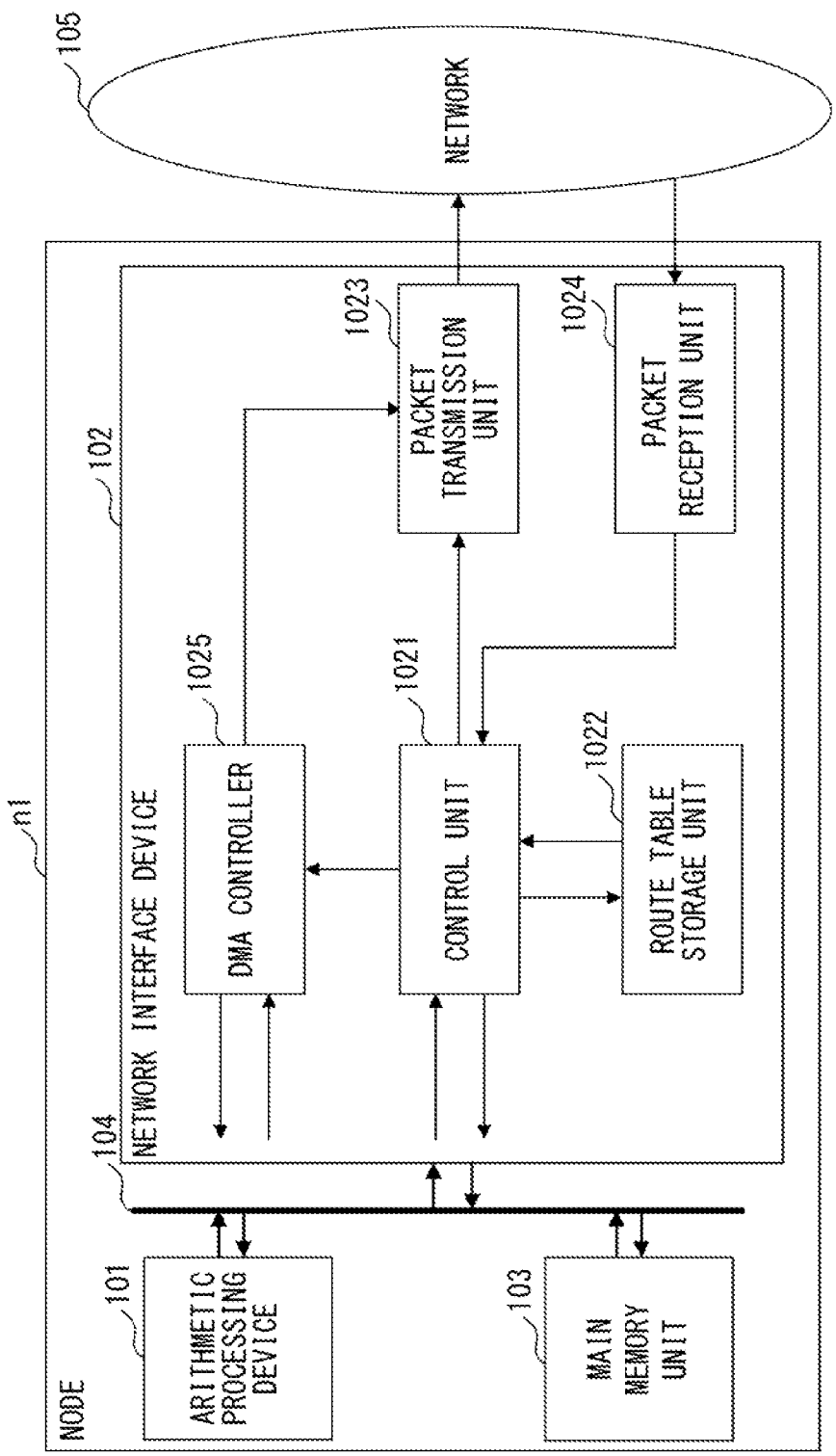
F I G. 5

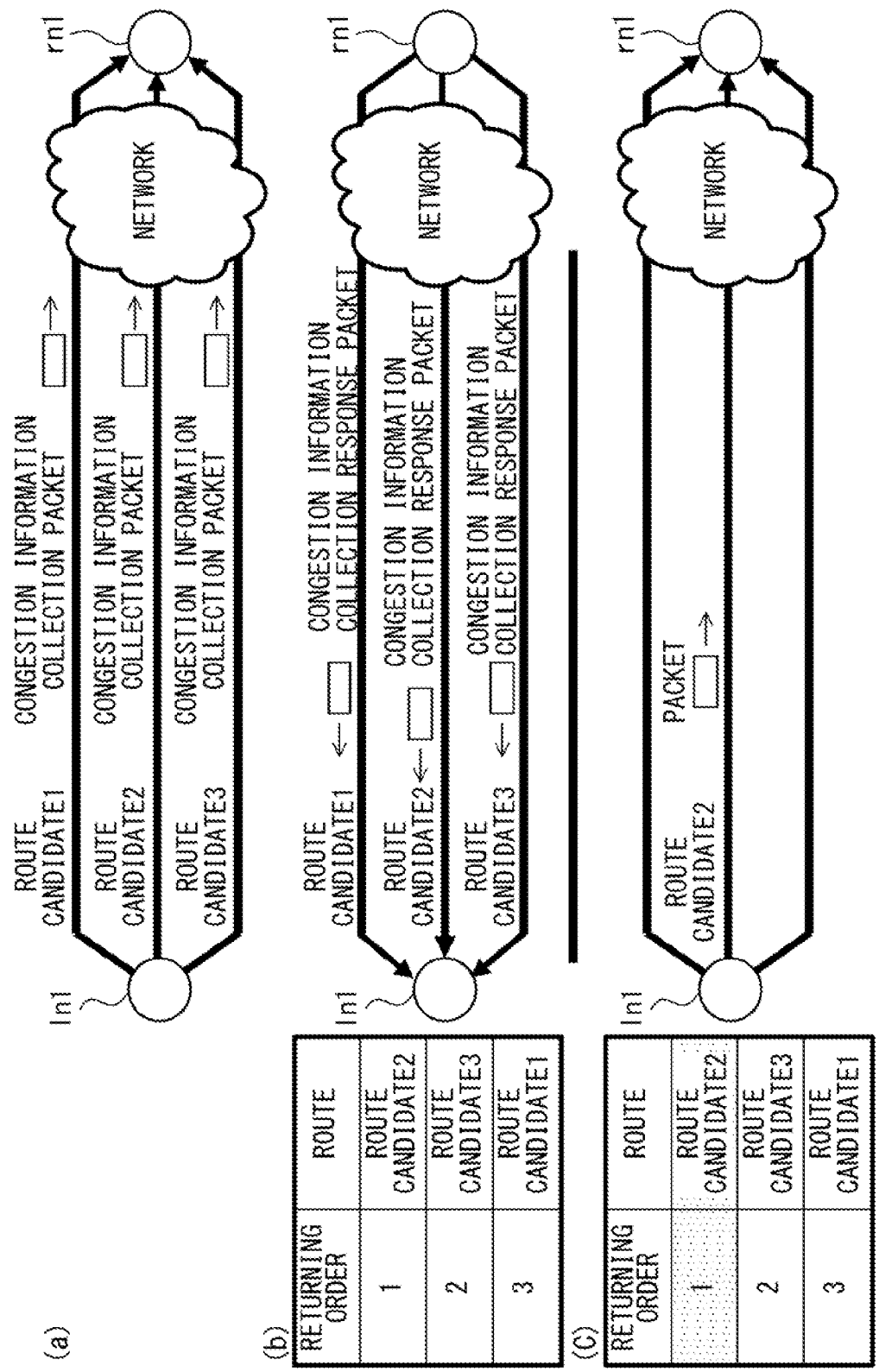
F I G. 7

| RETURNING ORDER | ROUTE CANDIDATE |
|---|---|
| 1 | ROUTE1 |
| 2 | ROUTE2 |
| 3 | ROUTE3 |
| ...... | ...... |
| n | ROUTEn |

FIG. 10

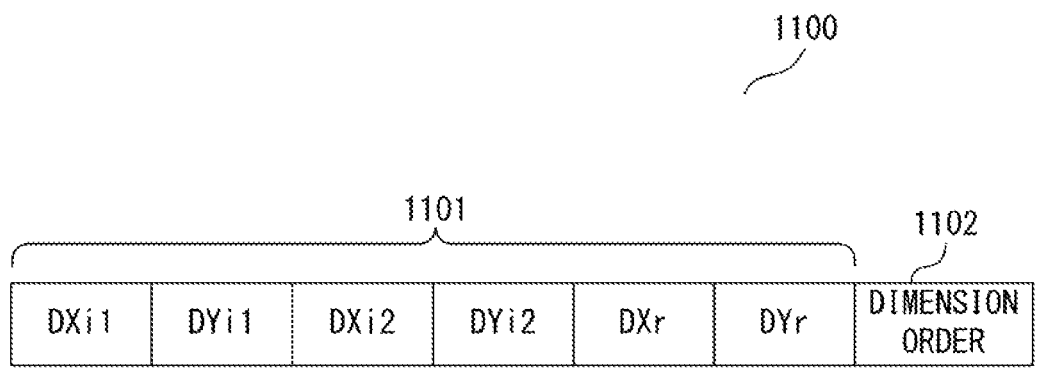
F I G. 11

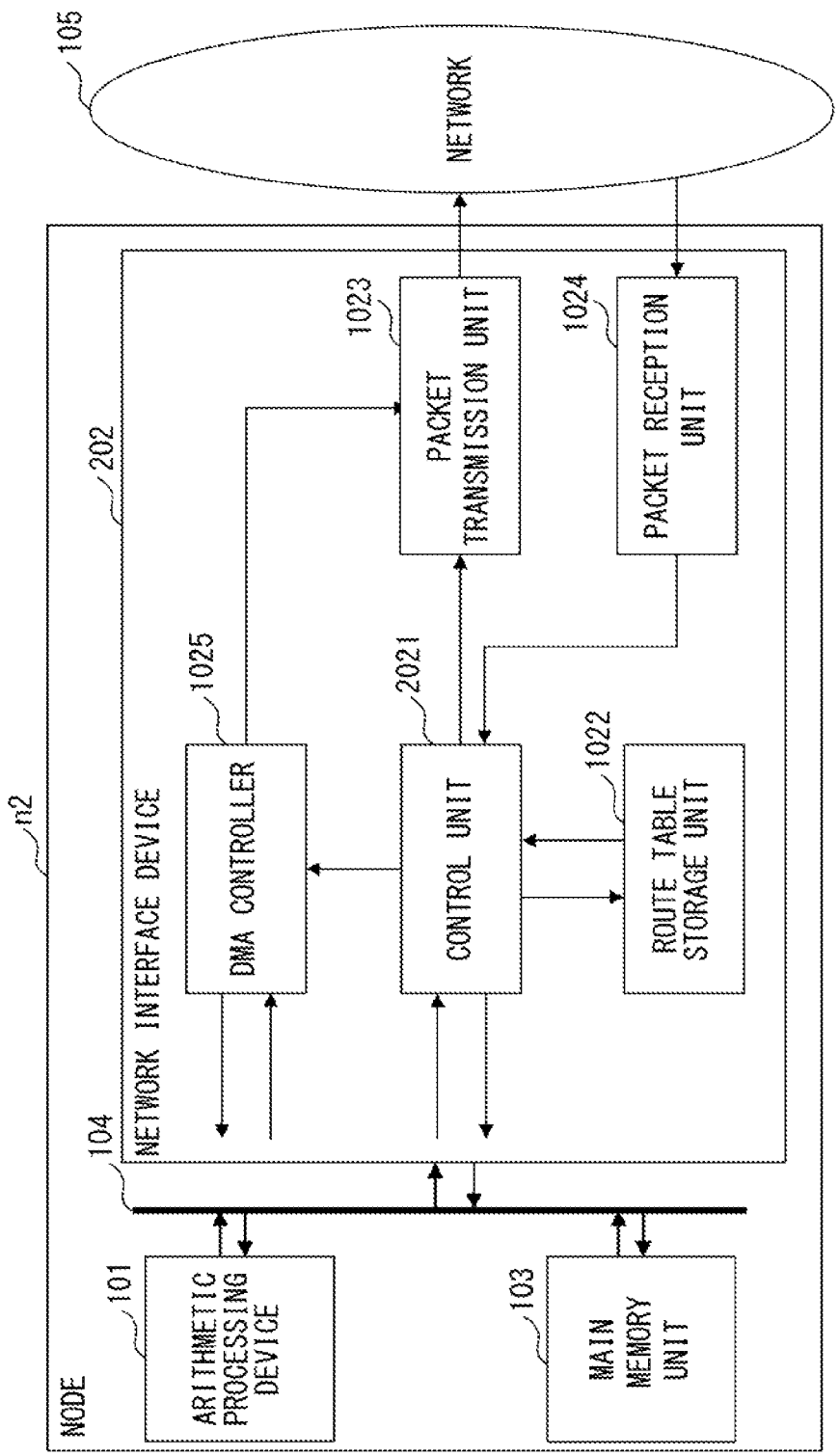
F I G. 15

| REMOTE NODE GROUP | RETURNING ORDER | ROUTE CANDIDATE | USING NODE |
|---|---|---|---|
| GROUP1 | 1 | ROUTE1 | NODE1, NODE2 |
| | 2 | ROUTE2 | |
| | 3 | ROUTE3 | |
| | ...... | ...... | |
| | n | ROUTEn | |

FIG. 17

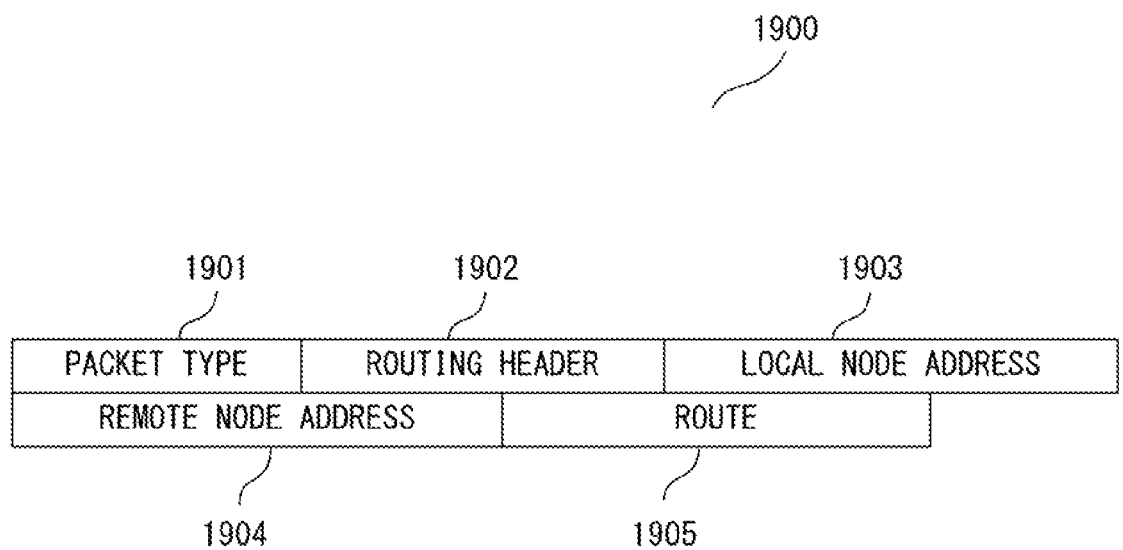
F I G. 19

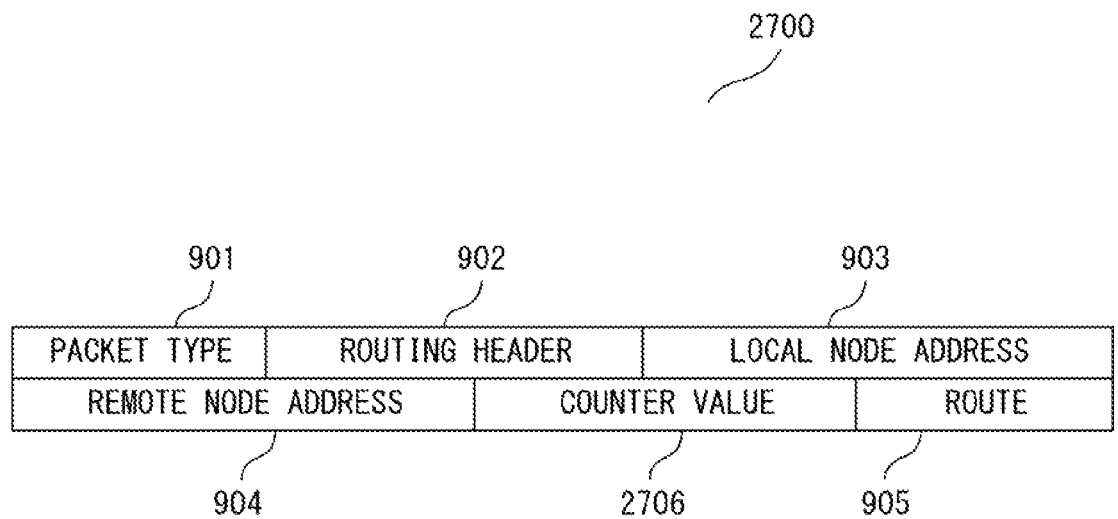
F I G. 2 7

| RESPONSE TIME ORDER | RESPONSE TIME | ROUTE CANDIDATE |
|---|---|---|
| 1 | N1 | ROUTE1 |
| 2 | N2 | ROUTE2 |
| 3 | N3 | ROUTE3 |
| ...... | ...... | ...... |
| n | Nn | ROUTEn |

FIG. 28

| DIRECTION | BUFFER USAGE AMOUNT ORDER | BUFFER USAGE AMOUNT | ROUTE CANDIDATE |
|---|---|---|---|
| OUTBOUND | 1 | N1 | OUTBOUND ROUTE1 |
| OUTBOUND | 2 | N2 | OUTBOUND ROUTE2 |
| ...... | ...... | ...... | ...... |
| OUTBOUND | n | Nn | OUTBOUND ROUTEn |
| INBOUND | 1 | N1 | INBOUND ROUTE1 |
| INBOUND | 2 | N2 | INBOUND ROUTE2 |
| ...... | ...... | ...... | ...... |
| INBOUND | n | Nn | INBOUND ROUTEn |

FIG. 31

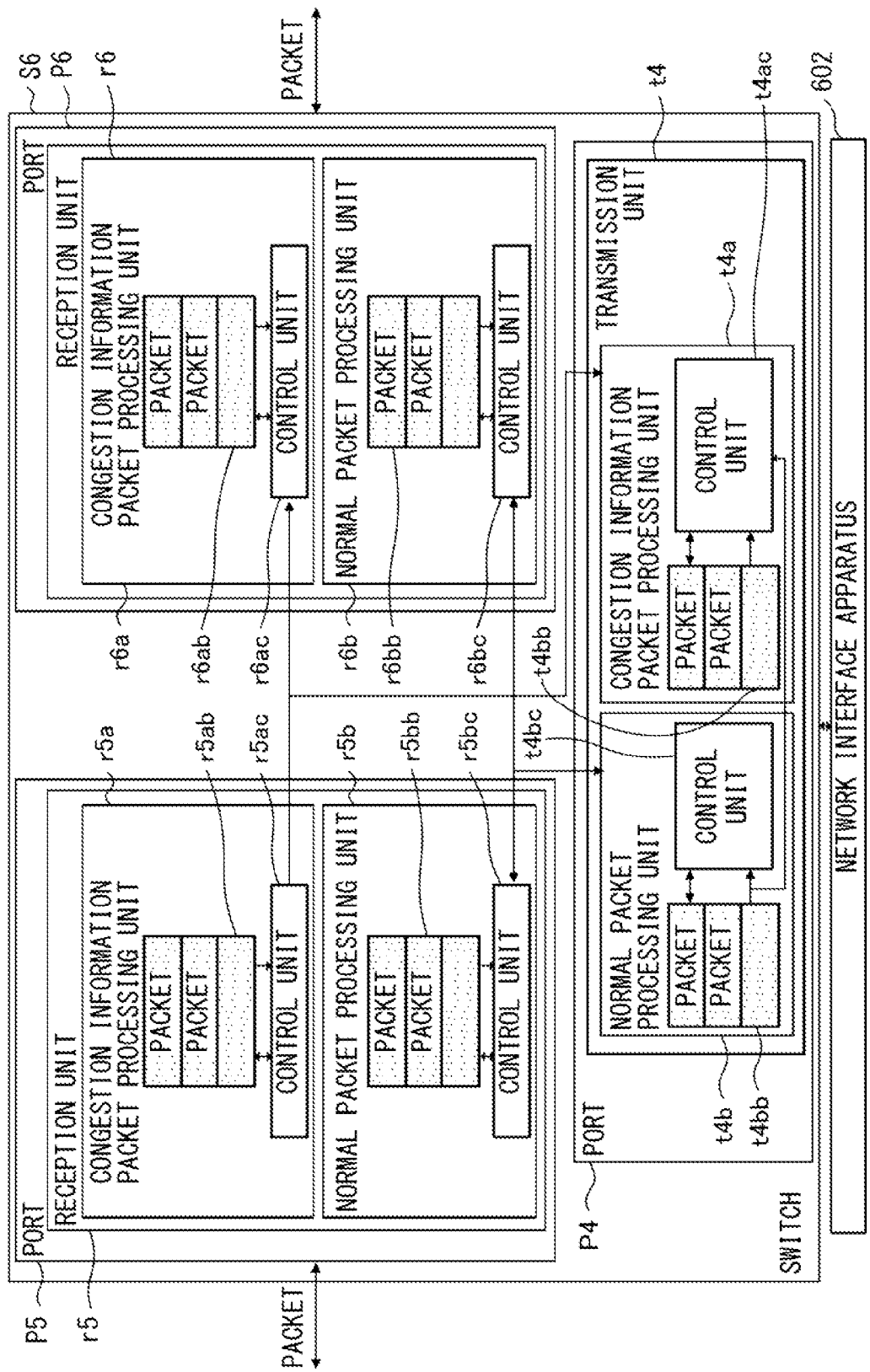
F I G. 32

INFORMATION PROCESSING APPARATUS, PARALLEL COMPUTER SYSTEM, AND CONTROL METHOD OF PARALLEL COMPUTER SYSTEM

CROSS-REFERENCE TO RELATED APPLICATION

This application is based upon and claims the benefit of priority of the prior Japanese Application No. 2011-080916, field on Mar. 31, 2011, the entire contents of which are incorporated herein by reference.

FIELD

The present invention relates to an information processing apparatus, a parallel computer system and a control method of a parallel computer system.

BACKGROUND

A parallel computer includes a plurality of nodes that are information processing apparatuses to perform computing, and a plurality of switches that constructs a network between the nodes. In the description below, a node of a parallel computer refers to an information processing apparatus to perform computing, unless otherwise stated.

FIG. 1 illustrates a configuration diagram of a parallel computer including nodes and switches.

In FIG. 1, as an example of a network topology of a parallel computer, a 4×4 two-dimensional mesh topology in which nodes are arranged two dimensionally, the horizontal direction is assumed as X axis, the vertical direction is assumed as Y axis, and the bottom left of FIG. 1 is assumed as the origin. As illustrated in FIG. 1, each node n00-n33 is connected to a corresponding switch s00-s33. In addition, each switch s00-s33 is connected to switches that are adjacent in the X axis direction and the Y axis direction, among the switches s00-s33. The network between nodes in the parallel computer is constituted as described above.

There are a plurality of communication routes between two nodes in some network topologies of the parallel network.

FIG. 2 is a diagram illustrating a 4×4 two-dimensional mesh topology of a parallel computer. For example, in the 4×4 two-dimensional mesh topology of a parallel computer illustrated in FIG. 2, in a case in which a node n03 for which (x, y)=(0, 3) performs communication to a node n30 for which (x, y)=(3, 0), there are 20 patterns of routes even when those with 6 hops, the minimum number of hops, are counted.

Methods for selecting a route from a plurality of routes include source routing and dimension order routing.

Source routing is a method in which a node that transmits a packet determines a route that the packet goes through, and specifies the route for the packet. The source routing includes strict source routing and loose source routing. In the strict source routing, a node that transmits a packet specifies all the routes that the packet goes through. In the loose source routing, because when all the routes are specified as in the strict source routing, the packet header becomes large, a node that transmits a packet specifies a part of routes that the packet goes through, and a route determines the rest of routes according to dimension order routing and the like.

The dimension order routing is a method in which the address of each dimension (each coordinate axis) is adjusted to the communication partner node in a predetermined order. For example, in the two dimensional topology illustrated in FIG. 2, there are two patterns of dimension order routing. That is, there are a method in which the address of the X axis is adjusted first, and the address of the Y axis is adjusted next (dimension order routing in X axis, Y axis order), and a method in which the address of the Y axis is adjusted first and the address of the X axis is adjusted next (dimension order routing in Y axis, X axis order).

It is important in the performance aspect of the parallel computer which route is used among a plurality of routes for communication.

FIG. 3 is a diagram illustrating an example of routing in a case in which congestion occurs in a plurality of communication routes. FIG. 4 is a diagram illustrating an example of routing in a case in which congestion is not occurring in a plurality of communication routes. FIG. 3 and FIG. 4 respectively illustrate an example in which the node n03 performs communication c1 to the node n30, the node n13 performs communication c2 to the node n31, and the node n23 performs communication c3 to the node 32. In the dimension order routing in X axis, Y axis order illustrated in FIG. 3, the communications c1-c3 between the respective nodes concentrate on particular link, causing congestion in the particular link. On the other hand, in the dimension order routing in Y axis, X axis, order illustrated in FIG. 4, since the communications c1-c3 between the respective nodes do not concentrate on any particular link, no congestion is occurring in the routes.

Therefore, there is a need for a routing method for preventing communication between respective nodes from concentrating on particular link and causing congestion in the particular route. Specifically, there is a need for a routing method in which an optimal route is selected according to the communication status of the routes. The routing method in which the route is switched dynamically according to the communication status of the routes is called adaptive routing, and several methods have been proposed as conventional art.

As conventional art of the routing method in which an optimal route is selected according to the communication status of the routes, there is a method in which the transmission latency of a message in the communication between nodes is measured, and the route between the nodes is changed based on the transmission latency. The specific steps of the routing are as follows.

(1) In a local node, a set of routes to a remote node is created. Here, the local node refers to the node on the side that is requesting the communication in the communication between the nodes. Meanwhile, the remote node refers to the node on the side that is receiving the communication request from the local node in the inter-node communication.

(2) The local node transmits a message to a remote node via each route included in the created set of routes, and measures the latency until the message reaches the remote node. The measurement of the latency is performed by adding the latency in a field of the message in the switches that the message goes through, and sending back the latency to the local node when it reaches the remote node.

(3) Based on the measured latency, the latency for all the routes included in the set of routes is calculated, and the route with a latency that is equal to or smaller than a threshold value is added to the set of routes. The route with a latency that exceeds the threshold value is eliminated from the set of routes.

(4) The local node selects the route for the transmission message from the set of routes. As the way of selection, one with smaller latency is selected with priority.

(5) Thereafter, returning to (2) above, the latency measurement, creation of the set of routes, and the route selection are repeated.

PRIOR ART DOCUMENTS

Patent Document

[Patent Document 1] Japanese Patent No. 3980488
[Patent Document 2] Japanese National Publication of International Patent Application No. H8-503799

Non-Patent Document

[Non-patent Document 1] D. Franco, I. Garces, and E. Luque, "A new method to make communication latency uniform: Distributed routing balancing," in ACM International Conference on Supercomputing (ICS), Greece, 1999.

SUMMARY

According to an aspect of the embodiment, an information processing apparatus connected to another information apparatus included in a parallel computer system via a plurality of routes, includes: an arithmetic processing device to issue an instruction for collection of congestion information and an instruction for communication; a route information holding unit to hold route information for performing communication; a transmission unit to transmit a congestion information collection packet for collecting congestion information to any of the plurality of routes; a reception unit to receive a congestion information collection response packet corresponding to the congestion information collection packet from any of the plurality of routes; and a control unit to cause the transmission unit to transmit a generated congestion information collection packet when the arithmetic processing device issues an instruction for collecting congestion information, to select route information from the route information holding unit based on congestion information included in the congestion information collection response packet received by the reception unit, and to cause the transmission unit to perform communication instructed by the arithmetic processing device based on the selected route information.

According to an aspect of the embodiment, a parallel computer system in which a plurality of information processing apparatuses are connected is provided. The information processing apparatus includes: an arithmetic processing device to issue an instruction for collection of congestion information and an instruction for communication in the parallel computer system; a route information holding unit to hold route information to perform communication with another information processing apparatus; a transmission unit to transmit a congestion information collection packet for collecting congestion information to another information processing apparatus; a reception unit to receive a congestion information collection packet from another information processing apparatus and a congestion information collection response packet, from another information processing apparatus, corresponding to a congestion information collection packet sent from the transmission unit; and a control unit to cause the transmission unit to transmit a congestion information collection packet when the arithmetic processing device issue an instruction for collecting congestion information, to select route information from the route information holding unit based on congestion information included in a congestion information collection response packet received by the reception unit, and to cause the transmission unit to perform communication instructed by the arithmetic processing device based on the selected route information and generate a corresponding congestion information collection response packet when receiving a congestion information collection packet from another information processing apparatus, and to cause the transmission unit to transmit the generated congestion information collection response packet to another information processing apparatus.

According to an aspect of the embodiment, a control method of a parallel computer system in which a plurality of information processing apparatuses including a first information processing apparatus and a second information processing apparatus are connected via a plurality of routes, includes: issuing an instruction for collecting congestion information by an arithmetic processing device which the first information processing apparatus has; generating a congestion information collection packet for collecting congestion information by a first control unit which the first information processing apparatus has when the arithmetic processing device issues an instruction for collecting congestion information; transmitting the congestion information collection packet generated by the first control unit to any of the plurality of routes by a first transmission unit which the first information processing apparatus has; receiving the congestion information collection packet via any of the plurality of routes by a second reception unit which the second information processing apparatus has; generating a congestion information collection response packet corresponding to the congestion information collection packet by a second control unit which the second information processing apparatus has; transmitting the congestion information collection response packet generated by the second control unit to any of the plurality of routes by a second transmission unit which the second information processing apparatus has; receiving the congestion information collection response packet corresponding to the congestion information collection packet from any of the plurality of routes by a first reception unit which the first information processing apparatus has; overwriting by the first control unit route information held by a route information holding unit which the first information processing apparatus has, based on congestion information included in the congestion information collection response packet received by the reception unit; and causing the first transmission unit to perform communication instructed by the arithmetic processing device based on the overwritten route information by the first control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a 4×4 two-dimensional mesh topology of a parallel computer;

FIG. 5 is a configuration diagram of a node of a parallel computer according to the first embodiment;

FIG. 7 is a schematic illustration diagram of routing in a parallel computer according to the first embodiment;

FIG. 10 is an example of a route table according to the first embodiment;

FIG. 11 is a configuration diagram of the routing header of a congestion information collection packet and a congestion information collection response packet according to the first embodiment;

FIG. 15 is a configuration diagram of a node according to the second embodiment;

FIG. 17 is an example of a route table according to the second embodiment;

FIG. 19 is a diagram illustrating fields of a route packet according to the second embodiment;

FIG. 27 is a diagram illustrating fields of a congestion information collection packet and a congestion information collection response packet according to the fifth embodiment;

FIG. 28 is an example of a route table according to the fifth embodiment;

FIG. 31 is an example of a route table according to the sixth embodiment;

FIG. 32 is a configuration diagram of a switch according to the sixth embodiment;

DESCRIPTION OF EMBODIMENTS

Figure 1:
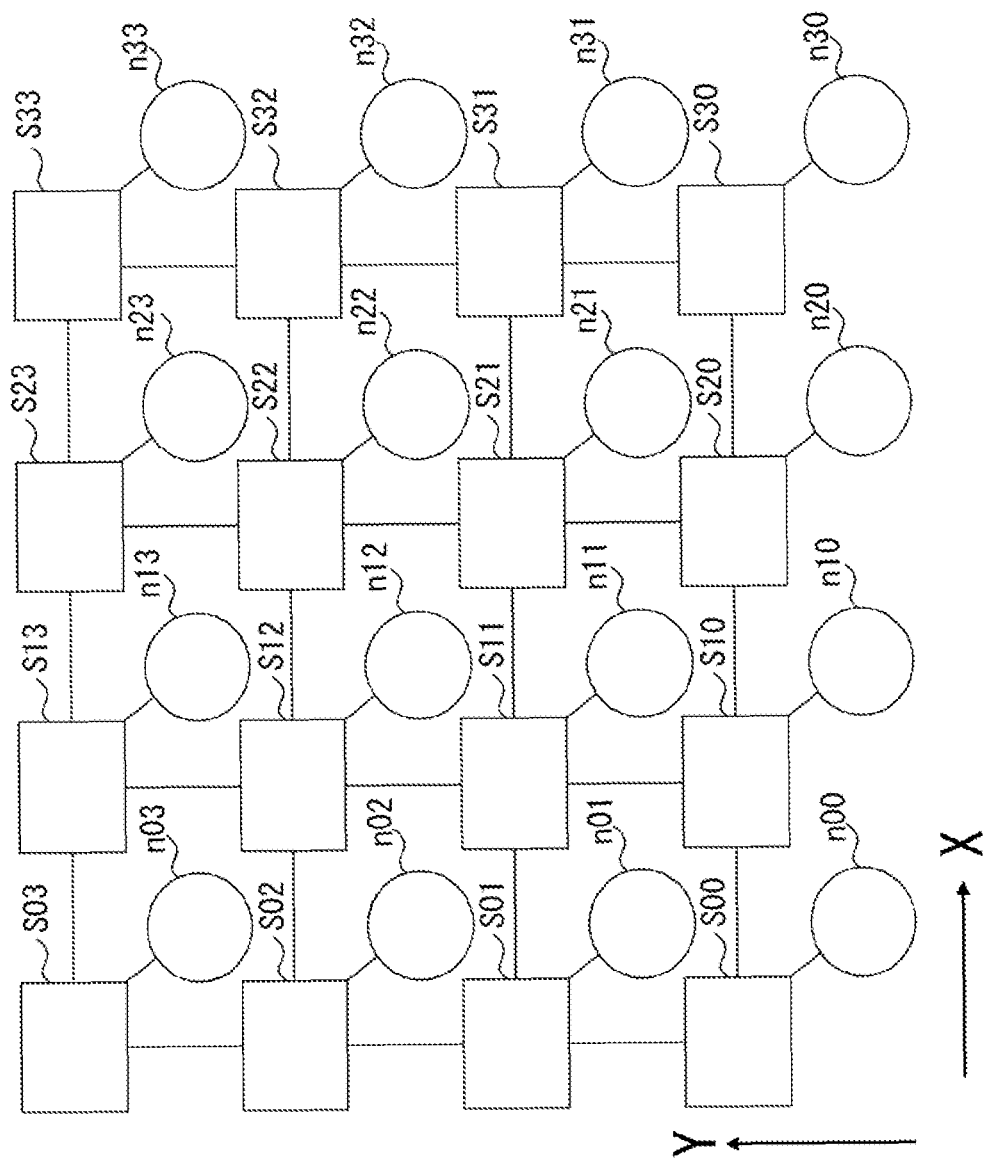
FIG. 1 is a configuration diagram of a parallel computer including nodes and switches.
Figure 3:
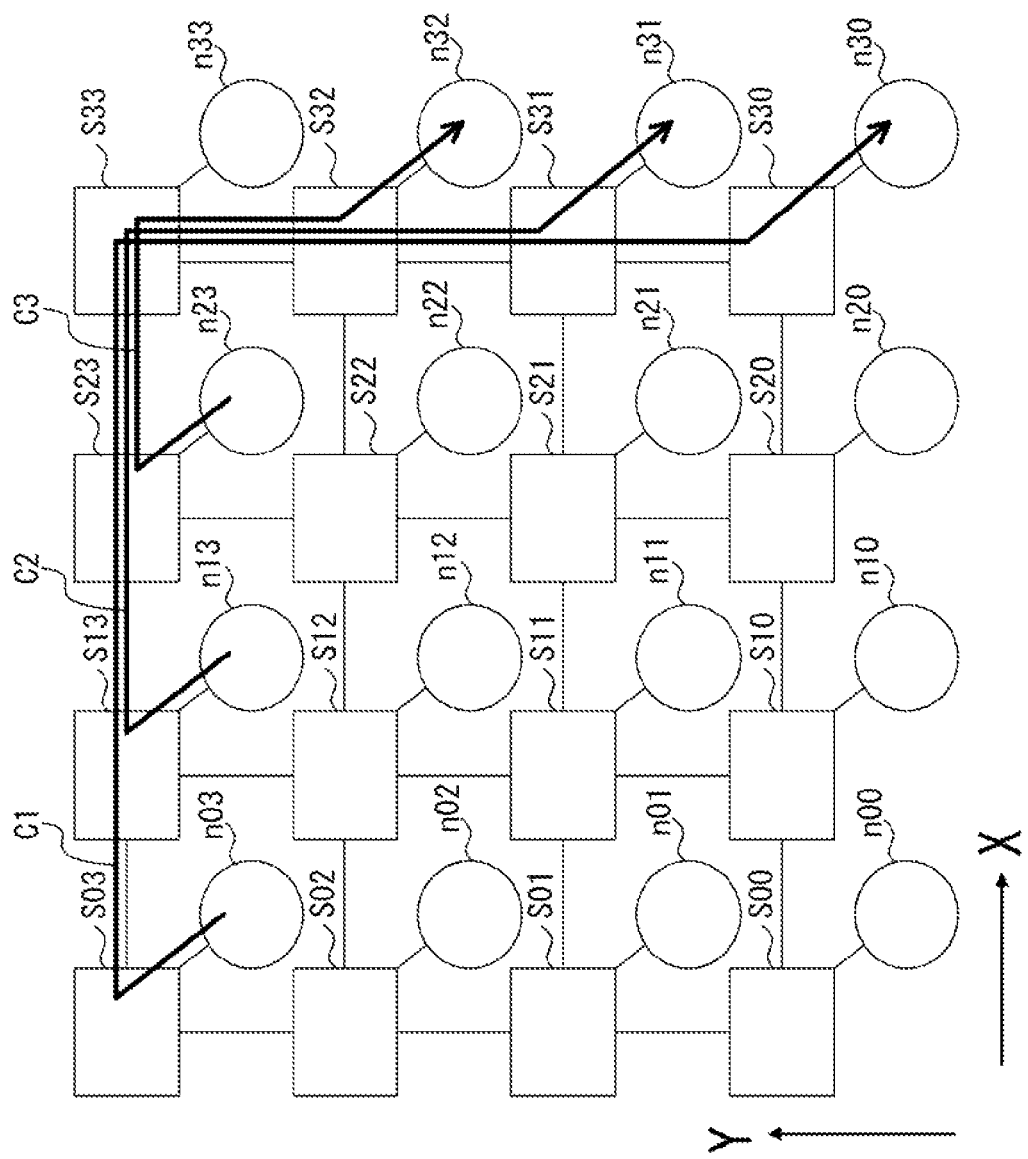
FIG. 3 is a diagram illustrating an example of routing in which congestion occurs in a plurality of communication routes.
Figure 4:
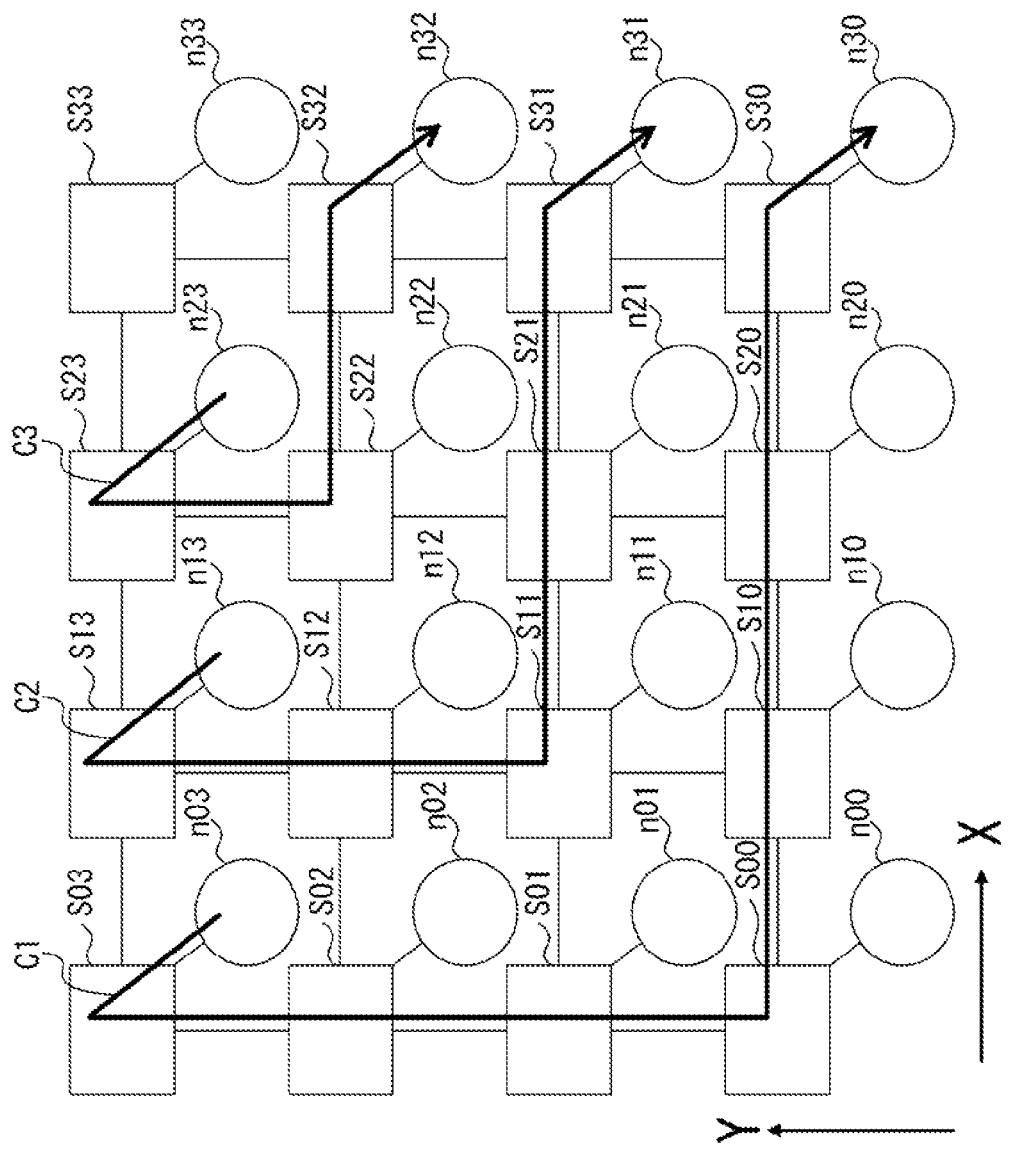
FIG. 4 is a diagram illustrating an example of routing in which congestion is not occurring in a plurality of communication routes.

The routing method in the conventional art described above as an example has four problems described below.

Firstly, the route selection method in the routing method in the conventional art is performed per message. For this reason, especially when an arithmetic processing device that a node has performs the route selection, it becomes an issue as the latency required for the route selection affects the performance. In addition, the usage efficiency of the arithmetic processing device deteriorates.

Secondly, with the routing method in the conventional art, the latency in the direction from the local node to the remote node is measured. However, in a case where a remote node sends a message, such as Get communication, that is, communication in which the local node specifies the main memory area of itself and the remote node and writes data in the main memory area of the remote node into the main memory area of the local node, the latency in the direction from the remote node to the local node is important. For this reason, when the remote node sends a message, effective route selection can not be performed with the routing method Thirdly, with the routing method in the conventional art, the route can not be changed while a message is transmitted. For this reason, occurrence of congestion in the path while a massage is transmitted can not be handled.

Fourthly, with the routing method in the conventional art, when a plurality of nodes respectively transmits a message, there is a possibility that some of them may use a common route to perform communication. For this reason, with the routing method in the conventional art, when a plurality of nodes perform communication, there is a possibility of occurrence of congestion in a route.

Therefore, there is need to provide an information processing apparatus, a parallel computer system and a control method of a parallel computer system, in which the route selection to the information processing apparatus that has received a communication request is performed separately from transmission in communication.

Hereinafter, embodiments are described in detail with reference to drawings.

Meanwhile, each embodiment described below only explains an aspect of the present invention respectively. Therefore, it is to be noted that the embodiments are not to be regarded as mutually exclusive, and that it is possible to combine the embodiments.

[a] First Embodiment

In a parallel computer according to the first embodiment, a network interface device of a local node that performs communication collects congestion information of a plurality of routes, and performs routing based on the collected congestion information and a route selection instruction from an arithmetic processing device. The collection of the congestion information is performed by sending a congestion information collection packet to a remote node through the route targeted to collect congestion information by a network interface device of the local node. In addition, the collection of congestion information is performed by sending back a congestion information collection response packet to the local node by a network interface device of the remote node that received the congestion information collection packet.

Meanwhile, congestion information refers to information that indicates how crowded the targeted route is. Congestion information is, for example, the latency of the targeted route, the buffer usage volume of the switch on the targeted route, and the like.

In addition, a route candidate in the description below refers to a targeted route to which a congestion information collection packet is sent in order to collect congestion information.

A parallel computer according to the first embodiment is, for example, as illustrated in FIG. 1, a parallel computer including nodes n00-n33 that are information processing apparatuses to perform computing, and switches s00-s33 that constructs the network between nodes.

FIG. 5 is a configuration diagram of a node of the parallel computer according to the first embodiment.

Each node constituting the parallel computer according to the first embodiment becomes a local node or a remote node with each communication depending on the mode of communication as to which node performs communication to which node. FIG. 5 illustrates a node n1 that may be either a local node or a remote node.

As illustrated in FIG. 5, the node n1 according to the first embodiment includes an arithmetic processing device 101, a network interface device 102, and a main memory unit 103. The arithmetic processing device 101, the network interface device 102, and the main memory unit 103 are connected to each other via a bus 104.

The arithmetic processing device 101 performs an arithmetic process based on a message and data input through the network interface device 102. In addition, the arithmetic processing device 101 generates a message and data to transmit to another node n1, and transmits them to the network interface device 102 together with the address of the destination node n1.

The network interface device 102 controls transmission/reception of a message and data between the arithmetic processing device 101 and a network 105. The network interface device 102 includes a control unit 1021, a route table storage unit 1022, a packet transmission unit 1023, a packet reception unit 1024, and a Direct Memory Access (DMA) controller 1025.

When the node n1 illustrated in FIG. 5 is a local node, the control unit 1021 instructs the packet transmission unit 1023 to transmit a packet for collecting congestion information (a congestion information collection packet) to a remote node based on a collection instruction for congestion information from the arithmetic processing device 101. Then, the control unit 1021 receives from the packet reception unit 1024 a packet in response to the congestion information collection (a congestion information collection response packet) returned from the remote node, and stores the collected congestion information in a route table in the route table storage unit 1022. In addition, the control unit 1021 selects a route referring to the route table in the route table storage unit 1022 based on an instruction for communication start from the arithmetic processing device 101, and instructs the packet transmission unit 1023 to transmit a packet using the selected route.

When the node n1 illustrated in FIG. 5 is a remote node, the control unit 1021 receives a congestion information collection packet transmitted from a local node, via the packet reception unit 1024. Then, the control unit 1021 generates a congestion information collection response packet based on the received congestion information collection packet, and returns the generated congestion information collection response packet to the local node via the packet transmission unit 1023.

The control unit 1021 is a logic circuit realized by an LSI (Large Scale Integrated circuit) for example.

The DMA controller 1025 performs DMA transfer with the main memory unit 103 based on a request from the control unit 1021 without going through the arithmetic processing apparatus 101, and performs reading out and writing in of data stored in the main memory unit 103.

The packet transmission unit 1023 transmits a packet to another node n1 via the network 105 based on a transmission instruction from the control unit 1021. The packet transmission unit 1023 is a logic circuit realized by an LSI for example.

The packet reception unit 1024 receives a packet transmitted from another node n1 via the network 105, and transmits the received packet to the control unit 1021. The packet reception unit 1024 is a logic circuit realized by the LSI for example.

The route table storage unit 1022 stores a route table including congestion information of the route targeted to collect congestion information. The route table storage unit 1022 is a Random Access Memory (RAM) such as a Static Random Access Memory (SRAM) for example.

The main memory unit 103 stores a program executed by the arithmetic processing device 101 and various data. The main memory unit 103 is a RAM such as a Dynamic Random Access Memory (DRAM) for example.

Figure 6:
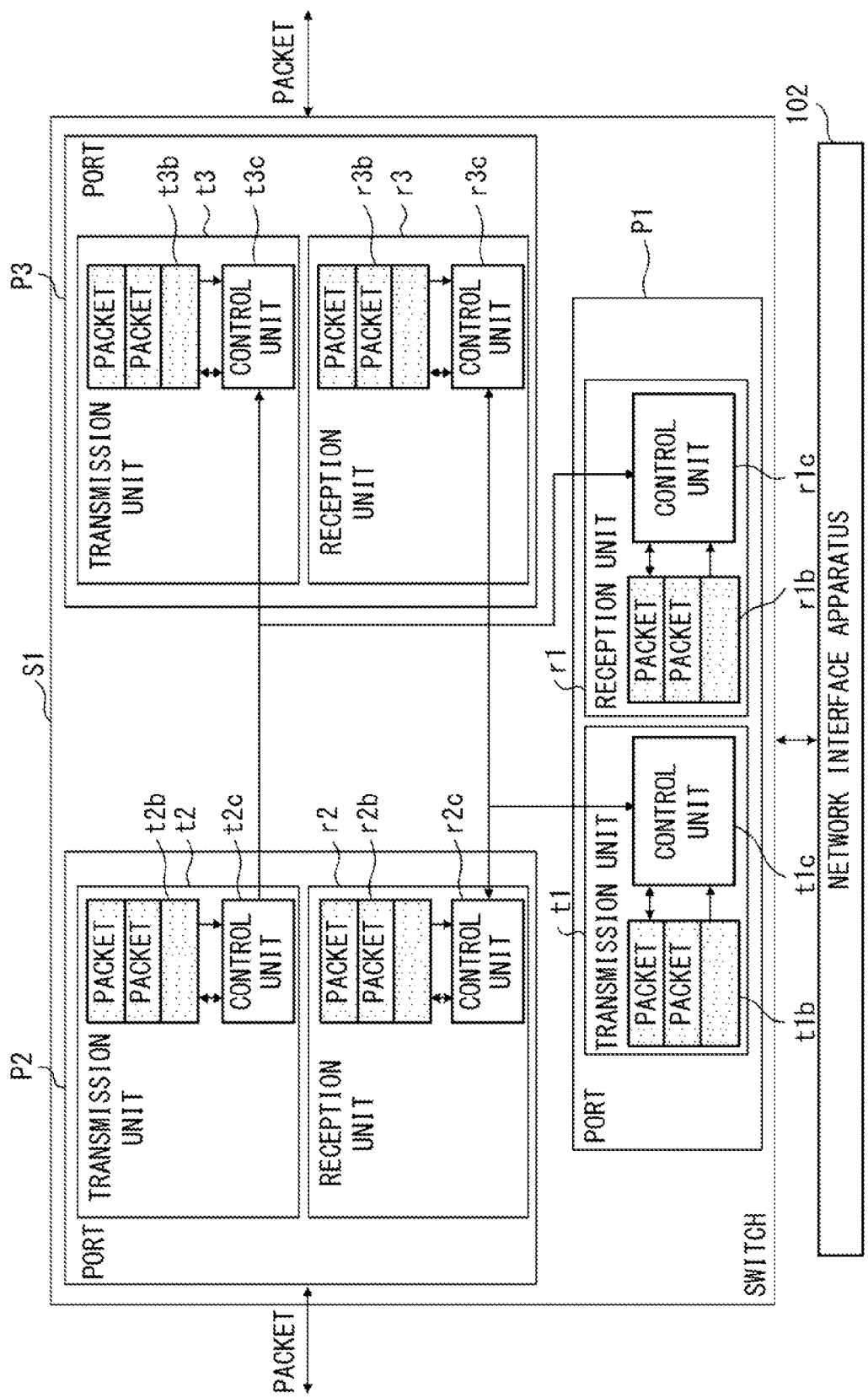
FIG. 6 is a configuration diagram of a switch of a parallel computer according to the first embodiment.

FIG. 6 is a configuration diagram of a switch of a parallel computer according to the first embodiment. FIG. 6 illustrates a switch in a case in which each node n1 is connected to a one-dimensional network. In a case in which a multi-dimensional network such as a two-dimensional mesh and a three-dimensional torus, a switch s1 has a configuration in which the number of ports illustrated in FIG. 6 is increased.

As illustrated in FIG. 6, the switch s1 includes a port p1 to connect to the network interface device 102, and ports p2, p3 to connect to other switches s1.

As illustrated in FIG. 6, each of ports p1, p2, p3 includes a transmission unit t1, t2, t3 and a reception unit r1, r2, r3.

The transmission units t1, t2 t3 in each port respectively transmit a packet within the switch s1, and each of reception units r1, r2, r3 receives a packet within the switch s1. In addition, each transmission unit t1, t2, t3 receives a packet from the network interface device 102 outside the switch s1 and a packet from another switch s1, and each reception unit r1, r2, r3 transmits a packet to the network interface device 102 outside the switch s1 and a packet to another switch s1. The packets received from the network interface device 102 or another switch s1 are respectively transmitted to the transmission units t1, t2, t3, then respectively transmitted to the reception units r1, r2, r3 of another port from the each of the transmission units t1, t2, t3, and respectively transmitted to the network interface device 102 or another switch s1 connected to the port.

The transmission units t1, t2, t3 in each port include a control unit t1c, t2c, t3c and a buffer t1b, t2b, t3c, respectively. In addition, the reception units r1, r2, r3 in each port include a control unit r1c, r2c, r3c and a buffer r1b, r2b, r3b, respectively.

Each of the control units t1c, t2c, t3c, r1c, r2c, r3c performs control for transmission/reception of a packet.

FIG. 6 illustrates a case in which a packet is transmitted/received between the control unit t1c of the transmission unit in the port p1 and the control units r2c, r3c of the reception unit in each port p2, p3 as an example. In addition, FIG. 6 illustrates a case in which a packet is transmitted/received between the control units t2c, t3c in each port p2, p3 and the control unit r1c of the transmission unit in the port p1.

Each control unit t1c, t2c, t3c, r1c, r2c, r3c is a logic circuit realized by an LSI for example.

Each buffer t1b, t2b, t3c, r1b, r2b, r3b stores a transmitted/received packet. Each buffer t1b, t2b, t3c, r1b, r2b, r3b is a RAM such as an SRAM for example.

The number of ports of the switch s1 varies according to the topology of the network. For example, in the two-dimensional mesh structure illustrated in FIG. 1, five ports including one port for the network interface device 102 and four ports for other switches s1 are required. In this case, the structure of the ports itself is the same as the port of the switch illustrated in FIG. 6.

Basic processes performed by a parallel computer according to the first embodiment are described schematically with reference to FIG. 7.

FIG. 7 is a schematic illustration diagram of the routing in the parallel computer according to the first embodiment. In FIG. 7, as an example, the congestion information to be collected is assumed as the returning order of congestion information collection response packets, and the order of communication routes specified by the arithmetic processing device is assumed as the returning order.

As illustrated in FIG. 7(a), when a local node ln1 collects congestion information, the network interface device 102 of the local node ln1 transmits congestion information collection packets to a remote node rn1 using a route candidate 1, a route candidate 2, and a route candidate 3.

The network interface device 102 of the remote node rn1 that received the congestion information collection packet sends back congestion information collection response packets to the local node ln1, as illustrated in FIG. 7(b). Then, the network interface device 102 of the local node ln1 records the returning order of the congestion information collection response packets received from the remote node rn1.

As illustrated in FIG. 7(c), when the local node ln1 performs communication to the remote node 1, the arithmetic processing device 101 of the local node ln1 specifies the route according to the returning order. That is, in the returning order, the route from which the congestion information collection response packet was received first is specified. Then, the network interface device 102 selects, in the returning order, the route with the first return, based on the instruction from the arithmetic processing device 101. In the example in FIG. 7(c), the return is in order of the route candidate 2, the route candidate 3, the route candidate 1, so the network interface device 102 selects the route candidate 2 with the first return, to perform communication with the remote node rn1.

Hereinafter, the parallel computer according to the first embodiment is described in greater detail with the following case as an example. That is, the timing to collect congestion information is assumes as the time when the arithmetic processing device 101 issues an instruction to the network interface device 102 to collect congestion information. As for the type of the route candidate, it is assumed that the outbound route and the inbound route through which packets go between the local node and the remote node are the same. The congestion information to be collected is assumed as the returning order in which congestion information collection response packets return to the local node. It is assumed that the order of the route specified by the arithmetic processing device 101 follows the returning order. Meanwhile, these are an example to explain the parallel computer according to the first embodiment, and the parallel computer according to the first embodiment is not limited to these cases.

In the first embodiment, transmission of congestion information collection packets, recording of congestion information such as the returning order, and route selection are performed by the control unit 1021 of the network interface device 102 of the local node.

Figure 8:
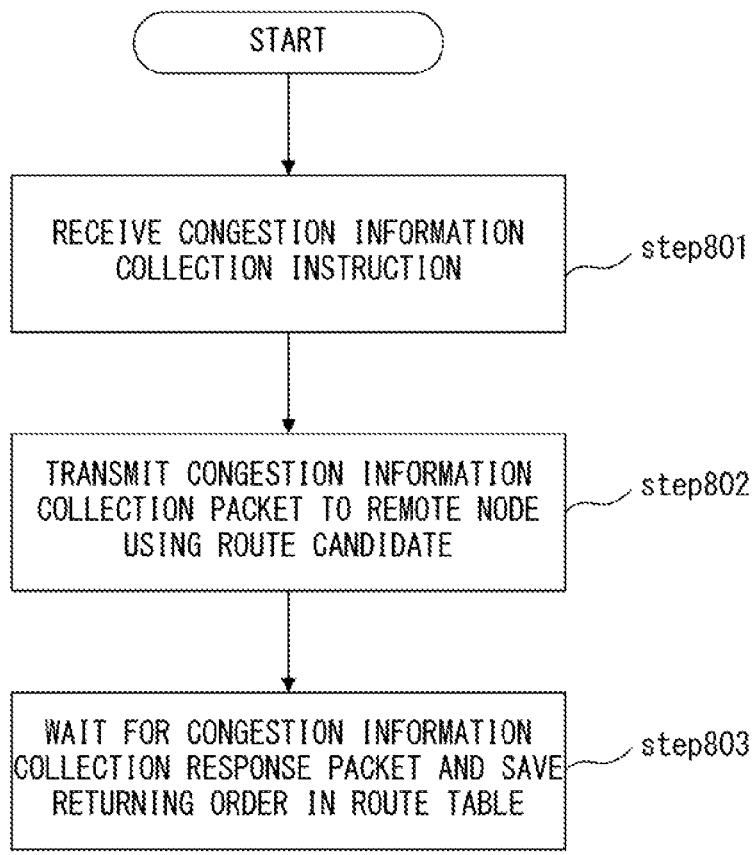
FIG. 8 is a flowchart of processes from transmission of a congestion information collection packet to recording of the order of returns performed by a control unit according to the first embodiment.

FIG. 8 is a flowchart of processes from transmission of congestion information collection packets to the recording of the returning order performed by the control unit according to the first embodiment.

In step 801, the control unit 1021 of the local node receives a congestion information collection instruction from the arithmetic processing device 101, and starts the processing for congestion information. The congestion information collection instruction by the arithmetic processing device 101 includes an instruction regarding the remote node and the route candidate. The specification of the route candidate by the arithmetic processing device 101 is performed by specifying a relay node in a route between the local node and the remote node, and specifying the decision method of the route between the local node and the relay node and the route between the relay node and the remote node in the order of the dimension of dimension order routing, for example.

In step 802, the control unit 1021 generates a congestion information collection packet according to the congestion information collection instruction from the arithmetic processing device 101. Then, the control unit 1021 transmits the congestion information collection packet to the remote node using the route specified by the congestion information collection instruction. The control unit 1021 of the network interface device 102 of the remote node that received the congestion information collection packet generates a congestion information collection response packet, and sends back the generated congestion information collection response packet to the local node.

Figure 9:
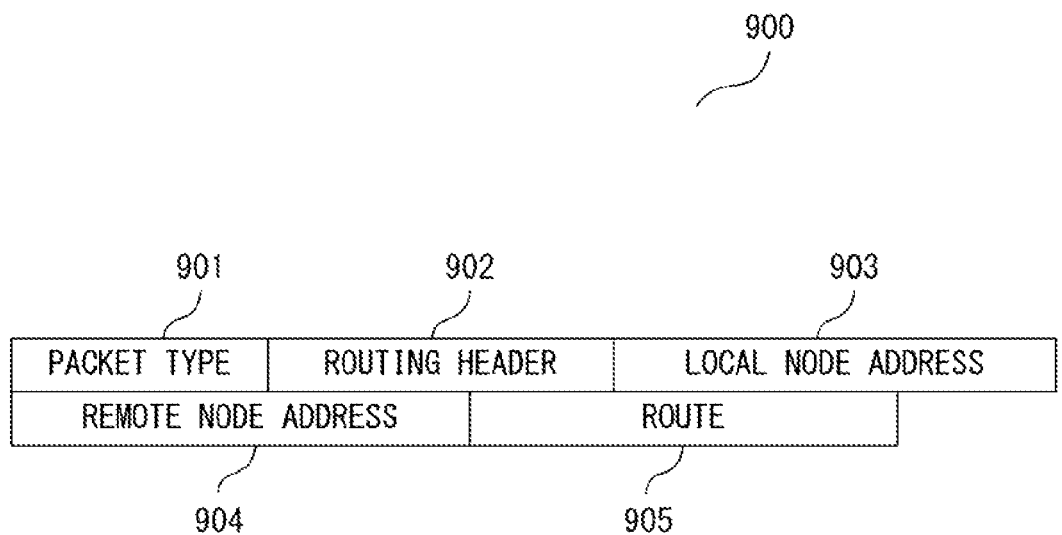
FIG. 9 is a diagram illustrating fields of a congestion information collection packet and a congestion information collection response packet according to the first embodiment.

FIG. 9 is a diagram illustrating fields of a congestion information collection packet and a congestion information collection response packet according to the first embodiment.

A packet type 901 in a packet field 900 illustrated in FIG. 9 is a field to specify the type of a packet. The network interface device 102 refers to the packet type 901 to confirm that the referred packet is a congestion information collection packet or a congestion information collection response packet.

A routing header 902 is a field to specify the route to the destination node. For example, when the route candidate is specified in dimension order, the routing header 902 includes information of the dimension order to select the route in X axis->Y axis order or Y axis->X axis, and information of a relay node to relay the packet, and the like. The switch s1 decides the port to be transmitted referring to the routing header 902.

A local node address 903 is a field including the address of the local node that is a source node transmitting the congestion information collection packet. The network interface device 102 that received the congestion information collection packet refers to the local node address 903 in the congestion information collection packet, and transmits the congestion information collection response packet to the node of the address. In addition, the network interface device 102 that received the congestion information collection response packet confirms that it is a packet sent to the node itself, referring to the local node address 903 in the congestion information collection response packet.

A remote node address 904 is a field including the address of the remote node that is a destination node to which the congestion information collection packet is transmitted.

The network interface device 102 that received the congestion information collection packet confirms that it is a packet sent to the node itself, referring to the remote node address 904 in the congestion information collection packet. In addition, the network interface device 102 that received the congestion information collection response packet confirms the node for which congestion information was collected, referring to the remote node address 904 in the congestion information collection response packet.

A route 905 is a field including information of the route that the packet goes through. The route 905 is specified by the relay node and the dimension order, for example. The network interface device 102 of the remote node stores the route included in the route 905 as it is in the congestion information collection response packet, and sends it back to the local node. The network interface device 102 of the local node writes in the route included the route 905 in the congestion information collection response packet into the route table.

In step 803 in FIG. 8, the control unit 1021 waits for the congestion information collection response packet sent from the remote node. Upon receiving the congestion information collection response packet that it waited for, the control unit 1021 saves the route and the returning order of the congestion information collection response packet in the route table.

FIG. 10 is an example of the route table according to the first embodiment. In this embodiment, the route table includes route candidates and their returning order.

In the route table illustrated in FIG. 10, the route candidates are indicated as a route 1, route 2, . . . , and route n. However, when each route candidate is specified by the relay node and the dimension order, the route 1, route 2, . . . , and route n may be indicated by the relay node and the dimension order of each route.

In this embodiment, the congestion information collection packet and the congestion information collection response packet are relayed by the switch s1 based on the information of the routing header in these packets, and reach the destination node n1. Therefore, referring to FIG. 11 and FIG. 12, the process in which a packet is relayed by the switch s1 is described below.

FIG. 11 is a configuration diagram of the routing header of the congestion information collection packet and the congestion information collection response packet according to the first embodiment. FIG. 11 illustrates, as an example, a routing header 1100 in a case in which the route candidate is specified by a relay node 1101 and a dimension order 1102. The routing header 1100 illustrated in FIG. 11 is an example of a routing header in a case in which a packet is transmitted to the remote node via a relay node 1 and a relay node 2 according to the specified dimension order.

DXi1 and DYi1 in the routing header 1100 illustrated in FIG. 11 indicate the value obtained by subtracting the current address from the value of the X axis of the node address of the relay node 1, and the value obtained by subtracting the current address from the value of the Y axis, respectively. DXi2 and DYi2 indicate the value obtained by subtracting the current address from the value of the X axis of the node address of the relay node 2, and the value obtained by subtracting the current address from the value of the Y axis, respectively. DXr and DYr indicate the value obtained by subtracting the current address from the value of the X axis of the node address of the remote node, and the value obtained by subtracting the current address from the value of the Y axis, respectively. DXi1, DYi1, DXi2, DYi2, DXr and DYr respectively indicate the relative distance and the direction to each node.

In addition, the dimension order 1102 in the routing header 1100 indicates the specification of the order of the dimension to perform the routing. For example, in a two-dimensional structure, the dimension order in order of X axis, Y axis or the dimension order of Y axis, X axis is specified.

Figure 12:
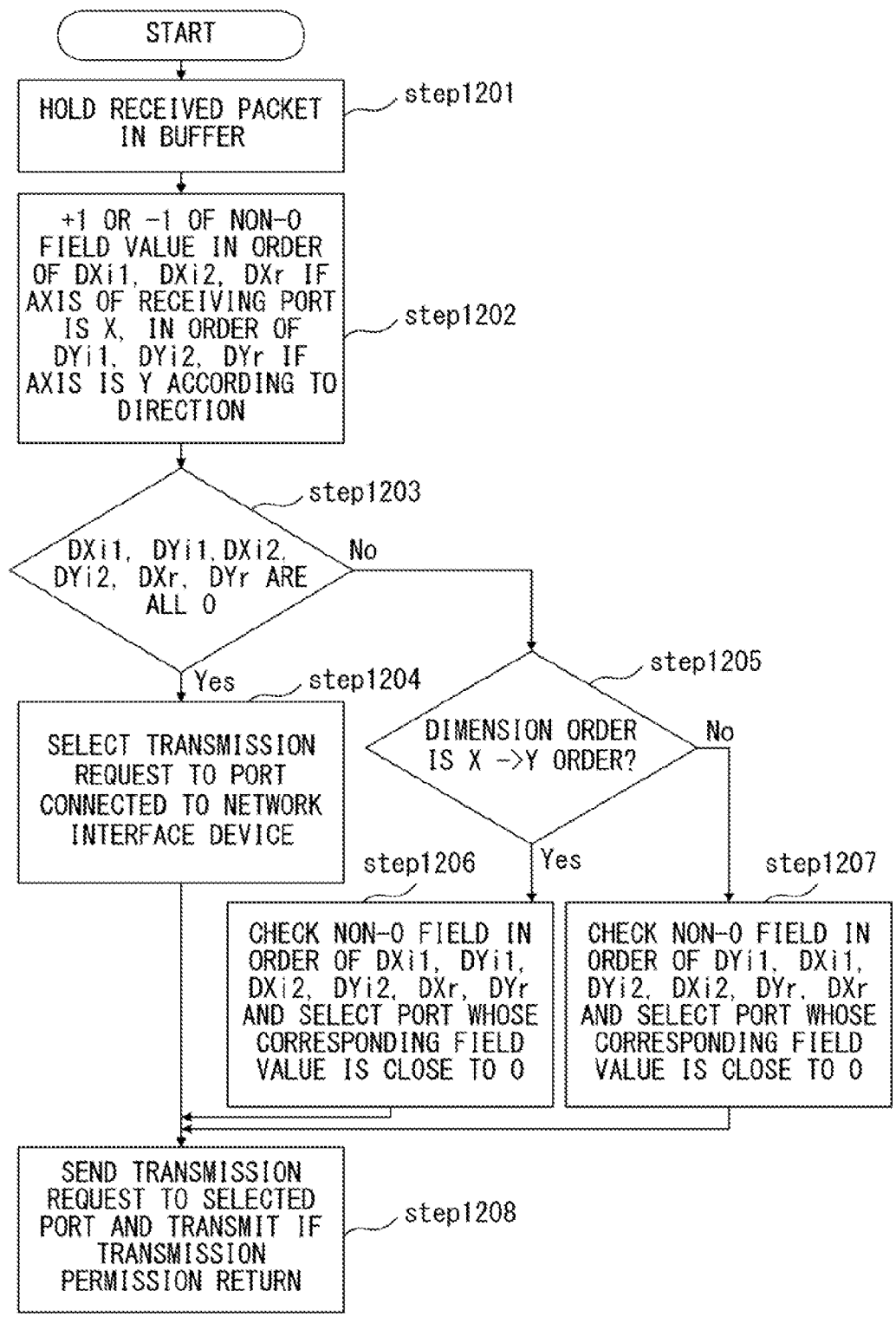
FIG. 12 is a flowchart of a process of a switch that relays a packet according to the first embodiment.

FIG. 12 is a flowchart of the process by the switch that relays the packet according to the first embodiment.

In step 1201, a packet received from the network interface device of the local node or another switch is held in the buffer of the transmission unit of the port. Then, the control unit of the transmission unit refers to the routing header of the packet held in the buffer of the transmission unit.

In step S1202, the control unit of the transmission unit updates the routing header based on the port with which the reception was performed. Here, in the configuration diagram of the parallel computer illustrated in FIG. 1 for example, the bottom left of the drawing is assumed as the origin, the upward direction and the rightward direction in the drawing are assumed as the + direction, and the downward direction and the leftward direction is regarded as the − direction. For example, when the port that received the packet is in the X axis and the − direction, and DXi1=0, DXi2=1, DXr=3, respectively in the routing header, since the DXi1 that is a value of the X axis of the relay node 1 is 0, −1 is performed to the DXi2 that is a value of the X axis of the relay node 2 next to the relay node 1. In addition, for example, when the port that received the packet is in the Y axis and the +direction, and DYi1=−1, DYi2=3, DYr=4, respectively in the routing header, since the DYi1 that is a value of the Y axis of the relay node 1 is not 0, +1 is performed to the DYi1.

After the routing header 1100 is updated in step 1202, in step 1203, the control unit of the transmission unit determines whether DXi1, DYi1, DXi2, DYi2 DXr and DYr are all 0 or not.

When DXi1, DYi1, DXi2, DYi2 DXr and DYr are all 0 in the determination in step 1203, the packet is located in the switch s1 connected to the remote node. Therefore, in step 1204, the transmission unit of the control unit selects the port connected to the network interface device 102 of the remote node, and the process proceeds to step S1208.

When one or more of DXi1, DYi1, DXi2, DYi2 DXr and DYr are not 0 in the determination in step 1203, the control unit of the transmission unit determines whether the specified dimension order to perform the routing is the dimension order in order of X axis, Y axis or the dimension order in order of Y axis, X axis in step s1205.

When the dimension order to perform routing is the dimension order in order of X axis, Y axis in the determination in step 1205, in step S1206, the control unit of the transmission unit checks the field that is not 0 in order of DXi1, DYi1, DXi2, DYi2 DXr, DYr, and selects the port in the same axis and the same symbol (+ or −) as the corresponding field. Then, the process proceeds to step S1208.

When the dimension order to perform routing is in the dimension order in order of Y axis, X axis in the determination in step 1205, in step S1207, the control unit of the transmission unit checks the field that is not 0 in order of DYi1, DXi1, DYi2, DXi2, DYr, DXr, and selects the port in the same axis and the same symbol (+ or −) as the corresponding field. Then, the process proceeds to step S1208.

In step S1208, the control unit of the transmission unit sends a transmission request to the control unit of the reception unit of the port selected in step 1204, step 1206 or step 1207. The transmission request includes the packet size of the packet to be transmitted. The control unit of the reception unit of the port that received the transmission request refers to the buffer usage amount of the buffer of the reception unit to check the amount of space.

If the amount of space in the buffer of the reception unit that received the transmission request is equal to or larger than the packet size of the packet to be transmitted, the control unit of the reception unit sends a transmission permission to the control unit of the transmission unit of the port that transmitted the transmission request. Upon receiving the transmission permission, the control unit of the transmission unit of the port that sent the transmission request transmits the packet to the corresponding port.

On the other hand, if the amount of space in the buffer of the reception unit of the port that received the transmission request is smaller than the packet size of the packet to be transmitted, the control unit of the transmission unit of the port that sent the transmission request waits until the amount of space in the buffer of the reception unit becomes equal to or larger than the packet size with the packet held in the buffer being transmitted. Then, when the amount of space in the buffer of the port that received the transmission request becomes equal to or larger than the packet size, the control unit of the transmission unit of the port that sent the transmission request transmits the packet to the selected port.

Next, the process in which the local node of the parallel computer according to the first embodiment starts communication is explained.

In the parallel computer according to the first embodiment, when starting communication to the remote node for which congestion information was collected, the arithmetic processing device 101 of the local node sends an instruction for communication start to the control unit 1021 of the network interface device 102. Then, the control unit 1021 refers to the route table according to a route selection instruction specified by the arithmetic processing device 101. The control unit 1021 selects the route according to the route selection instruction specified by the arithmetic processing device 101 in the route table, and starts communication using the selected route.

Figure 13:
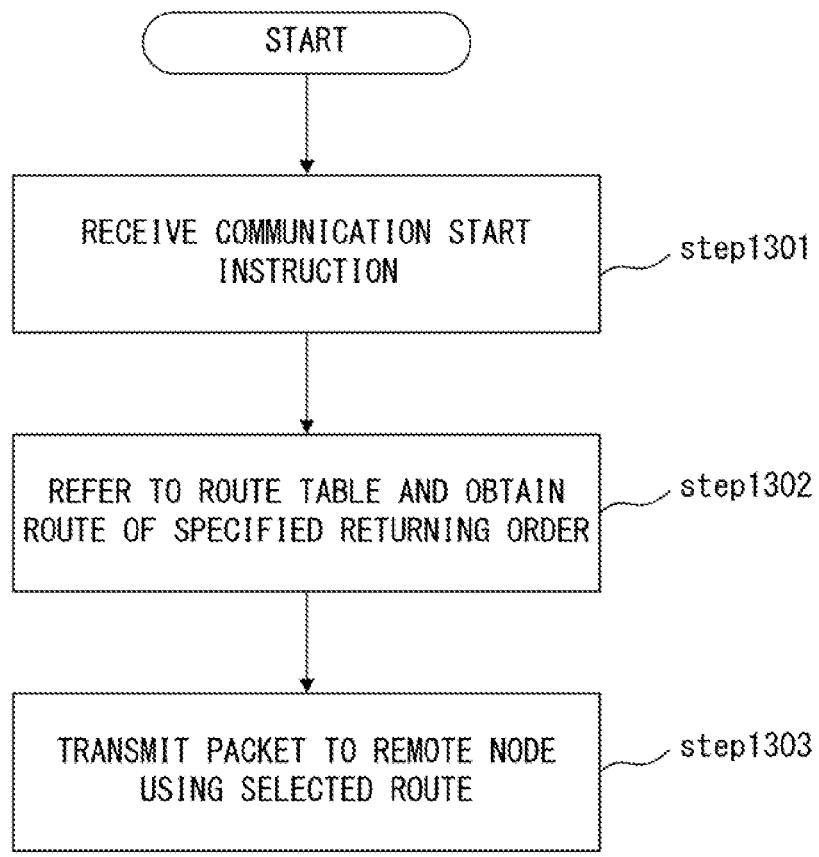
FIG. 13 is a flowchart of a process of a control unit that performs route selection according to the first embodiment.

FIG. 13 is a flowchart of processes of the control unit that performs route selection according to the first embodiment.

In step 1301 in FIG. 13, the control unit 1021 of the local node receives an instruction for communication start from the arithmetic processing device 101. The instruction for communication start performed by the arithmetic processing device 101 includes the remote node address, the type of communication, the storage location of the message in the case of transmitting a message, and a route selection instruction regarding the returning order of the route to be used and the like.

In step 1302, the control unit 1021 refers to the route table and selects the route according to the route selection instruction such as the returning route specified by the arithmetic processing device 101.

In step 1303, the control unit 1021 transmits a packet via a packet transmission unit 1023 to the remote node using the route selected step 1302.

As described above, in the parallel computer according to the first embodiment, the network interface device selects the route based on the route selection instruction from the arithmetic processing device. For this reason, the latency of the route selection may be reduced.

Furthermore, when the route selection instruction specified by the arithmetic processing apparatus is an instruction regarding the returning order of congestion information collection response packets for example, the arithmetic processing device may issue an instruction for communication start without having to wait until the congestion information collection response packets corresponding to all the route candidates return. For this reason, the usage efficiency of the arithmetic processing device does not decrease.

Then, when congestion information is represented by information of the returning of the congestion information collection response packets for example, the communication time for the return from the remote node to the local node is also reflected in the congestion information. For this reason, appropriate route selection may be performed also in a case of communication in which the remote node transmits a message, such as Get communication.

In addition, when the timing to collect congestion information is set not as the time when the arithmetic processing device issues an instruction for communication start but as the time when the arithmetic processing device issues an instruction for congestion information collection, congestion information is collected only when the arithmetic processing device explicitly instructs. For this reason, whether or not to collect congestion information may be selected when performing communication.

In the description of the present embodiment above, the network interface device 1021 of the local node starts collection of congestion information according to the congestion information collection instruction from the arithmetic processing device 101. In addition, the network interface device 1021 of the local node selects the route according to the route selection method specified by the arithmetic processing device 101 based on the instruction for communication start from the arithmetic processing device 101, and transmits a packet. However, the arithmetic processing device 101 may perform the instruction for congestion information collection with the instruction for communication start to the network interface device 1021. In this case, the network interface device 1021 of the local node transmits a congestion information collection packet to the route candidates specified by the arithmetic processing device 101 to collect congestion information, and selects the route according to the route selection instruction specified by the arithmetic processing device 101 from the collected congestion information, and start communication.

In addition, in the description of the present embodiment above, the route selection instruction specified by the arithmetic processing device 101 has been described as an instruction regarding the returning order. When the route selection instruction is the information of the returning order, the arithmetic processing device 101 is able to specify the route at the point of time when a congestion information collection response packet first returns. However, the route selection instruction specified by the arithmetic processing device 101 is not limited to the instruction regarding the returning order. Therefore, the arithmetic processing device 101 may be configured to specify the route at the point of time when a k-th congestion information collection response packet (k is an integer larger than 1) returns to the local node, for example.

Furthermore, in the description of the present embodiment above, in the route candidate, the outbound route and the inbound route through which packets go are the same. However, in the present embodiment, a route candidate in which the outbound and inbound routes through which the packet goes are different may also be adopted.

[b] Second Embodiment

As described above, in the first embodiment, each local node collects congestion information of route candidates and performs route selection.

In contrast, in the second embodiment, groups of local nodes and groups of remote nodes which share the route depending on the routing method are set in advance before collecting congestion information. In addition, a congestion information collection node that collects congestion information is set in advance in a local node group. Then, congestion information for the remote node group collected by the congestion information collection node and information regarding nodes using the route are shared in the local node group.

That is, in the second embodiment, the congestion information collection node in the local node group collects congestion information of route candidates between the local node group and the remote node group, and manages the collected congestion information. Then, when a plurality of local nodes in the same local node group communicates with a remote node in the same remote node group, the congestion information collection node performs route selection so that a plurality of communication routes are diversified.

Figure 14:
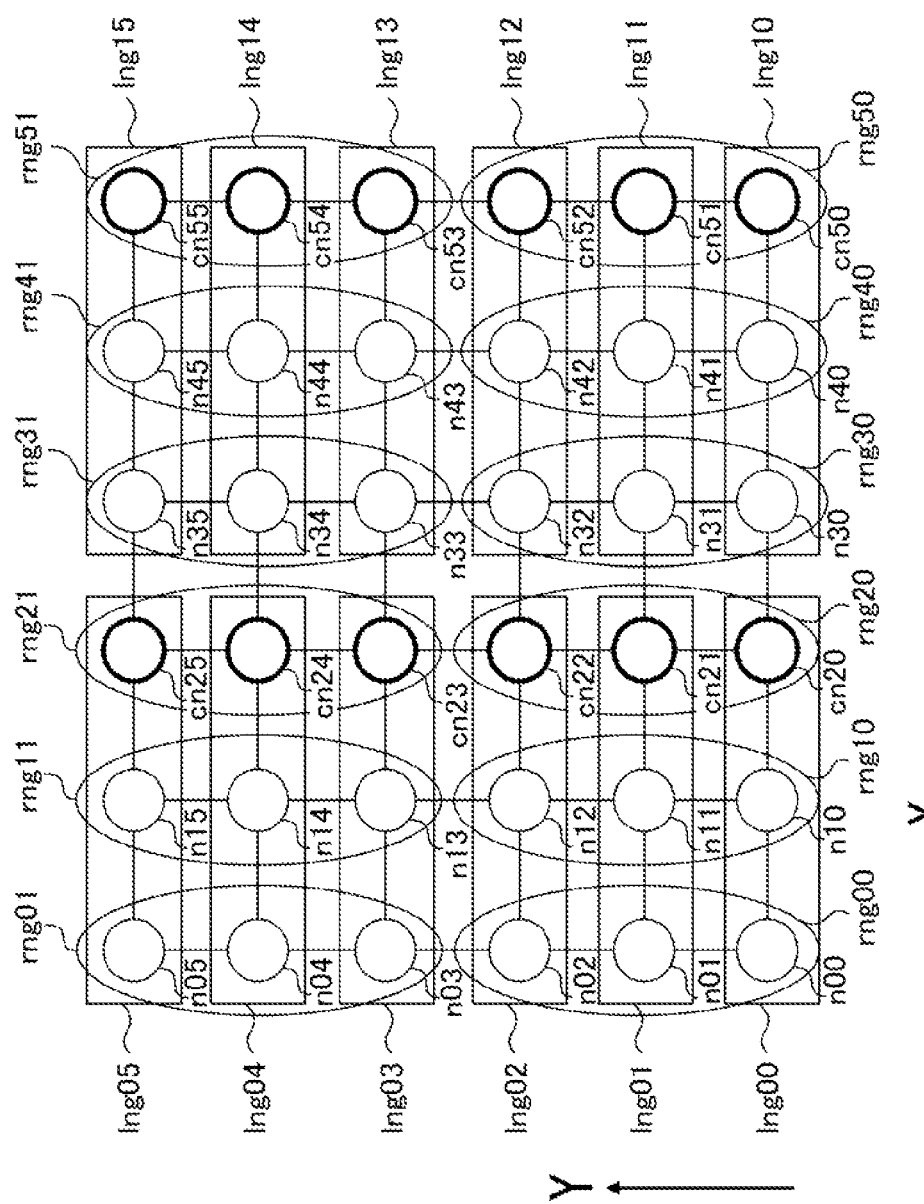
FIG. 14 is a configuration diagram of a parallel computer according to the second embodiment.

FIG. 14 is a configuration diagram of a parallel computer according to the second embodiment.

FIG. 14 illustrates a 6×6 mesh structure as an example of the parallel computer according to the second embodiment. Meanwhile, in the configuration diagram in FIG. 14, in order to make the description clear, only nodes n00-cn55 that are information processing apparatuses to perform computing are illustrated, and illustration of switches is omitted. However, the parallel computer according to the second embodiment has respective switches connected to the respective nodes n00-cn55 in the same manner as the parallel computer illustrated in FIG. 1.

In the parallel computer according to the second embodiment illustrated in FIG. 14, as an example, local node groups lng00-lng15 are respectively set for every three adjacent nodes in the X axis direction that is the dimension specified first in the dimension order routing in order of X axis, Y axis. In addition, as an example, remote node groups rng00-rng51 are respectively set for every three adjacent nodes in the Y axis direction that is the dimension specified last in the dimension order routing in order of X axis, Y axis. In addition, for every local node groups lng00-lng15, one node in the group is set as a congestion information collection node cn20, cn21, . . . , cn25, and cn50, cn51, . . . , cn55.

FIG. 15 is a configuration diagram of a node according to the second embodiment. Meanwhile, the same reference numbers are assigned in FIG. 15 to constituent elements that are the same as the constituent elements of the node n2 according to the first embodiment illustrated in FIG. 5.

Each node n2 constituting the parallel computer according to the second embodiment becomes the local node or the remote node depending on the mode of communication as to which node performs communication to which node. In addition, each node n2 constituting the parallel computer according to the second embodiment becomes a congestion information collection node that collects congestion information according to advance setting. FIG. 15 illustrates a local node n2 that may be either of the local node, the congestion information collection node, and the remote node.

In the second embodiment, the control unit of each of the local node, congestion information collection node, and the remote node is configured to perform processes as described below.

When the node n2 illustrated in FIG. 15 is the local node, upon receiving an instruction for congestion information collection from the arithmetic processing device 101, a control unit 2021 in the network interface device 202 generates a congestion information collection instruction packet to instruct for congestion information collection. Then, the control unit 2021 transmits the generated congestion information collection instruction packet to the congestion information collection node via the packet transmission unit 1023.

In addition, when the node n2 illustrated in FIG. 15 is the local node, upon receiving an instruction for communication start from the arithmetic processing device 101, a control unit 2021 generates a route selection packet, and transmits the generated route selection packet to the congestion information collection node via the packet transmission unit 1023.

Then, when the node n2 illustrated in FIG. 15 is a local node, upon receiving via the packet reception unit 1024 a route packet transmitted from the congestion information collection node, the control unit 2021 starts communication using the selected route included in the received route packet. Upon completing the communication, the control unit 2021 generates a completion notification packet, and transmits the generated completion notification packet to the congestion information collection node via the packet transmission unit 1023.

Next, when the node n2 illustrated in FIG. 15 is the congestion information collection node, the control unit 2021 receives a congestion information collection instruction packet transmitted from the local node, via the packet reception unit 1024. Then, the control unit 2021 generates a congestion information collection packet in a case in which congestion information for the group to which the remote node included in the congestion information collection instruction packet belong has not been collected. Then, the control unit 2021 transmits the generated congestion information collection packet to the remote node via the packet transmission unit 1023. Upon receiving a congestion information collection response packet from the remote node via the packet reception unit 1024, the control unit 2021 stores the congestion information in the route table of the route table storage unit 1022.

In addition, when the node n2 illustrated in FIG. 15 is the congestion information collection node, the control unit 2021 receives a route selection packet transmitted from the local node, via the packet reception unit 1024. In addition, the control unit 2021 refers to the route table stored in the route table storage unit 1022, and selects the route according to the route selection instruction included in the route selection packet. Then, the control unit 2021 generates a route packet including information regarding the selected route, and returns the generated route packet to the local node via the packet transmission unit 1023. The control unit 2021 stores information indicating that the selected route is being used by the local node, in the route table of the route table storage unit 1022.

Then, when the node n2 illustrated in FIG. 15 is a congestion information collection node, the control unit 2021 receives a completion notification packet transmitted from the local node, via the packet reception unit 1024. Then, the control unit 2021 deletes information indicating that the selected route is being used by the local node from the route table in the route table storage unit 1022.

When the node n2 illustrated in FIG. 15 is the remote node, the control unit 2021 receives a congestion information collection packet transmitted from the congestion information collection node, via the packet reception unit 1024. Then, the control unit 2021 generates a congestion information collection response packet based on the received congestion information collection packet, and transmits the generated congestion information collection response packet to the congestion information collection node via the packet transmission unit 1023.

The configuration of the switch according to the second embodiment is the same as the configuration of the switch s1 according to the first embodiment.

The parallel computer according to the second embodiment is described in detail below with an example of the following case. That is, the local node group of the parallel computer is generated from local nodes existing along the direction of the dimension specified first in the routing, in the dimension order routing. In addition, the remote node group of the parallel computer is made in the direction of the dimension specified at last in the dimension order routing. The timing to collect congestion information is assumed as the time when the arithmetic processing device 101 of the local node issues an instruction for congestion information collection. In addition, as for the type of the route candidate, it is assumed that the outbound route and the inbound route through which packets go between the local node and remote node are the same. Congestion information to be collected is assumed as the returning order of congestion information collection response packets. The route selection instruction by the arithmetic processing device 101 of the local node is assumed as an instruction regarding the returning order and the threshold value for the number of using nodes. Meanwhile, these are an example to explain the parallel computer according to the second embodiment, and the parallel computer according to the second embodiment is not limited to such a case.

In the second embodiment, the arithmetic processing device 101 of the local node issues a congestion information collection instruction to the network interface device 202. In the congestion information collection instruction, the remote node address to which a congestion information collection packet is to be sent, the congestion information collection node address, and route candidates for which congestion information is to be collected, are respectively specified.

The network interface device 202 that received a congestion information collection instruction from the arithmetic processing device 101 generates a congestion information collection instruction packet. Then, the network interface device 202 sends the generated congestion information collection instruction packet to the congestion information collection node in the same local node group.

Figure 16:
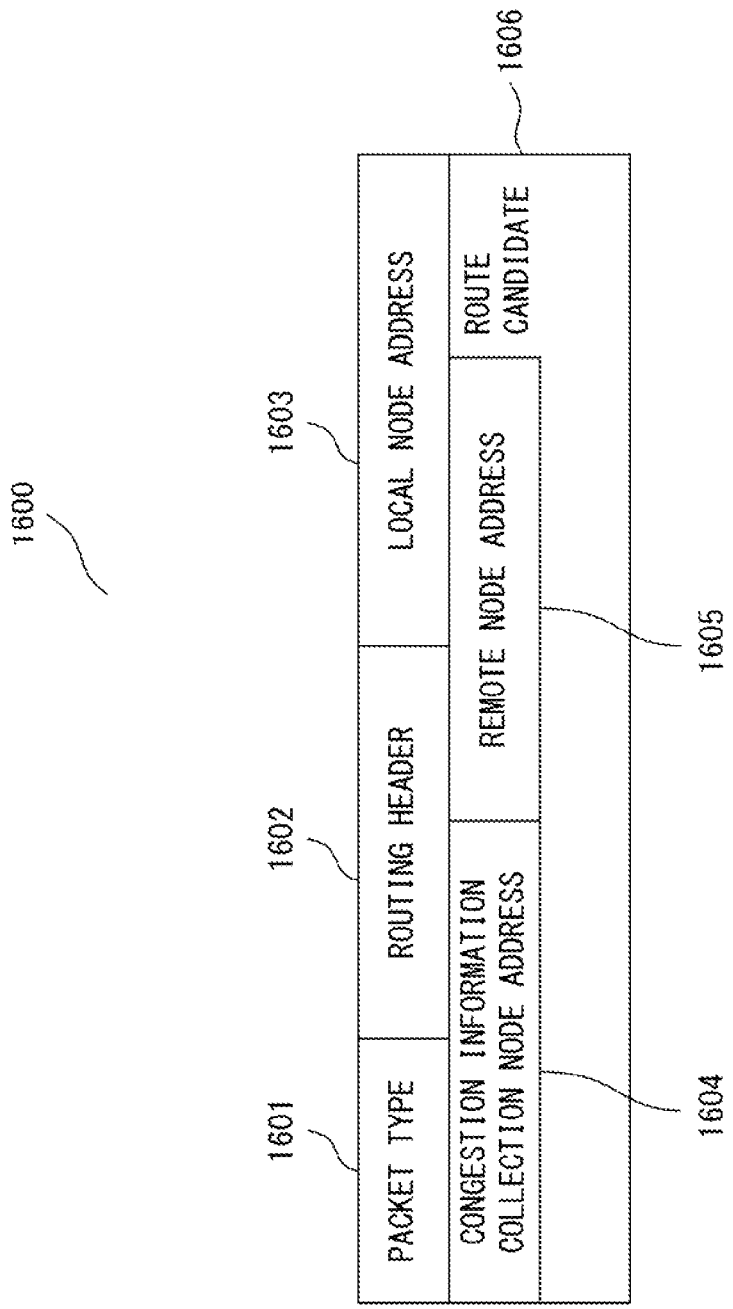
FIG. 16 is a diagram illustrating fields of a congestion information collection instruction packet according to the second embodiment.

FIG. 16 illustrates fields of a congestion information collection instruction packet according to the second embodiment.

In a field 1600 of the congestion information collection instruction packet illustrated in FIG. 16, a congestion information collection node address 1604 is a field that includes the destination node address for the congestion information collection instruction packet. The network interface device 202 of the node that received the congestion information collection instruction packet refers to the congestion information collection node address to confirm that it is a packet addressed to itself.

A remote node address 1605 is a field that includes the remote node address that is the node address of the destination remote node for the congestion information collection packet. The network interface device 202 of the congestion information collection node that received the congestion information collection instruction packet transmits a congestion information collection packet to the node specified by the remote node address.

A route candidate 1606 is a field that includes a route used for the transmission of the congestion information collection packet. The route candidate 1606 is specified by the relay node and the dimension order and the like, for example. The network interface device 202 of the congestion information collection node that received the congestion information collection instruction packet transmits the congestion information collection packet using the route candidate 1606.

A packet type 1601 is a field that specifies the type of a packet. The network interface device 202 refers to the packet type 1601 to confirm that the referred packet is a congestion information collection instruction packet.

A routing header 1602 is a field that specifies the route to the destination node. For example, in a case in which the route is specified by the relay route and the dimension order, information for these are included in the routing header 1602.

A local node address 1603 is a field that includes the local node address that is the address of the local node transmitting the congestion information collection instruction packet.

The network interface device 202 of the congestion information collection node that received the congestion information collection instruction packet generates a congestion information collection packet, when congestion information for the group to which the remote node included in the congestion information collection instruction packet belongs has not been collected. Then, the network interface device 202 transmits the generated congestion information collection packet using the route specified by the congestion information collection instruction packet.

The network interface device 202 of the remote node that received the congestion information collection packet generates a congestion information collection response packet, and sends back the generated congestion information collection response packet to the congestion information collection node.

The network interface device 202 of the congestion information collection node waits for the congestion information collection response packet sent from the remote node. Upon receiving the congestion information collection response packet, the network interface device 202 saves the route and returning order of the congestion information collection response packet in the route table.

The process performed by the control unit 2021 of the congestion information collection node and the control unit 2021 of the remote node for collection and recording of the congestion information in the second embodiment is the same as the process performed by the control unit 1021 of the local node and the control unit 1021 of the remote node according to the first embodiment.

In addition, the operation of the switch s1 that relays the congestion information collection packet and the congestion information collection response packet in the second embodiment is the same as the operation of the switch s1 according to the first embodiment.

In the route table according to the second embodiment, route candidates, congestion information such as the returning order, the remote node group for which congestion information was collected, and the current usage status of the route are recorded.

FIG. 17 is an example of the route table according to the present embodiment. FIG. 17 illustrates a route table for a group 1 for which congestion information was collected.

In the example of the route table illustrated in FIG. 17, route candidates are indicated as route 1, route 2, . . . , and route n. However, in a case in which each route is specified by the relay node and the dimension order for example, the route 1, route 2, . . . , the route n may be indicated by the relay node and the dimension order of each.

In addition, in the example of the route table illustrated in FIG. 17, it is indicated that the route 1 whose returning order in the route table is first is used for the communication by the node 1 and the communication by the node 2 in the local node group. The information regarding the using node in the route table is written into the route table at the time of communication start described later.

As described above, in the second embodiment, the congestion information collection node collects the congestion information in the local node group together. Accordingly, in the local node group, the congestion information and the usage status of the routes can be shared, and the routes can be diversified for the local nodes included in the local node groups.

Next, the arithmetic processing device 101 of the local node that transmitted the congestion information collection instruction packet issues, when starting communication, an instruction for communication start to the network interface device 202. The communication start instruction issued by the arithmetic processing device 101 includes the remote node address, the type of communication, the storage location of the message if transmitting a message, and a route selection instruction regarding the returning order and the like. The network interface device 202 that received the communication start instruction generates a route selection packet. Then, the network interface device 202 transmits the generated route selection packet to the congestion information collection node, and instructs to select the route to the remote node from the collected congestion information.

Figure 18:
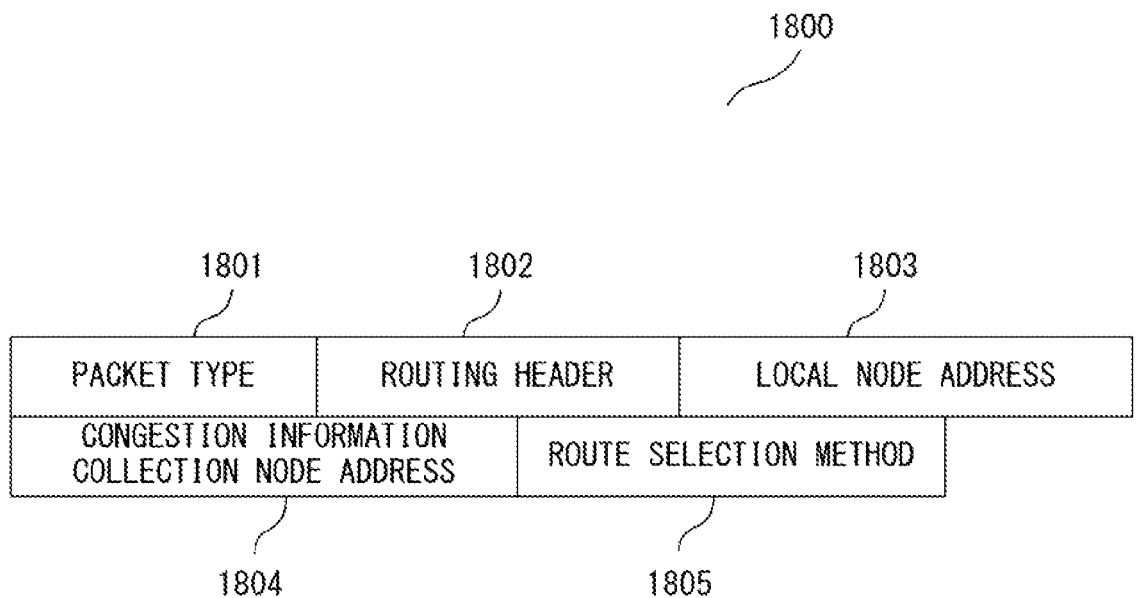
FIG. 18 is a diagram illustrating fields of a route selection packet according to the second embodiment.

FIG. 18 is a diagram illustrating fields of a route selection packet according to the second embodiment.

In a route selection packet field 1800 illustrated in FIG. 18, a packet type 1801 of is a field that specifies the type of the packet. The network interface device of the congestion information collection node refers to the packet type 1801 to confirm that the referred packet is a route selection packet.

A routing header 1802 is a field that specifies the route to the destination node. For example, in a case in which the route is specified by the relay node and the dimension order, the routing header 1802 includes information for these.

A local node address 1803 is a field that includes the address of the local node that transmits the route selection packet.

A congestion information collection node address 1804 is a field that includes the destination node address of the route selection packet. The network interface device 202 of the congestion information collection node that received a route selection packet refers to the congestion information collection node address to confirm that the packet is addressed to itself.

A route selection method 1805 is a field that includes information regarding the method to select the route to the remote node from the collected congestion information.

For example, in a case in which the route selection instruction is an instruction regarding the returning order, the network interface device 202 of the congestion information collection node that collected the congestion information selects the route to the remote node in the specified returning order. Then, the network interface device 202 of the congestion information collection node sends back a route packet including information regarding the selected route to the local node that is the source node that transmitted the congestion information collection instruction packet.

FIG. 19 is a diagram illustrating fields of a route packet according to the second embodiment.

In a route packet field 1900 illustrated in FIG. 19, a packet type 1901 is a field that specifies the type of the packet. The network interface device 202 of the local node that received the route packet refers to the packet type to confirm that the packet is a route packet.

A routing header 1902 is a field that specifies the route to the destination node. For example, in a case in which the route is specified by the relay node and the dimension order, the routing header 1902 includes information for these.

A local node address 1903 is a field that includes the address of the local node that transmitted the route selection packet.

A remote node address 1904 is a field that includes the address of the remote node in the selected route.

A route 1905 in a route packet field 1900 is a field that includes the route selected by the network interface device of the congestion information collection node according to the route selection method specified by the route selection packet.

Upon receiving the route packet transmitted from the congestion information collection node, the network interface device 202 of the local node starts communication using the route included in the route packet. Then, upon completing the communication, the network interface device 202 of the local node transmits a completion notification packet including information indicating that the communication has been completed, to the congestion information collection node.

Upon receiving the completion notification packet, the network interface device 202 of the congestion information collection node deletes the information regarding the local node that is the transmission source of the completion notification packet from the record of the using node in the route table. For example, in the route table illustrated in FIG. 17, in a case in which a completion notification packet regarding communication using the route 1 is received from the node 1 that is a local node, the network interface device 202 of the congestion information collection node deletes the information that the route 1 is used by the node 1 from the route table.

As described above, in the second embodiment, the congestion information collection node in a local node group collects congestion information for route candidates shared between the local nodes in the local node group, and manages the collected congestion information. In addition, when the local node in the local node group performs communication, the congestion information collection node performs route selection.

Figure 20A:
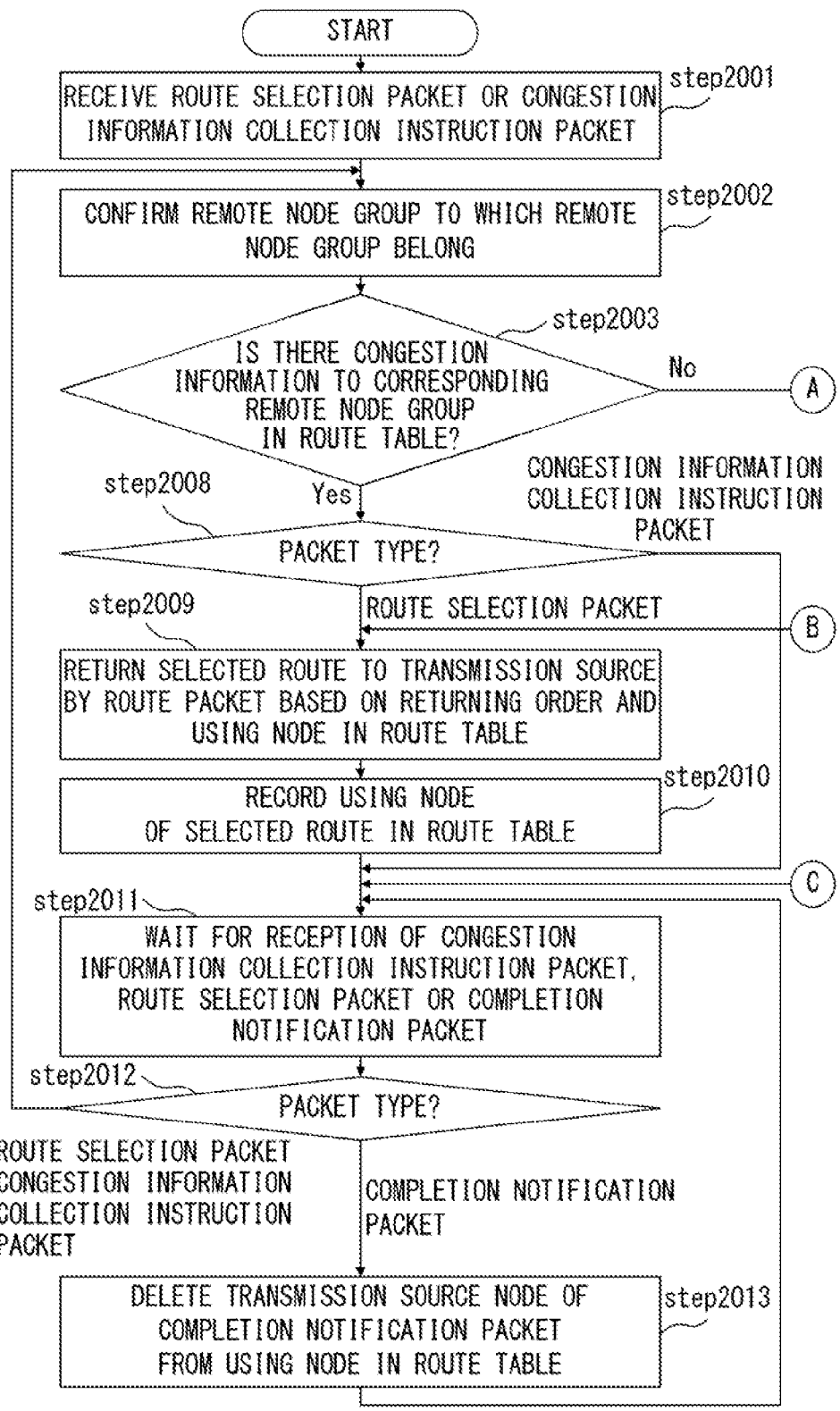
FIG. 20A is a flowchart of processes performed by a control unit of a network interface device of a congestion information collection node according to the second embodiment.
Figure 20B:
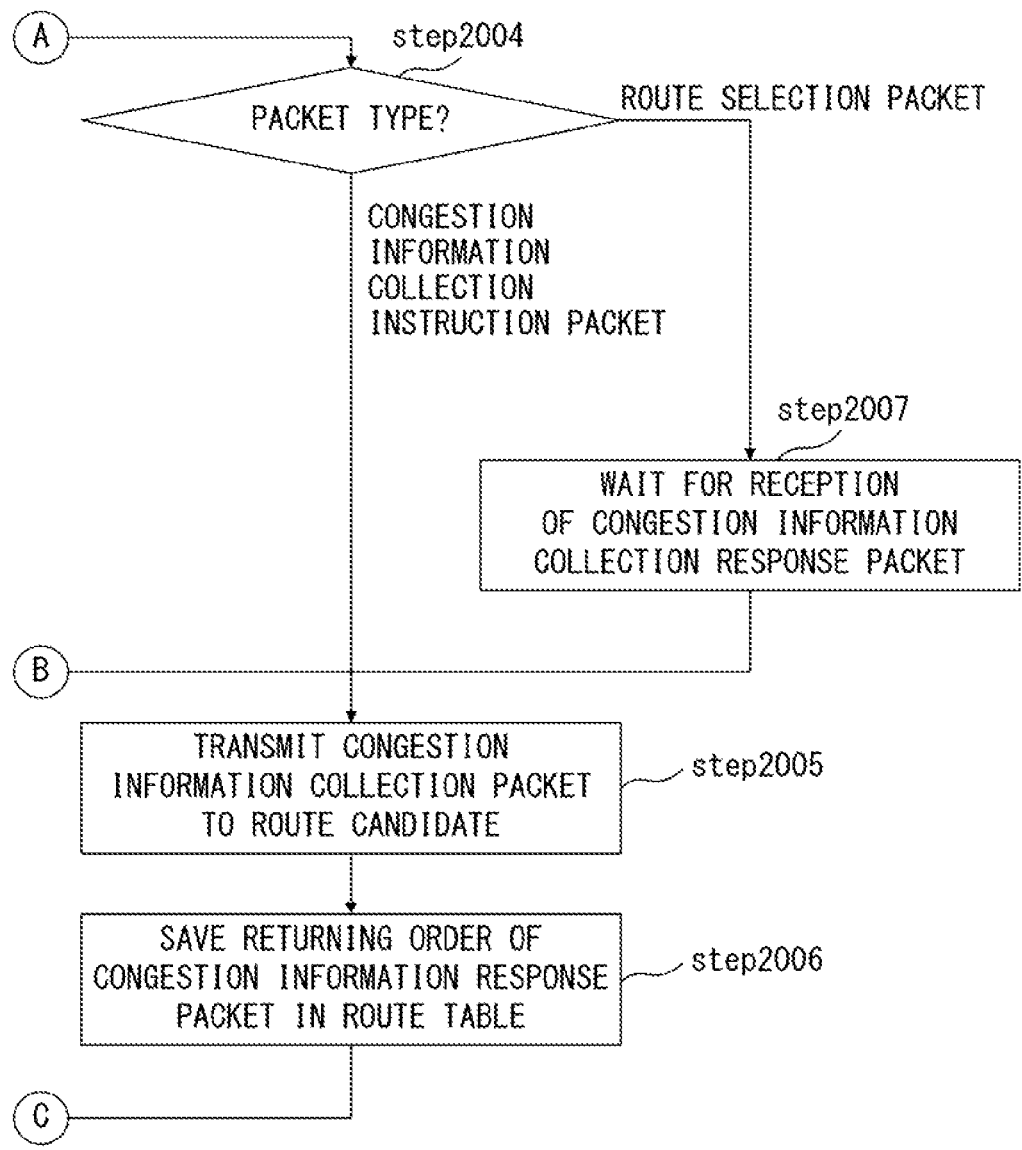
FIG. 20B is a flowchart of processes performed by a control unit of a network interface device of a congestion information collection node according to the second embodiment.

FIG. 20A and FIG. 20B are a flowchart of processes performed by the control unit of the network interface device of the congestion information collection node according to the second embodiment.

In step 2001, when the control unit 2021 receives a route selection packet or a congestion information collection instruction packet, processes in and after step 2002 are started.

In step 2002, the control unit 2021 refers to the route selection packet or the congestion information collection instruction packet, to confirm the remote node group to which the remote node targeted for the route selection or the congestion information collection belongs. In the example of a route table illustrated in FIG. 17, whether the remote node group is the group 1 or not is confirmed.

In step 2003, if the remote node group to which the remote node targeted for the route selection or the congestion information collection belongs is not in the route table, the process proceeds to step 2004.

In step 2004, determination as to whether the received packet is a route selection packet or a congestion information collection instruction packet is performed.

If the packet that the control unit 2021 received is a congestion information collection instruction packet in step 2004, the process proceeds to step 2005, and the control unit 2021 transmits the congestion information collection packet to the route candidate to the remote node to start the congestion information collection.

After starting the collection of congestion information in step 2005, when a congestion information collection response packet is returned from the remote node to the control unit 2021, in step 2006, the control unit 2021 saves the congestion information such as the returning order of the congestion information collection response packet and the like, and the process proceeds to step 2011.

If the packet that the control unit 2021 received is a route selection packet in step 2004, the process proceeds to step 2007, and the control unit 2021 waits until the collection of congestion information instructed ahead of issuing an instruction for route selection is completed. That is, the control unit 2021 waits to receive the congestion information collection response packet in the collection of congestion information, and waits to complete the collection of congestion information by updating the route table by the received congestion information collection response packet. Then, when the collection of congestion information is completed, the process proceeds to step 2009.

In step 2003, if the remote node group to which the remote node targeted for route selection or congestion information collection belongs is in the route table, the process proceeds to step 2008.

In step 2008, determination as to whether or not the packet that the control unit 2021 received is a route selection packet or a congestion information collection instruction packet.

In step 2008, if the packet that the control unit 2021 received is a route selection packet, the process proceeds to step 2009. In step 2009, the control unit 2021 refers to the route table, and selects the route according to the route selection instruction. In the example of a route table illustrated in FIG. 17, the control unit 2021 refers to the returning order and the using node in the route table, and selects the route according to the route selection instruction specified by the route selection packet.

For example, it is assumed that the route selection instruction specified by the route selection packet is an instruction regarding the k-th when listed in returning order (k is an integer among 1 to the number n for which congestion information has been collected) and the threshold value for the number of using nodes. In the case of this route selection instruction, the control unit 2021 searches the route for which the number of using nodes is equal to or smaller than the threshold value, from the route whose returning order is k-th and sequentially in order of k+1, k+2. Then, as a result of the search, if there is a route for which the number of using nodes is equal to or smaller than the threshold value, the route is selected, and if there is no route for which the number of using nodes is equal to or smaller than the threshold value, the k-th route is selected. For example, when a route selection instruction in which the returning order is first and the threshold value is 1 is specified, since in the route table illustrated in FIG. 17, the number of using nodes for the route 1 whose returning order is first is 2, that is, over the threshold value, the control unit searches the second route. Then, since the number of using nodes for the route 2 that is the second route is 0, the control unit 2021 selects the route 2 as the route according to the route selection instruction.

When the route is selected as described above according to the route selection instruction, the control unit 2021 returns a route packet including information regarding the selected route to the local node that is the transmission source of the route selection packet, and the process proceeds to step 2010.

In step 2010, the control unit 2021 records the information regarding the local node that uses the selected route in the route table, and the process proceeds to step 2011.

In step 2008, if the packet that the control unit 2021 received is a congestion information collection instruction packet, the process proceeds to step 2011.

In step 2011, the control unit 2021 waits for the reception of a congestion information collection instruction packet, a route selection packet, or a completion notification packet.

If the control unit 2021 receives a congestion information collection instruction packet or a route selection packet in step 2012, the process returns to step 2002.

If the control unit 2021 receives a completion notification packet in step 2012, the information regarding the local node that is the transmission source of the completion notification packet is deleted from the record of the using node in the route table.

As described above, in the parallel computer according to the second embodiment, based on the specification of the route selection instruction by the arithmetic processing device of the local node in a local node group, the network interface device of the congestion information collection node in the local node group selects the route. For this reason, the latency of the route selection by the arithmetic processing device may be reduced.

Furthermore, in the parallel computer according to the second embodiment, the congestion information collection node collects the congestion information in the local node group together. For this reason, the congestion information and the usage status of routes may be shared among the local nodes in the local node group, and communication routes may be diversified.

Then, for example if the route selection instruction specified by the arithmetic processing device of the local node is an instruction regarding the returning order of the congestion information collection response packet, the arithmetic processing device of the local node may issue an instruction for communication start without need to wait until congestion information collection response packets corresponding to all the route candidates are returned. For this reason, the usage efficiency of the arithmetic processing device of the local node does not decrease.

In addition, for example if the congestion information is the returning order of the congestion information collection response packet, the communication time for the return from the remote node to the local node is also reflected. For this reason, appropriate route selection may be performed also in a case of communication in which the remote node transmits a message, such as Get communication.

Furthermore, in a case in which the timing to collect congestion information is set not as the time when the arithmetic processing device issues an instruction for communication start but as the time when the arithmetic processing device issues an instruction for congestion information collection, congestion information is collected only when the arithmetic processing device explicitly specifies. For this reason, upon performing communication, whether or not to collect congestion information may be selected.

Meanwhile, in the description of the present embodiment above, it is assumed that a route candidate in which the outbound and inbound routes through which a packet goes are the same. However, in the present embodiment, a route candidate in which the outbound and inbound routes through which the packet goes are different may also be adopted.

[c] Third Embodiment

In the parallel computer according to the second embodiment described above, the network interface device of the congestion information collection node collects congestion information when the arithmetic processing device of the local node in the local node group starts the instruction for collecting congestion information. Then, the network interface device of the congestion information collection node selects the route to be used for communication when the arithmetic processing device of the local node issues an instruction for communication start.

In contrast, in the parallel computer according to the third embodiment, the network interface device of the congestion information collection node collects congestion information when the arithmetic processing device of the local node in the local node group issues an instruction for communication start. Then, when the congestion information is collected, the network interface device of the congestion information collection node selects the route to be used for communication.

In the parallel computer according to the third embodiment, groups of local nodes and groups of remote nodes which share a route depending on the routing method are set in advance before collecting congestion information. In addition, a congestion information collection node is set in advance in a local node group. The configuration of the parallel computer according to the third embodiment may be the same as the configuration of the parallel computer according to the second embodiment illustrated in FIG. 14.

Figure 21:
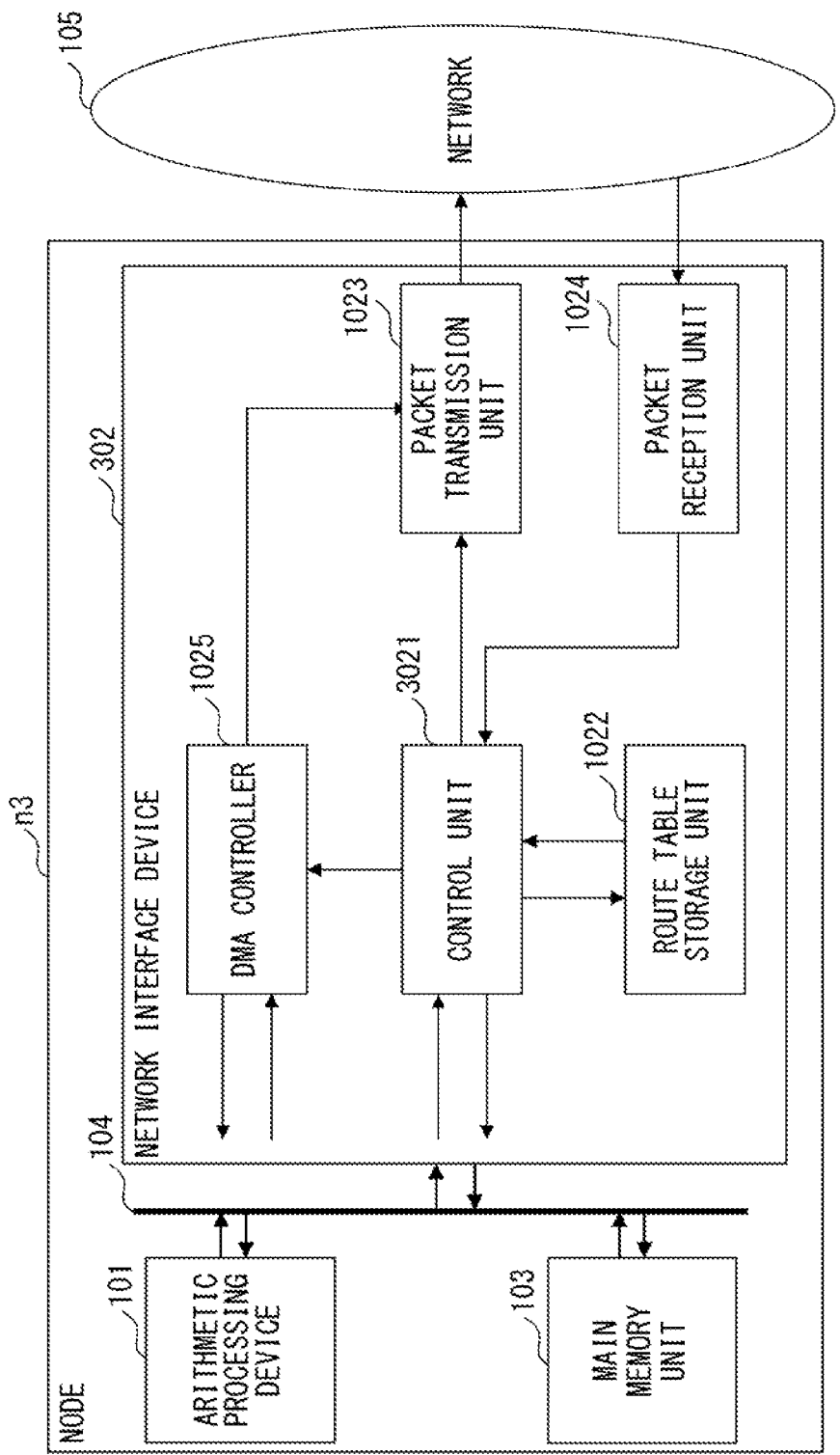
FIG. 21 is a configuration diagram of a node according to the third embodiment.

FIG. 21 is a configuration diagram a node of the parallel computer according to the third embodiment. Meanwhile, the same reference numbers are assigned in FIG. 21 to the same constituent elements as the constituent elements of the node according to the second embodiment illustrated in FIG. 15.

Each node n3 constituting the parallel computer according to the third embodiment becomes the local node and the remote node according which node performs communication to which node. In addition, each node n3 constituting the parallel computer according to the third embodiment becomes the congestion information collection node according to advance setting. FIG. 21 illustrates the node n3 that may be either of the local node, the congestion information collection node, and the remote node.

In the third embodiment, a control unit 3021 of each of the local node, the congestion information collection node, and the remote node is configured to perform processes below.

When the node n3 illustrated in FIG. 21 is the local node, upon receiving an instruction for communication start from the arithmetic processing device 101, the control unit 3021 generates a congestion information collection instruction packet. Then, the control unit 3021 transmits the generated congestion information collection instruction packet to the congestion information collection node via the packet transmission unit 1023.

In addition, when the node n3 illustrated in FIG. 21 is a local node, upon receiving via the packet reception unit 1024 a route packet transmitted from the congestion information collection node, the control unit 3021 starts communication using the selected route included in the route packet. Then, upon completing the communication, the control unit 3021 generates a completion notification packet, and transmits the generated completion notification packet to the congestion information collection node via the packet transmission unit 1023.

Next, when the node n3 illustrated in FIG. 21 is the congestion information collection node, the control unit 3021 receives the congestion information collection instruction packet transmitted from the local node, via the packet reception unit 1024. The control unit 3021 generates a congestion information collection packet if congestion information for the group to which the remote node included in the congestion information collection instruction packet belongs has not been collected. Then, the control unit 3021 transmits the generated congestion information collection packet to the remote node via the packet transmission unit 1023. Upon receiving a congestion information collection response packet from the remote node via the packet reception unit 1024, the control unit 3021 stores the congestion information in the route table of the route table storage unit 1022.

In addition, when the node n3 illustrated in FIG. 21 is a congestion information collection node, the control unit 3021 refers to the route table in the route table storage unit 1022, and selects the route according to the route selection instruction included in the congestion information collection instruction packet transmitted from the local node. Then, the control unit 3021 generates a route packet including information regarding the selected route, and returns the selected route packet to the local node via the packet transmission unit 1023. In addition, the control unit 3021 saves information indicating that the selected route is being used by the local node, in the route table of the route table storage unit 1022.

Then, when the node 3 illustrated in FIG. 21 is the congestion information collection node, the control unit 3021 receives a completion notification packet transmitted from the local node, via the packet reception unit 1024. Then, the control unit 3021 deletes information indicating that the route is being used by the local node, from the route table in the route table storage unit 1022.

When the node n3 illustrated in FIG. 21 is the remote node, the control unit 3021 receives a congestion information collection packet transmitted from the congestion information collection node, via the packet reception unit 1024. Then, the control unit 3021 generates a congestion information collection response packet according to the received congestion information collection packet, and transmits the generated congestion information collection response packet to the congestion information collection node via the packet transmission unit 1023.

The configuration of the switch of the parallel computer according to the third embodiment is the same as the configuration of the switch s1 of the parallel computer according to the second embodiment.

The parallel computer according to the third embodiment is described in detail below with an example of the following case. That is, the local node group of the parallel computer is made in the first dimension order of the routing in the dimension order routing. In addition, the remote node group of the parallel computer is made in the last dimension order in the dimension order routing. The timing to collect congestion information is assumed as the time when the arithmetic processing device 101 of the local node issues an instruction for communication start. In addition, the type of the route candidate is assumed as the one with which the outbound route and the inbound route that the packet go through between the local node remote node are the same. Congestion information to be collected is assumed as the returning order of congestion information collection response packets. The route selection instruction by the arithmetic processing device 101 of the local node is assumed as an instruction regarding the returning order and the threshold value for the number of using nodes. Meanwhile, these are an example to explain the parallel computer according to the third embodiment, and the parallel computer according to the third embodiment is not limited to such a case.

In the third embodiment, the arithmetic processing device 101 of the local node issues an instruction for communication start to the network interface device 302. The instruction for communication start by the arithmetic processing device 101 includes the remote node address to send the congestion information collection packet, the congestion information collection node address, route candidates for which congestion information is to be collected, the type of communication, the storage location of the message if transmitting a message, and a route selection instruction such as the returning order and the like.

The network interface device 302 that received the instruction for communication start from the arithmetic processing device 101 generates a congestion information collection instruction packet.

Figure 22:
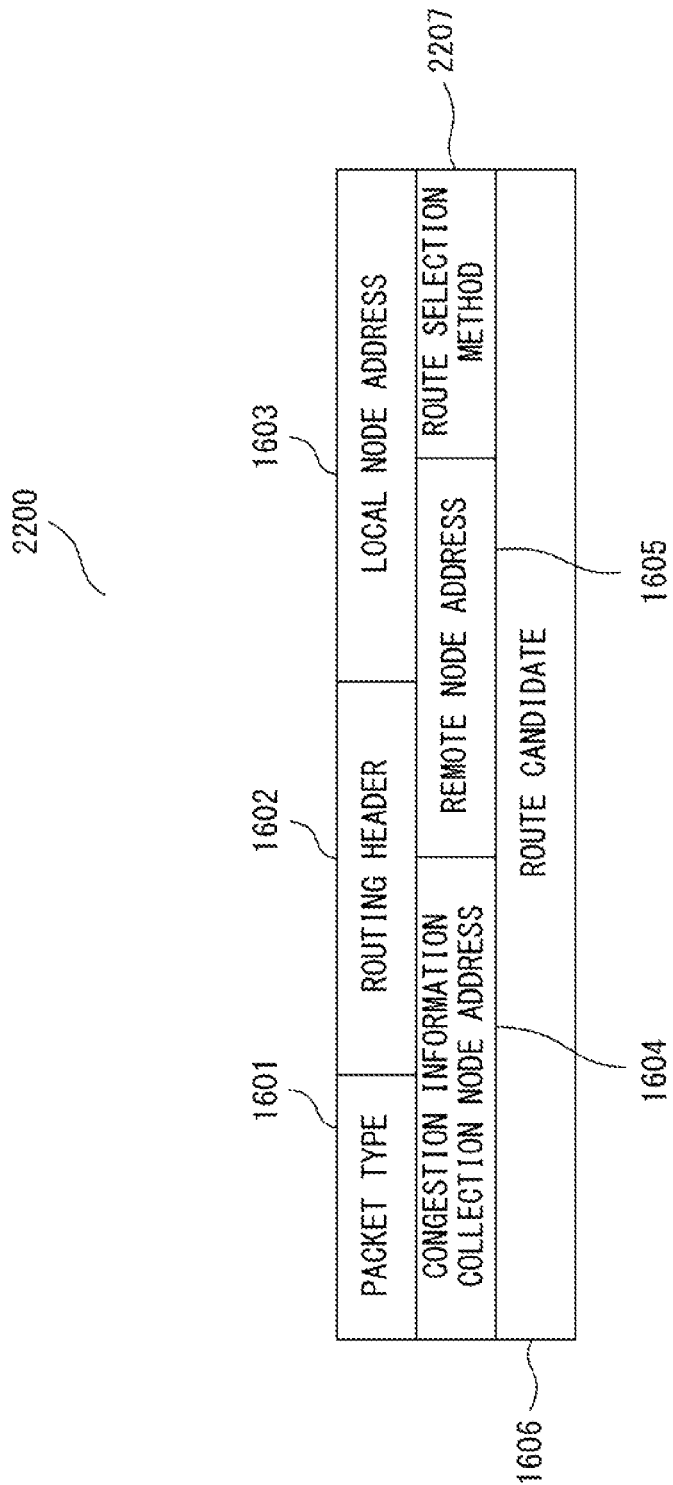
FIG. 22 is a diagram illustrating fields of a congestion information collection instruction packet according to the third embodiment.

FIG. 22 is a diagram illustrating fields of the congestion information collection instruction packet according to the third embodiment.

As illustrated in FIG. 22, in the fields of the congestion information collection packet according to the third embodiment, the packet type 1601, the routing header 1602, the local node address 1603, the congestion information collection node address 1604, the remote node address 1605, and the route candidate 1606 are included. The contents of these fields are same as in the second embodiment described above with the illustration of FIG. 16.

In addition, as illustrated in FIG. 22, a route selection instruction 2207 is further included in the fields of the congestion information collection instruction packet according to the third embodiment. The route selection instruction 2207 is a field that includes information regarding the route selection instruction included in the instruction for communication start by the arithmetic processing device 101 of the local node.

A network interface device 302 of the local node sends the generated congestion information collection instruction packet to the congestion information collection node that belongs to the same local node group as the local node that issued an instruction for communication start.

The network interface device 302 of the congestion information collection node that received the congestion information collection instruction packet generates a congestion information collection packet when the congestion information for the group to which the remote node included in the congestion information collection instruction packet belongs has not been collected. Then, the network interface device 302 transmits the generated congestion information collection packet to the remote node in the route specified by the congestion information collection instruction packet. The generation and transmission of the congestion information collection packet performed by the network interface device 302 described above is the same as the generation and transmission of the congestion information collection packet performed by the network interface device 202 of the congestion information collection node according to the second embodiment described above.

In addition, upon receiving the congestion information collection packet, the network interface device 302 of the remote node generates a congestion information collection response packet, and returns the generated congestion information collection response packet to the congestion information collection node. The generation and transmission of the congestion information collection response packet performed by the network interface device 302 described above is the same as the generation and transmission of the congestion information collection packet performed by the network interface device 202 of the remote node according to the second embodiment described above.

Then, upon receiving the congestion information collection response packet, the network interface device 302 of the congestion information collection node records the route candidate, congestion information such as the returning order and the like, and the remote node group for which the congestion information has been collected, in the route table. The recording in the route table performed by the network interface device 302 as described above is the same as the recording in the route table performed by the network interface device 202 of the congestion information collection node according to the second embodiment. In addition, the route table according to the third embodiment may be the same as the route table according to the second embodiment illustrated in FIG. 17.

As described above, in the third embodiment, the congestion information collection node collects congestion information together. Therefore congestion information and the usage status of routes may be shared among the local nodes in a local node group, and communication routes may be diversified.

In the third embodiment, the network interface device 302 of the congestion information collection node selects the route to be used for communication according to the specification of the route candidate included in the congestion information collection instruction packet, after collecting congestion information based on the instruction by the congestion information collection instruction packet.

The network interface device 302 transmits a route packet including the selected route to the network interface device 302 of the local node that transmitted the communication start instruction packet. In addition, information indicating that the selected route is being used by the local node is recorded in the route table. The transmission of the route selection packet and the recording in the route table performed by the network interface device 302 described above may be the same as the transmission of the route selection packet and the recording in the route table performed by the network interface device 202 of the congestion information collection node according to the second embodiment described above.

Upon receiving the route packet, the network interface device 302 of the local node starts communication using the route included in the route packet. Then, when the communication is completed, the network interface device 302 of the local node transmits a completion notification packet indicating that the communication is complete to the network interface device 302 of the congestion information collection node.

Upon receiving the completion notification packet, the network interface device 302 of the congestion information collection node deletes the information regarding the local node that is the transmission source of the completion notification packet from the record of the using node in the route table.

Figure 23:
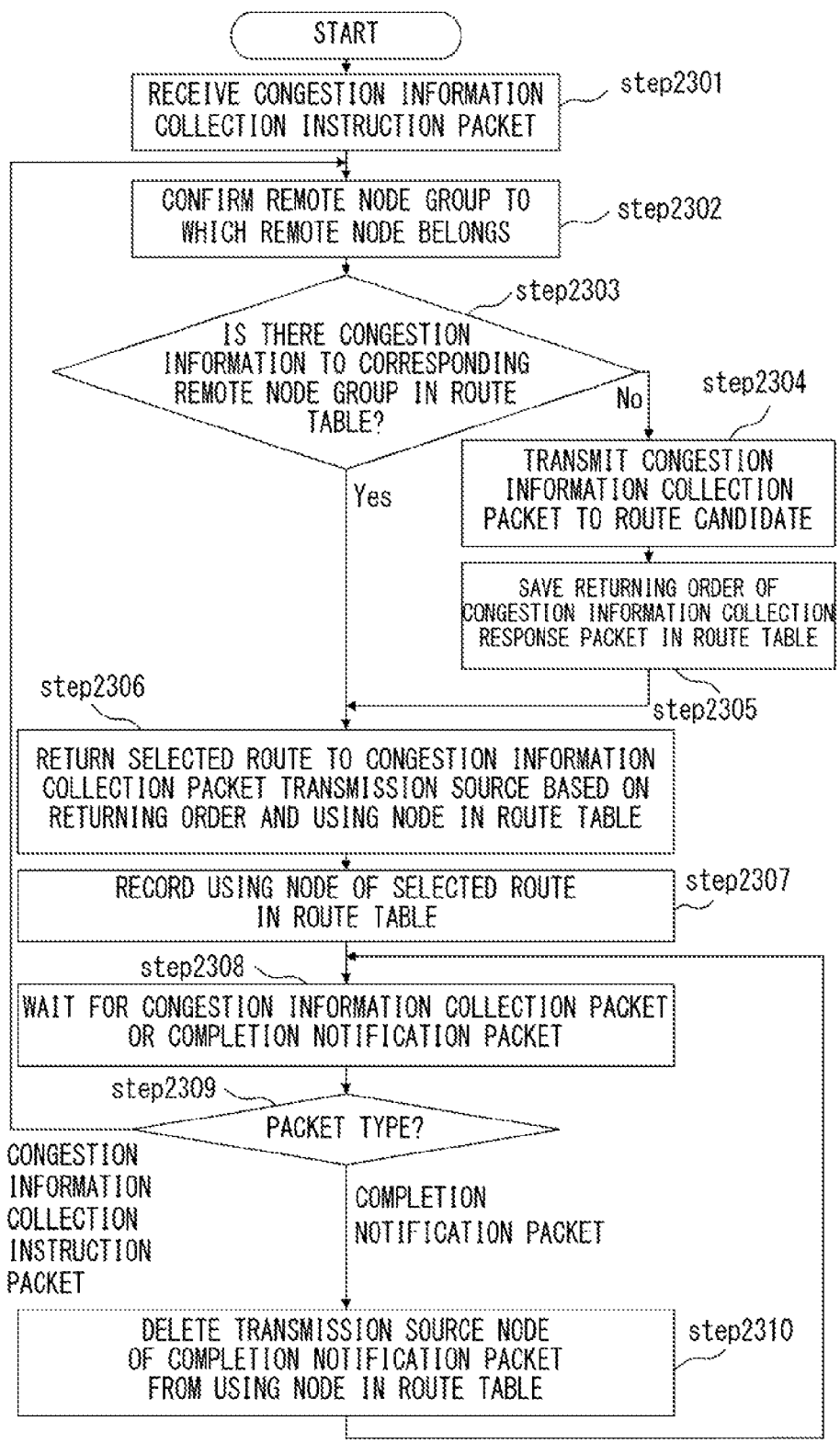
FIG. 23 is a flowchart of processes performed by a control unit of a network interface device of a congestion information collection node according to the third embodiment.

FIG. 23 is a flowchart of processes performed by the control unit of the network interface device of the congestion information collection node according to the third embodiment.

In step 2301 in FIG. 23, when the control unit 3021 receives a congestion information collection instruction packet from the local node, processes in and after step 2302 for congestion information are started. The congestion information collection instruction packet includes instructions about a remote node, route candidates, a route selection and the like.

In step 2302, the control unit 3021 refers to the congestion information collection instruction packet to confirm the remote node group to which the remote node targeted for congestion information collection belongs. For example, in the route table illustrated in FIG. 17, whether the remote node group is in the group 1 is confirmed.

In step 2303, if the remote node group to which the remote node targeted for congestion information collection belongs is not in the route table, the process proceeds to step 2304.

In step 2304, the control unit 3021 transmits a congestion information collection packet to the route candidate specified by the congestion information collection instruction packet, and starts collection of congestion information.

In step 2305, upon receiving the congestion information collection response packet from the remote node, the control unit 3021 saves congestion information such as the returning order and the like included in the received congestion information collection response packet, in the route table, and the process proceeds to step 2306.

In step 2303, if the remote node group to which the remote node targeted for congestion information collection belongs is in the route table, the process proceeds to step 2306.

In step 2306, the control unit 3021 refers to the route table, and selects the route according to the route selection instruction. In the example of the route table illustrated in FIG. 17, the control unit 3021 refers to the returning order and the using nodes in the route table, and selects the route according to the route selection instruction specified by the route selection packet.

For example, it is assumed that the route selection instruction specified by the route selection packet is an instruction regarding the k-th when listed in returning order (k is an integer among 1 to the number n of the routes for which congestion information has been collected) and the threshold value for the number of using nodes. The process performed by the control unit 3021 in the case of this route selection instruction is the same as the process performed by the control unit 2021 according to the second embodiment described above referring to FIG. 20A and FIG. 20B.

When the route is selected according to the route selection instruction, the control unit 3021 returns a route packet including information regarding the selected route to the local node that is the transmission source of the congestion information collection instruction packet, and the process proceeds to step 2307.

In step 2307, the control unit 3021 records information regarding the local node that uses the selected route in the route table, and the process proceeds to step 2308.

In step 2308, the control unit 3021 waits to receipt the congestion information collection instruction packet or the completion notification packet.

If the control unit receives the congestion information collection instruction packet in step 2309, the process returns to step 2302.

If the control unit receives the completion notification packet in step 2309, the process proceeds to step 2310.

In step 2310, the control unit 3021 deletes the information regarding the local node that is the transmission source of the completion notification packet from the record of using nodes in the route table.

As described above, in the parallel computer according to the third embodiment, based on the specification of the route selection instruction by the arithmetic processing device of the local node in a local node group, the network interface device of the congestion information collection node in the local node group selects the route. For this reason, the latency of the route selection by the arithmetic processing device may be reduced.

Furthermore, in the parallel computer according to the third embodiment, the congestion information collection node collects congestion information in the local node group together. For this reason, congestion information and the usage status of routes may be shared in the local node group, and communication routes may be diversified.

Then, in a case in which the timing to collect congestion information is the time when the arithmetic processing device issues an instruction for communication start, compared with the case of the time when the arithmetic processing device issues an instruction for congestion information collection ahead of the communication start, the number of transmission/reception of packets between the local node and the congestion information collection node may be reduced. For this reason, the latency of routing may be reduced.

In addition, in a case in which the route selection instruction specified by the arithmetic processing device of the local node is an instruction regarding the returning order of congestion information collection response packet for example, the arithmetic processing device of the local node may issue an instruction for communication start without need to wait until congestion information collection response packets corresponding to all the route candidate are returned. For this reason, the usage efficiency of the arithmetic processing device of the local node does not decrease.

Then, in a case in which the congestion information is the returning order of congestion information collection response packets for example, the communication time for the return from the remote node to the local node is also reflected. For this reason, appropriate route selection may be performed also in a case of communication in which the remote node transmits a message, such as Get communication.

[d] Fourth Embodiment

In the first embodiment, the interface apparatus of the local node selects, after collecting congestion information, the route to be used for communication based on the collected congestion information. In addition, in the second and third embodiments, the network interface device of the congestion information collection node in a local node group selects, after collecting the congestion information, the route to be used for communication based on the collected congestion information.

In contrast, in the fourth embodiment, the network interface device of the local node (or the network interface device of the congestion information collection node) repeats collection of congestion information at a predetermined time interval after collecting congestion information, and changes the route to be used for communication based on newly collected congestion information.

Meanwhile, in the description of the fourth embodiment below, the description is made with an example of a parallel computer in which the network interface device of the local node performs collection of congestion information and route selection, such as the parallel computer according to the first embodiment. However, the fourth embodiment may also be realized in a parallel computer in which the network interface device of the congestion information collection node in a local node group performs collection of congestion information and route selection such as the parallel computer according to the second and third embodiments.

The configuration of the parallel computer according to the fourth embodiment may be the same as the configuration of the parallel computer illustrated in FIG. 1.

Each node constituting the parallel computer according to the fourth embodiment becomes the local node and the remote node depending on which node performs communication to which node. Therefore, each node has configuration that may be either of the local node and the remote node.

Figure 24:
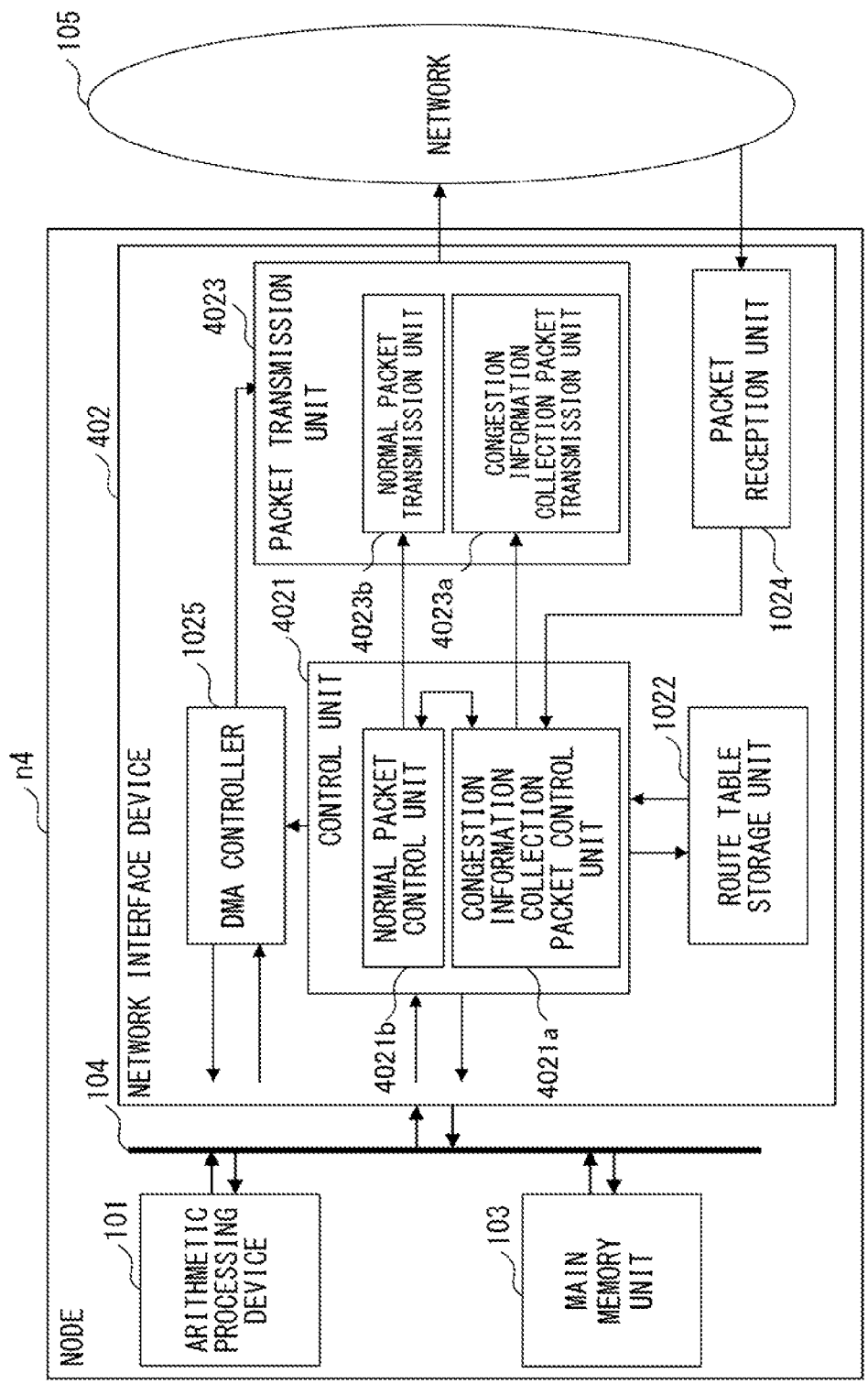
FIG. 24 is a configuration diagram of a node in a case in which a node according to the fourth embodiment is a local node.

FIG. 24 is the configuration diagram of a node in a case in which the node according to the fourth embodiment is the local node. The same reference numbers are assigned in FIG. 24 to the same constituent elements as the constituent elements of the node n1 according to the first embodiment illustrated in FIG. 5. Meanwhile, the configuration of the node in a case in which the node n4 of the parallel computer according to the fourth embodiment is the remote node is same as in the first embodiment described above with the illustration of FIG. 5.

As illustrated in FIG. 24, in the fourth embodiment, a control unit 4021 of the network interface device 402 includes a congestion information collection packet control unit 4021a and a normal packet control unit 4021b.

The congestion information collection packet control unit 4021a processes the congestion information collection packet based on the congestion information collection instruction from the arithmetic processing device 101. That is, the congestion information collection packet control unit 4021a generates a configuration information collection packet based on the congestion information collection instruction from the arithmetic processing device 110, and instructs the congestion information collection packet transmission unit 4023a to transmit the generated congestion information collection packet. Then, the congestion information collection packet control unit 4021a receives from the packet reception unit 1024 a congestion information collection response packet returned from the destination node, and stores the collected congestion information in the route table of the route table storage unit 1022.

The normal packet control unit 4021b processes a normal packet based on the instruction for communication start from the arithmetic processing device 101. The normal packet is a packet other than the congestion information collection packet, such as a packet transmitted upon communication. The normal packet control unit 4021b instructs the normal packet transmission unit 4023b to transmit a normal packet using the route selected by the congestion information collection packet control unit 4021a based on the route table, based on the communication start instruction from the arithmetic processing device 101.

As illustrated in FIG. 24, in the fourth embodiment, the packet transmission unit 4023 in the network interface device 402 includes a congestion information collection packet transmission unit 4023a and a normal packet transmission unit 4023b.

The congestion information collection packet transmission unit 4023a transmits a congestion information collection packet to another node n4 via the network 105 based on the instruction from the congestion information collection packet control unit 4021a.

The normal packet transmission unit 4023b transmits a normal packet to another node n4 via the network 105 based on the instruction from the normal packet control unit 4021b.

The configuration and operation of the switch according to the fourth embodiment is the same as the configuration and operation of the switch s1 according to the first embodiment described above.

Processes performed by the node n4 according to the fourth embodiment illustrated in FIG. 24 are described below with reference to FIG. 25.

Figure 25:
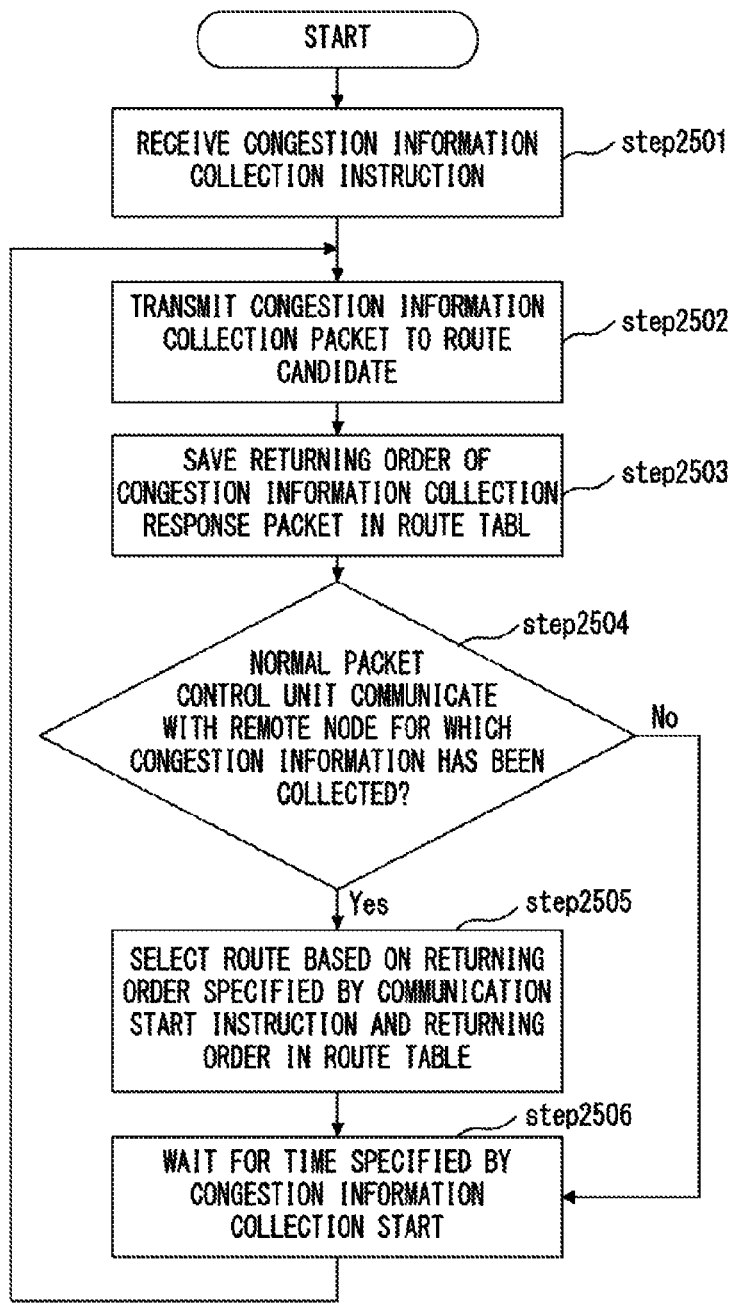
FIG. 25 is a flowchart of processes performed by a node according to the fourth embodiment.

FIG. 25 is a flowchart of processes performed by the node according to the fourth embodiment.

In step 2501 in FIG. 25, upon receiving an instruction for congestion information collection from the arithmetic processing device 101, the congestion information collection packet control unit 4021a of the local node starts processes in and after step 2502. The instruction for congestion information collection by the arithmetic processing device 101 includes instructions regarding remote node, route candidates, and the interval to collect congestion information.

In step 2502, the congestion information collection packet control unit 4021a generates a congestion information collection packet. Then, the congestion information collection packet control unit 4021a transmits the generated congestion information collection packet to the route candidate specified by the instruction from the arithmetic processing device 101, via the congestion information collection packet transmission unit 4023a. These processes performed by the congestion information collection packet control unit 4021a are the same as the processes performed by the control unit 1021 of the node n1 according to the first embodiment. In addition, the congestion information collection packet is the same as in the first embodiment described with reference to FIG. 9.

The network interface device of the remote node that received the congestion information collection packet generates a congestion information collection response packet. Then, the network interface device of the remote node returns the congestion information collection response packet to the local node. These processes are the same as the processes performed by the network control unit 102 of the remote node according to the first embodiment. In addition, the congestion information collection response packet is the same as in the first embodiment described with reference to FIG. 9.

In step 2503, the congestion information collection packet control unit 4021a of the local node receives the congestion information collection response packet via the packet reception unit 1024. Then, the congestion information collection packet control unit 4021a records the congestion information such as the returning order in the route table. These processes performed by the congestion information collection packet control unit 4021a are the same as the processes performed by the control unit 1021 of the node n1 according to the first embodiment. In addition, in a case in which congestion information to be collected is the returning order for example, the configuration of the route table according to the fourth embodiment may be the same as the route table illustrated in FIG. 10.

In step 2504, the congestion information collection packet control unit 4021a checks with the normal packet control unit 4021b as to whether communication is being performed with the remote node for which congestion information has been collected.

As a result of the check in step 2504, if the normal packet control unit 4021b is performing communication with the remote node for which congestion information has been collected, the process proceeds to step 2505.

In step 2505, the congestion information collection packet control unit 4021a refers to the route table, and selects again the route according to the route selection instruction specified by the arithmetic processing device 101 upon communication start of a normal packet. For example, the congestion information collection packet control unit 4021a selects again the route by the returning order specified by the arithmetic processing device 101. Then, the congestion information collection packet control unit sends the information regarding the route selected again, to the normal packet control unit 4021b. The normal packet control unit 4021b performs communication using the route selected again, and the process proceeds to step 2506.

As a result of the check in step 2504, if the normal packet control unit 4021b is not performing communication with the remote node for which congestion information has been collected, the process proceeds to step 2506.

In step 2506, the congestion information collection packet control unit 4021a waits for a predetermined time specified in the congestion information collection instruction from the arithmetic processing device 101. After the predetermined time has passed, the process returns to step 2502, and the processes in and after step 2502 are repeated.

As described above, in the parallel computer according to the fourth embodiment, the network interface device selects the route based on the specification method of the route selection from the arithmetic processing device. For this reason, the latency of the route selection may be reduced.

In addition, in the parallel computer according to the fourth embodiment, the communication and the collection for congestion information are separated. For this reason, a congestion information collection packet may be sent while communication is being performed, and the route may be changed based on the collected congestion information while communication is being performed.

Furthermore, in the fourth embodiment, the congestion information collection packet control unit collects congestion information at a predetermined interval, and selects the route again. For this reason, change in the congestion status during while communication is being performed may also be handled.

In addition, in a case in which the route selection instruction specified by the arithmetic processing apparatus is an instruction regarding the returning order of the congestion information collection response packet for example, the arithmetic processing device may issue an instruction for communication start without need to wait until congestion information collection response packet corresponding to all the route candidates are returned. For this reason, the usage efficiency of the arithmetic processing device does not decrease.

In addition, if the congestion information is the returning order of the congestion information collection response packet, the communication time for the return from the remote node to the local node is also reflected. For this reason, appropriate route selection may be performed also in a case of communication in which the remote node transmits a message, such as Get communication.

In the description of the present embodiment above, the description is made with an example of a case in which the network interface device of the local node performs collection of congestion information and route selection, such as the parallel computer according to the first embodiment. However, the fourth embodiment may be realized as follows also in a parallel computer in which the network interface device of the congestion information collection node in a local node group performs collection of congestion information and route selection, such as the parallel computer according to the second and third embodiments.

That is, for example, the control unit 2021 of the congestion information collection node according to the second embodiment is assumed to be the same as the control unit 4021 of the local node according to the fourth embodiment. In addition, it is assumed that the update interval of congestion information is specified by the congestion information collection instruction packet transmitted from the local node in the local node group. Then, by the same processes as in the present embodiment, the network interface device 2021 of the congestion information collection node collects congestion information and updates the route table at a predetermined interval. After the update of the route table, if the node source transmitting the congestion information collection instruction packet is in the using nodes in the route table, the control unit 2021 of the congestion information collection node selects the route again, and returns a route packet including information regarding the route selected again, to the local node that is the transmission source of the congestion information collection instruction packet. Upon receiving the route packet, the network interface device 2021 of the local node performs change to the route specified by the route packet.

[e] Fifth Embodiment

In the first through fourth embodiments, the congestion information is the returning order of the route candidate from the transmission of the congestion information collection packet until the return of the congestion information collection response packet.

In contrast, in the fifth embodiment, the congestion information is the response time from transmission of the congestion information collection packet until the return of the congestion information collection response packet.

Meanwhile, in the description of the fifth embodiment below, the description is made with an example of a parallel computer in which the network interface device of the local node performs collection of congestion information and route selection, such as the parallel computer according to the first embodiment. However, the fifth embodiment may also be realized in a parallel computer in which the network interface device of the congestion information collection node in a local node group performs collection of congestion information and route selection, such as the parallel computer according to the second and third embodiments.

The configuration of the parallel computer according to the fifth embodiment may be the same as the configuration of the parallel computer illustrated in FIG. 1.

Each node constituting the parallel computer according to the fifth embodiment becomes the local node and the remote node depending on which node performs communication to which node. Therefore, each node has configuration that may be either of the local node and the remote node.

Figure 26:
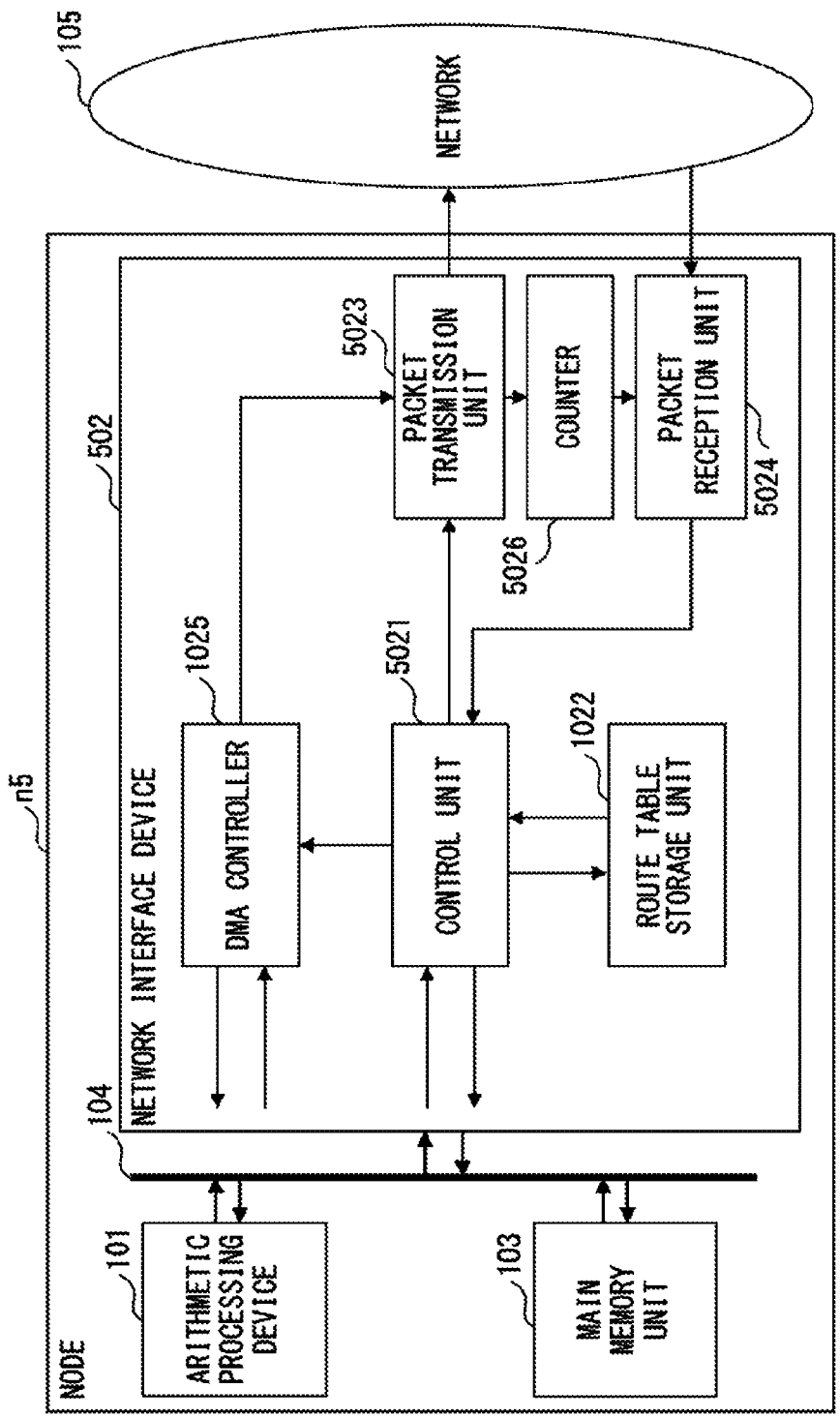
FIG. 26 is a configuration diagram of a node in a case in which a node according to the firth embodiment is a local node.

FIG. 26 is the configuration diagram of a node in a case in which the node according to the fifth embodiment is the local node. The same reference numbers are assigned in FIG. 26 to the same constituent elements as the constituent elements of the node n1 according to the first embodiment illustrated in FIG. 5. Meanwhile, the configuration of the node in a case in which the node of the parallel computer according to the fifth embodiment is the remote node is the same as in the first embodiment described above with the illustration of FIG. 5.

As illustrated in FIG. 26, the node n5 according to the fifth embodiment includes a counter 5026. The response time from the transmission of the congestion information collection packet until the return of the congestion information collection response packet is measured using the counter 5026.

The configuration and operation of the switch according to the fifth embodiment are same as the configuration and operation of the switch s1 according to the first embodiment.

In the fifth embodiment, a control unit 5021 of a network interface device 502 of the local node receives a congestion information collection instruction from the arithmetic processing device 101. The congestion information collection instruction by the arithmetic processing device 101 includes instructions regarding the remote node and the route candidate.

The control unit 5021 that received the congestion information collection instruction from the arithmetic processing device 101 generates a congestion information collection packet. Then, the control unit 5021 sends an instruction to the packet transmission unit 5023 to transmit the congestion information collection packet. These processes performed by the control unit 5021 according to the firth embodiment are the same as the processes performed by the control unit 1021 according to the first embodiment.

The packet transmission unit 5023 that received the transmission instruction for the congestion information collection packet puts a counter value in the congestion information collection packet when transmitting the congestion information collection packet. The network interface device of the remote node that received the congestion information collection packet puts the counter value in the congestion information collection response packet as it is and returns it to the local node.

FIG. 27 is a diagram illustrating fields of a congestion information collection packet and the congestion information collection response packet according to the fifth embodiment.

Meanwhile, the same reference numbers are assigned in FIG. 24 to the same fields as in the congestion information collection packet and the congestion information collection response packet according to the first embodiment illustrated in FIG. 9.

As illustrated in FIG. 27, the congestion information collection packet and the congestion information collection response packet according to the fifth embodiment further have a field 2706 that includes a counter value.

Upon receiving the congestion information collection response packet from the remote node, the packet reception unit 5024 of the local node obtains the current counter value from the counter 5026, and transmits the obtained counter value and the received congestion information collection response packet to the control unit 5021. The control unit 5021 calculates the difference between the current counter value and the counter value included in the congestion information collection response packet. By this calculation, the control unit 5021 may measure the response time for the route candidate from the transmission of the congestion information collection packet until the return of the congestion information collection response packet.

After measuring the response time, the control unit 5021 records the response time and the response time order in the route table in the route table storage unit 1022.

FIG. 28 is an example of the route table according to the fifth embodiment. In the example of the route table illustrated in FIG. 28, route candidates and their response time are presented in order of the response time.

In the route table illustrated in FIG. 28, the route candidates are indicated as a route 1, route 2, ..., and route n. However, when each route candidate is specified by the relay node and the dimension order, the route 1, route 2, ..., and route n may be indicated by the relay node and the dimension order of each route.

Next, the process in which the local node n5 of the parallel computer according to the fifth embodiment starts communication is described.

In the parallel computer according to the fifth embodiment, when starting communication to the remote node for which congestion information has been collected, the arithmetic processing device 101 of the local node transmits a communication start instruction to the control unit 5021 of the network interface device 502. The communication start instruction performed by the arithmetic processing device 101 includes the remote node address, the type of communication, the storage location of the message if transmitting a message, and the response time order as a route selection instruction.

The control unit 5021 refers to the route table according to the response time order specified as the route selection instruction. The control unit 5021 selects the corresponding route from the route table, and starts communication using the selected corresponding route.

As described above, in the parallel computer according to the fifth embodiment, the network interface device selects the route based on the specification method of the route selection from the arithmetic processing device. For this reason, the latency of the route selection may be reduced.

Furthermore, in the fifth embodiment, the congestion information is the response time from the transmission of the congestion information collection packet to the return of the congestion information collection response packet. For this reason, more accurate congestion information compared with a case in which the congestion information is the returning order may be collected, eliminating the temporal effect due to whether the order to transmit to the congestion information collection packet is early or late when collecting congestion information for a plurality of route candidates.

Then, in the fifth embodiment, since the congestion information is the response time order of the congestion information collection response packet, the communication time for the return from the remote node to the local node is also reflected. For this reason, appropriate route selection may be performed also in a case of communication in which the remote node transmits a message, such as Get communication.

In the description of the fifth embodiment above, the description is made with an example of a case in which the network interface device of the local node performs collection of congestion information and route selection, such as the parallel computer according to the first embodiment. However, the fifth embodiment may be realized as follows also in a parallel computer in which the network interface device of the congestion information collection node in a local node group performs collection of congestion information and route selection, such as the parallel computer according to the second and third embodiments.

That is, for example, the same counter 5026 as in the network interface device 502 of the local node according to the fifth embodiment described above is provided in the network interface device 202 of the congestion information collection node according to the second embodiment. Then, the process flow of the control unit 2021 of the congestion information collection node according to the second embodiment in collecting the congestion information is made to be the same as the process flow of the control unit 5021 of the local node according to the fifth embodiment.

Furthermore, when realizing the fifth embodiment described above in the parallel computer according to the second and third embodiment, a route selection instruction may be adopted as follows. That is, the route selection instruction is assumed as an instruction regarding the k-th when listed in response time order (k is an integer among 1 to the number n of the routes for which congestion information has been collected) and the threshold value for the difference between the response times for the routes that are the route candidates.

In this case, if there is no node using the k-th route or if the difference between the response time for k-th route and the response time of the k+1th route exceeds the threshold value even though there is an node using k-th route, the k-th route is selected. If there is a node using the route and the difference between the response times for them does not exceed the threshold value, afterwards, in the same manner, whether or not there is a node using the k+1th route and whether or not the difference between the response time for the k+1th route and the response time for the k+2th exceeds the threshold value are checked. Then, if no route can be selected even by checking whether or not there is a node using n−1th route and whether or not the difference between the response time for the n−1th route and the response time for the n-th route exceeds the threshold value, the k-th route is selected.

[f] Sixth Embodiment

As described above, the parallel computer in which the network interface device of the local node performs collection of congestion information and route selection such as the parallel computer according to the first embodiment may be realized in a case other than those described in the first, fourth and fifth embodiments. In addition, the parallel computer in which the network interface device of the congestion information collection node in a local node group performs collection of congestion information and route selection such as the parallel computer according to the second and third embodiments may be realized in a case other than those described in the second through fifth embodiments.

Therefore, as the sixth embodiment, the following case is described further. That is, the timing to collect congestion information is assumed as the time when the arithmetic processing device issues an instruction for congestion information collection. As for the type of the route candidate, it is assumed that the outbound and inbound routes that packets go through between the local node and the remote node are different. The congestion information is assumed as the buffer usage amount of a transit switch that a packet goes through. The method to obtain congestion information is assumed to be collection by going through a dedicated route in the switch. As for units in which congestion information is obtained and the route selection information, it is assumed that the outbound and inbound routes that the packet goes through between the local node and the remote node are different. The route selection is assumed to be performed based on the order of the buffer usage amount and the communication type.

Meanwhile, in the description of the sixth embodiment below, the description is made with an example of a parallel computer in which the network interface device of the local node performs collection of congestion information and route selection, such as the parallel computer according to the first embodiment. However, the sixth embodiment may also be realized in a parallel computer in which the network interface device of the congestion information collection node in a local node group performs collection of congestion information and route selection, such as the parallel computer according to the second and third embodiments.

The configuration of the parallel computer according to the sixth embodiment may be the same as the configuration of the parallel computer illustrated in FIG. 1.

Each node constituting the parallel computer according to the sixth embodiment becomes the local node and the remote node depending on which node performs communication to which node. Therefore, each node has configuration that may be either of the local node and the remote node.

Figure 29:
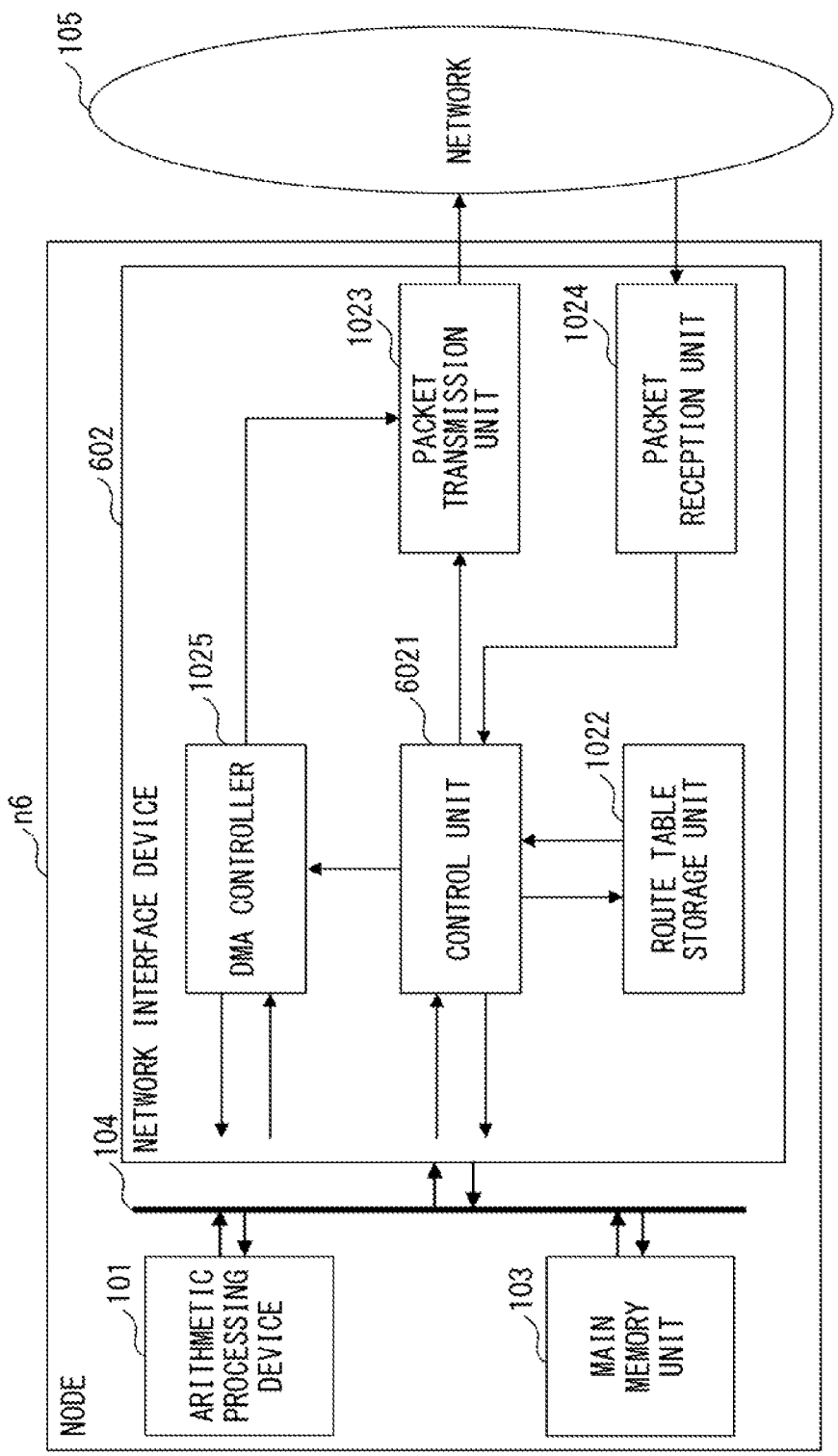
FIG. 29 is a configuration diagram of a node according to the sixth embodiment.

FIG. 29 is a configuration diagram of a node according to the sixth embodiment. The same reference numbers are assigned in FIG. 29 to the same constituent elements as the constituent elements of the node n1 according to the first embodiment illustrated in FIG. 5.

In the sixth embodiment, a control unit 6021 in each network interface device 601 of the local node and the remote node is configured to perform processes as follows.

In the sixth embodiment, the control unit 6021 of the local node receives a congestion information collection instruction from the arithmetic processing device 101, and starts processing congestion information.

The congestion information collection instruction by the arithmetic processing device 101 includes instructions regarding the remote node and the route candidate. The specification of the route candidate by the arithmetic processing device 101 is performed, for example, by specifying a relay node in the route between the local node and the remote node, and specifying by the order of dimension in dimension order routing the method to decide the route between the local node and the relay node and the route between the relay node and the remote node.

In addition, in the sixth embodiment, the route candidate is specified by the arithmetic processing device 101 so that the outbound route and the inbound route that packets go through are different. Meanwhile, the outbound route refers to the route through which the packet goes from the local node to the remote node. In addition, the inbound route refers to the route through which the packet goes from the remote node to the local node.

The control unit 6021 of the local node that received the congestion information collection instruction from the arithmetic processing device 101 generates a congestion information collection packet, and transmits the generated congestion information collection packet to the remote node via the packet transmission unit 1023 using the outbound route.

The control unit 6021 of the remote node that received the congestion information collection packet generates a congestion information collection response packet. Then, the control unit 6021 of the remote node sends back the congestion information collection response packet to the local node using the inbound route specified by the congestion information collection packet.

Figure 30:
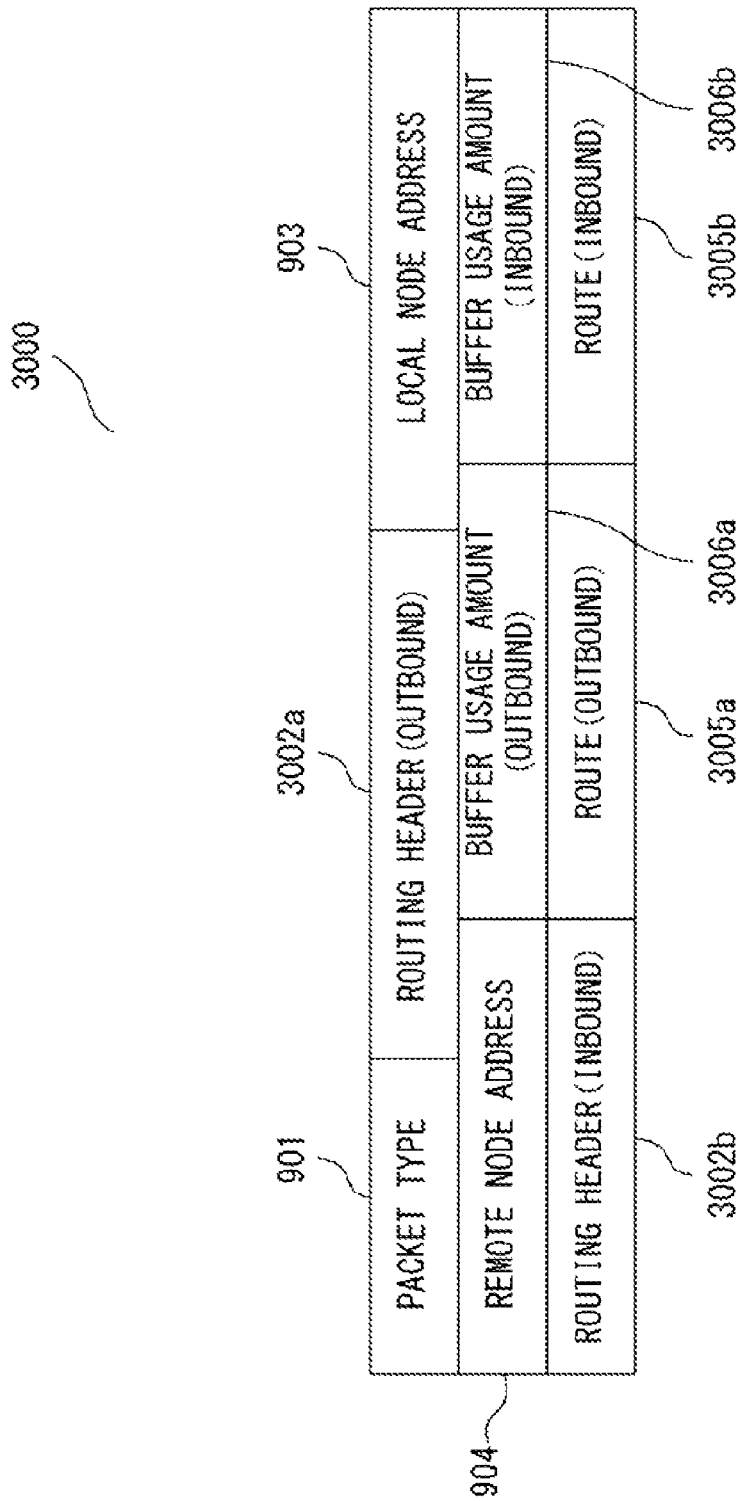
FIG. 30 is a diagram illustrating fields of a congestion information collection packet and a congestion information collection response packet according to the sixth embodiment.

FIG. 30 is a diagram illustrating fields of the congestion information collection packet and the congestion information collection response packet according to the sixth embodiment. Meanwhile, the same reference numbers are assigned in FIG. 30 to the same fields as in the congestion information collection packet and the congestion information collection response packet according to the first embodiment illustrated in FIG. 9.

In the sixth embodiment, the route candidate is specified so that the outbound and inbound routes that the packets go through are different. In addition, the congestion information is the buffer usage amount of the transit switch that the packet goes through.

Therefore, as illustrated in FIG. 30, the congestion information collection packet and the congestion information collection response packet further have fields including an outbound route 3005a, a inbound route 3005b, an outbound routing header 3002a, a inbound routing header 3002b, an outbound buffer usage amount 3006a, and a inbound buffer usage amount 3006b.

In a packet field 3000 illustrated in FIG. 30, the outbound route 3005a is a field that includes a route for the congestion information collection packet from the local node to the remote node. In addition, the inbound route 3005b is a field that includes the route for the congestion information collection response packet from the remote node to the local node.

The outbound buffer usage amount 3006a is a field that includes the buffer usage amount in the switch on the route that the congestion information collection packet goes through. In the case of the congestion information collection packet, the switch that the congestion information collection packet goes through adds the buffer usage amount of the port that the congestion information collection packet goes through, to the outbound buffer usage amount 3006a of the congestion information collection packet.

The inbound buffer usage amount 3006b is a field that includes the buffer usage amount in the switch on the route that the congestion information collection response packet goes through. In the case of the congestion information collection response packet, the switch on the route that the congestion information collection response packet goes through adds the buffer usage amount of the port that the congestion information collection response packet goes through, to the inbound buffer usage amount 3006b of the congestion information collection response packet.

The outbound routing header 3002a is a field that specifies the route from the local node to the remote node. For example, when the outbound route is specified by the relay node and the dimension order, information for these is included in the outbound routing header 3002a. The switch on the route of the congestion information collection packet refers to the outbound routing header 3002a to decide the port for transmission.

The inbound routing header 3002b in the packet field is a field that specifies the route from the remote node to the local node. For example, when the inbound route is specified by the relay node and the dimension order, information for these is included in the inbound routing header. The switch on the route of the congestion information collection response packet refers to the inbound routing header 3002b to decide the port for transmission.

The control unit 6021 of the local node waits for the congestion information collection response packet sent from the remote node. Upon receiving the congestion information collection response packet via the packet reception unit 1024, the control unit 6021 records the congestion information included in the congestion information collection response packet, in the route table of the route table storage unit 1022. In the sixth embodiment, the congestion information to be recorded is the buffer usage amount for each of the outbound route and the inbound route.

FIG. 31 is an example of a route table according to the sixth embodiment.

As illustrated in FIG. 31, in the route table, the buffer usage amount and the order of the buffer usage amount is recorded for each of the outbound route and the inbound route.

Next, when starting communication after collecting congestion information, the arithmetic processing device 101 of the local node transmits a communication start instruction to the control unit 6021. The communication start instruction by the arithmetic processing device 101 includes the remote node address, the type of communication, the storage location of the message if transmitting a message, and a route selection instruction. In the present embodiment, as the route selection instruction, the order of the buffer usage amount and the type of communication are specified by the arithmetic processing device 101.

If the type of communication specified by the arithmetic processing device 101 is communication in which the local node transmits a message to the remote node, such as Put communication, the control unit 6021 refers to the route table, and selects the route from the outbound routes based on the order when listing the buffer usage amounts.

In addition, if the type of communication specified by the arithmetic processing device 101 is communication in which the remote node sends a message to the local node, such as Get communication, the control unit 6021 refers to the route table, and selects the route from the inbound routes based on the order when listing the buffer usage amounts.

According to the present invention, the network interface device may select the route based on information only for the outbound route or the inbound route of the message.

In addition, according to the present invention, by transmitting the congestion information collection packet, congestion information for communication in which the local node transmits a message to the remote node, such as Put communication, and congestion information for communication in which the remote node transmits a message to the local node, such as Get communication, may be collected at one time.

Next, the configuration and the operation of the switch of the parallel computer according to the sixth embodiment are described.

In the sixth embodiment, the route that the congestion information collection packet and the congestion information collection response packet go through in the switch and the route that a normal packet other than these packets goes through in the switch are made to be different.

FIG. 32 is a configuration diagram of a switch according to the sixth embodiment.

While FIG. 32 illustrates the switch in a case in which each node is connected to a one-dimensional network, when configuring a multi-dimensional network, a switch s6 illustrated in FIG. 32 has a configuration in which the ports illustrated in FIG. 32 are increased.

As illustrated in FIG. 32, in the switch s6, a port to connect to the network interface and a port to connect to another switch is included.

In FIG. 32, in order to make the description clear, only the transmission unit or the reception unit is illustrated in each port p4, p5, p6. However, each port p4, p5, p6 has both units of the transmission unit and the reception unit respectively including the congestion information packet processing unit and the normal packet processing unit.

In a transmission unit t4 of the port, a congestion information packet processing unit t4a and a normal packet processing unit t4b are included. In addition, in reception units r5, r6 of the ports, congestion information packet processing units r5a, r6a and normal packet processing units r5b, r6b are included.

The congestion information packet processing units t4a, r5a, r6a are units to process the congestion information collection packet and the congestion information collection response packet. In the congestion information packet processing units t4a, r5a, r6a, control units t4ac, r5ac, r6ac and buffers t4ab, r5ab, r6ab are included.

The normal packet processing units t4b, r5b, r6b are units to process a normal packet other than the congestion information collection packet and the congestion information collection response packet. In the normal packet processing units t4b, r5b, r6b, control units t4bc, r5bc, r6bc and buffers t4bb, r5bb, r6bb are included.

FIG. 32 illustrates a case in which transmission/reception of a packet is performed between the control unit t4ac of the congestion information packet processing unit of the transmission unit of the port p4 and the control unit r5ac, r6ac of the reception unit of the congestion information packet processing unit of the port p5, p6, as an example. In addition, FIG. 32 illustrates a case in which transmission/reception of a packet is performed between the control unit t4bc of the normal packet processing unit of the port p4 and the control unit r5bc, r6bc of the reception unit of the normal packet processing unit of the port p5, p6, as an example.

In the switch s6 according to the sixth embodiment, a packet received from the network interface device 602 outside the switch or from another switch s6 is assigned to the normal packet processing unit or the congestion information collection packet processing unit of the transmission unit of the port p4, p5, p6 and processed.

Processes performed by the normal packet control unit are same as the processes performed by the switch according to the first embodiment described above with reference to FIG. 12.

As for processes performed by the congestion information packet processing unit, in step 1202 in FIG. 12, a process as follows is added. That is, in step 1202 in FIG. 12, when updating the routing header, the buffer usage amount of the buffer that is in the normal packet processing unit is added to the field of the buffer usage unit in the congestion information collection packet being processed or the field of the buffer usage unit in the congestion information collection response packet being processed. Processes performed by the congestion information packet processing unit after the buffer usage amount is added are same as the processes performed by the switch according to the first embodiment described above with reference to FIG. 12.

As illustrated in FIG. 32, the congestion information collection packet and the congestion information collection response packet go through a route that is different from that for a normal packet, and the buffer usage amount of each port is added to the field of the buffer usage amount of these packets.

According to the switch according to the sixth embodiment, the effect that the congestion information collection packet and the congestion information collection response packet for collecting congestion information have on other communication may be reduced.

Meanwhile, in the description of the sixth embodiment above, the description is made with an example of a case in which the network interface device of the local node performs collection of congestion information and route selection, such as the parallel computer according to the first, fourth and fifth embodiments. However, the sixth embodiment may be realized also in a parallel computer in which the network interface device of the congestion information collection node in a local node group performs collection of congestion information and route selection, such as the parallel computer according to the second and third embodiments.

That is, the processes performed by the local node of the parallel computer according to the second and third embodiments are changed in accordance with the processes performed by the arithmetic processing device of the local node according to the present embodiment. The processes performed by the congestion information collection node of the parallel computer according to the second and third embodiments are changed in accordance with the processes performed by the network interface device of the local node according to the present embodiment. The processes performed by the remote node of the parallel computer according to the second and third embodiments are changed in accordance with the processes performed by the network interface device of the remote node according to the present embodiment. The processes performed by the switch of the parallel computer according to the second and third embodiments are changed according to the processes performed by the switch according to the present embodiment.

[g] Seventh Embodiment

In the parallel computer according to each of the first through sixth embodiments described above, the network interface device of the local node (or the network interface device of the congestion information collection node) performs the process to collect congestion information after transmitting a congestion information collection packed until receiving a congestion information collection response packet.

In the parallel computer according to the seventh embodiment, the condition for finishing the congestion information collection performed by the network interface device of the local node (or the network interface device of the congestion information collection node) is set.

In the description of the seventh embodiment below, a case in which the number of packets of the received congestion information collection response packet, and the timeout value from the transmissions of the congestion information collection packet until the reception of the congestion information collection response packet are set as the condition for finishing the congestion information collection is described.

In addition, in the description of the seventh embodiment below, the description is made with an example of a parallel computer in which the network interface device of the local node performs collection of congestion information and route selection, such as the parallel computer according to the first embodiment. However, the seventh embodiment may also be realized in a parallel computer in which the network interface device of the congestion information collection node in a local node group performs collection of congestion information and route selection, such as the parallel computer according to the second and third embodiments.

The configuration of the parallel computer according to the seventh embodiment may be the same as the configuration of the parallel computer illustrated in FIG. 1.

Each node constituting the parallel computer according to the seventh embodiment becomes the local node and the remote node depending on which node performs communication to which node. Therefore, each node has configuration that may be either of the local node and the remote node.

Figure 33:
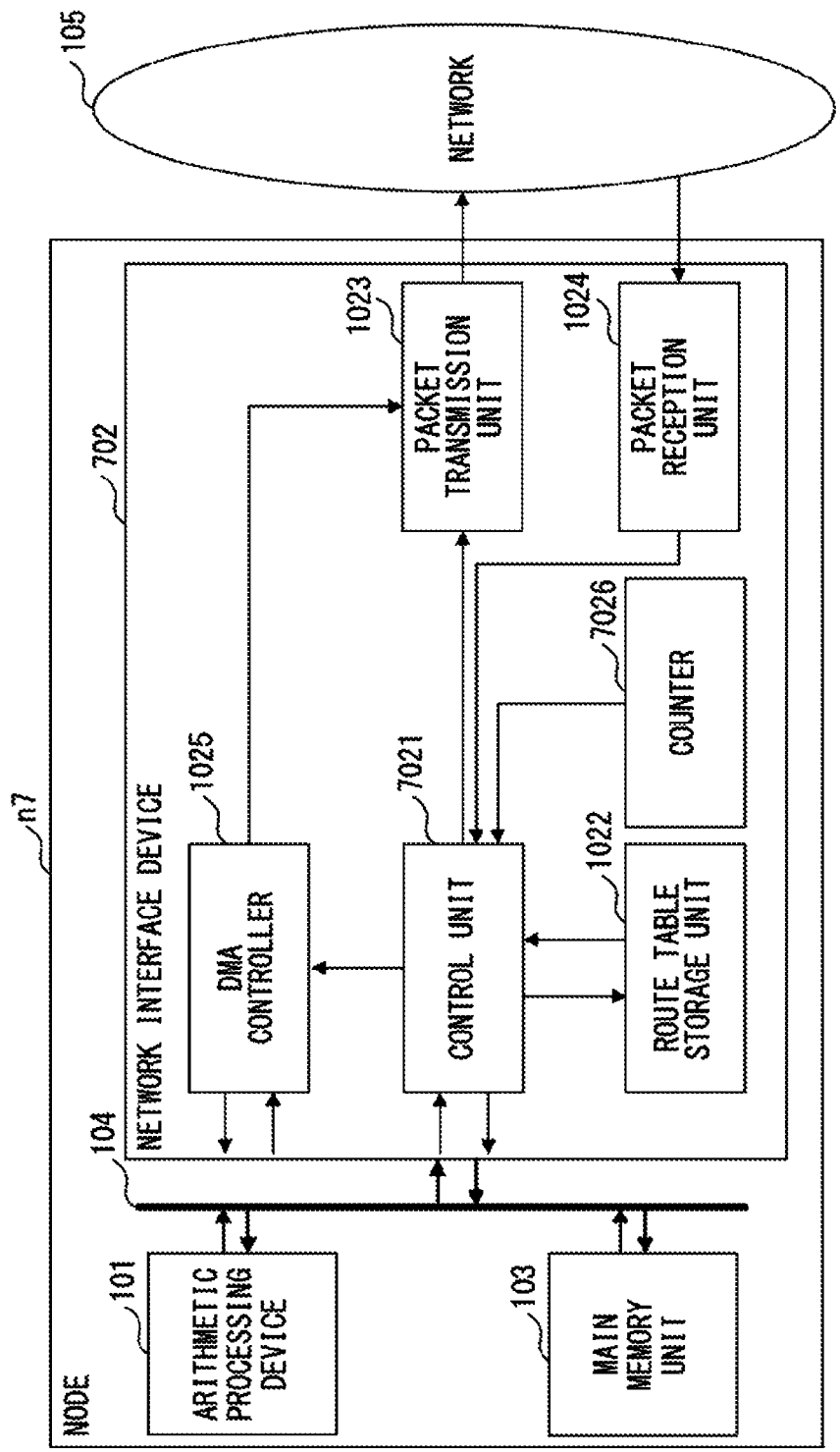
FIG. 33 is a configuration diagram of a node in a case in which a node according to the seventh embodiment is a local node.

FIG. 33 is the configuration diagram of a node in a case in which the node according to the seventh embodiment is the local node. The same reference numbers are assigned in FIG. 33 to the same constituent elements as the constituent elements of the node n1 according to the first embodiment illustrated in FIG. 5. Meanwhile, the configuration of the node in a case in which the node of the parallel computer according to the seventh embodiment is the remote node is same as in the first embodiment described above with the illustration of FIG. 5.

As illustrated in FIG. 33, in a network interface device of a node n7 according to the seventh embodiment, a counter 7026 for measuring the timeout value from when a control unit 7021 transmits a congestion information collection packet until receiving a congestion information collection response packet is included.

The configuration and operation of the switch according to the seventh embodiment may be same as the configuration and operation of the switch s1 according to the first embodiment.

Figure 34:
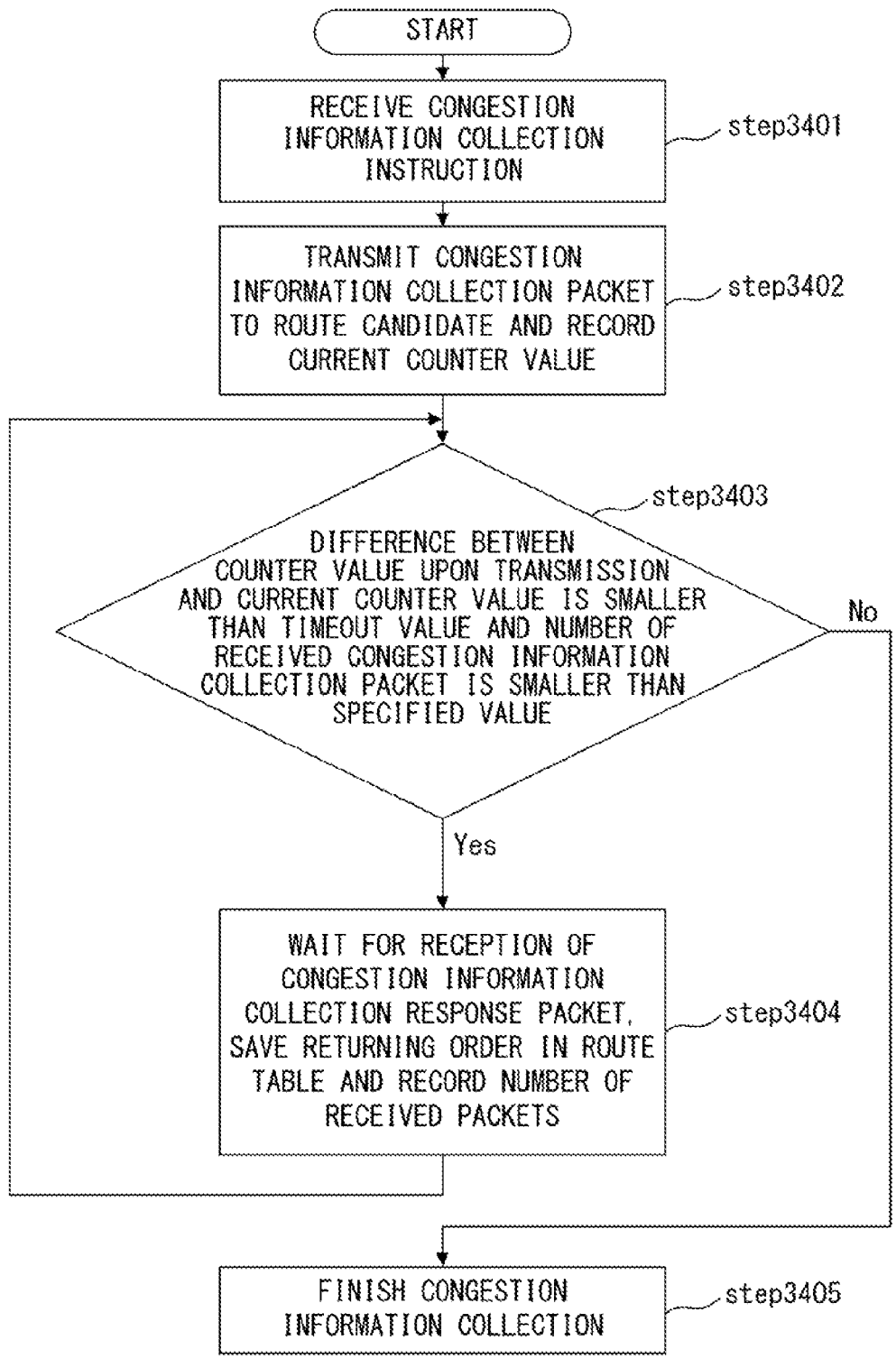
FIG. 34 is a flowchart of processes performed by a control unit of a local node according to the seventh embodiment.

FIG. 34 is a flowchart of processes performed by the control unit of the local node according to the seventh embodiment.

In step 3401, upon receiving a congestion information collection instruction from the arithmetic processing device 101 of the local node, the control unit 7021 starts the process for congestion information. The congestion information collection instruction by the arithmetic processing device 101 includes instructions regarding the remote node, the route candidate, the number of congestion information collection response packets, and the timeout value.

In step 3402, the control unit 7021 generates a congestion information collection packet, and transmits the generated congestion information collection packet to the remote node using the route specified by the congestion information collection instruction. In addition, the control unit 7021 obtains and records the current counter value from the counter 7026 together with the transmission of the congestion information collection packet. Meanwhile, the congestion information collection packet according to the present embodiment may be same as the congestion information collection packet according to the first embodiment.

The network interface device of the remote node that received the congestion information collection packet sends back the congestion information collection response packet to the local node. Processes performed by the network interface device of the remote node according to the present embodiment may be same as the processes performed by the network interface device 102 of the remote node according to the first embodiment. In addition, the congestion information collection response packet according to the present embodiment may be same as the congestion information collection response packet according to the first embodiment.

In step 3403, the control unit 7021 performs determination as to the condition for finishing the congestion information collection.

That is, in step 3403, if the difference between the counter value obtained at the time of transmission and the current counter value of the counter is smaller than the specified timeout value and the number of received congestion information collection response packets is smaller than the specified number of congestion information collection response packets, the process proceeds to step 3404.

In step 3404, the control unit 7021 waits for the reception of the congestion information collection response packet, and if received, the congestion information such as the returning order of the congestion information collection response packet and the route are saved in the route table of the route table storage unit 1022. In addition, together with the saving in the route table, the number of received congestion information collection response packet is updated and recorded.

If the difference between the counter value obtained at the time of transmission and the current counter value of the counter is equal to or larger than the specified timeout value, or the number of received congestion information collection response packets is equal to or larger than the specified value in step 3403, the control unit 7021 finishes the collection for congestion information.

According to the seventh embodiment, the condition for finishing the congestion information collection is set. For this reason, if a failure occurs in the remote node or in a switch on the route and there is a route for which the congestion information collection response packet does not return for example, the network interface device of the local node may finish the collection for congestion information.

In addition, according to the seventh embodiment, the network interface device of the local node selects the route from routes for which the congestion information collection response packets return. For this reason, selection of a route in which a failure has occurred as the route to be used for communication may be avoided.

Then, according to the seventh embodiment, in a case in which the route with the first return by the specification of the returning order is used for example, the number of the congestion information collection response packet regarding the condition for finishing the congestion information collection may be set to 1. For this reason, the time for congestion information collection may be reduced.

In the description of the seventh embodiment above, the description is made with an example of a case in which the network interface device of the local node performs collection of congestion information and route selection, such as the parallel computer according to the first embodiment. However, the seventh embodiment may be realized also in a parallel computer in which the network interface device of the congestion information collection node in a local node group performs collection of congestion information and route selection, such as the parallel computer according to the second and third embodiments.

That is, for example, the counter 7021 of the network interface device 702 of the local node according to the seventh embodiment described above is provided in the network interface device 202 of the congestion information collection node according to the second embodiment. Then, the process flow of the control unit 7021 regarding the counter value in collecting congestion information according to the present embodiment described above is also performed in the process flow of the control unit 2021 of the congestion information collection node according to the congestion information collection node according to the second embodiment.

Regarding the embodiments of the present invention, the following appendix is further disclosed.

(Appendix 1) An information processing apparatus connected to another information processing apparatus included in a parallel computer via a plurality of routes, comprising:

an arithmetic processing device to issue an instruction for collection of congestion information and an instruction for communication;

a route information holding unit to hold route information for performing communication;

a transmission unit to transmit a congestion information collection packet for collecting congestion information to any of the plurality of routes;

a reception unit to receive a congestion information collection response packet corresponding to the congestion information collection packet from any of the plurality of routes; and a control unit to cause the transmission unit to transmit the generated congestion information collection packet when the arithmetic processing device issues an instruction for collecting congestion information, to select route information from the route information holding unit based on congestion information included in the congestion information collection response packet received by the reception unit, and to cause the transmission unit to perform communication instructed by the arithmetic processing device based on the selected route information.

(Appendix 2) The information processing apparatus according to appendix 1, wherein the control unit collects congestion information when the arithmetic processing device issues an instruction to the control unit to start communication.

(Appendix 3) The information processing apparatus according to appendix 1, wherein a route which the arithmetic processing device specifies to the control unit when issuing the instruction to collect congestion information is specified by specification of relay information processing apparatuses between the information processing apparatus and a destination information processing apparatus to which the congestion information collection packet is transmitted, and specification of an order of a dimension in dimension order routing regarding a route between the relay information processing apparatuses and a route between the relay processing apparatus and the destination information processing apparatus.

(Appendix 4) The information processing apparatus according to appendix 1 or 2, wherein the congestion information is a returning order in which the control unit receives the congestion information collection response packet.

(Appendix 5) The information processing apparatus according to appendix 4, wherein a route which the arithmetic processing specifies to the control unit when issuing an instruction for the communication is specified by any rank order of when routes for which the congestion information are collected are listed in the returning order.

Appendix 6) The information processing apparatus according to appendix 5, wherein the control unit selects a route for the communication at a point of time when the control unit receives the congestion collection response packet of the any rank order.

Appendix 7) The information processing apparatus according to any one of appendices 1 through 6, wherein the arithmetic processing device specifies only an outbound route to a destination information processing apparatus through which the congestion information collection packet goes.

Appendix 8) The information processing apparatus according to any one of appendices 1 through 6, wherein the arithmetic processing device specifies an outbound route through which the congestion information collection packet goes to a destination information processing apparatus and a inbound route from the information processing apparatus to receive the congestion information collection response packet.

Appendix 9) The information processing apparatus according to appendix 1 or 2, wherein the congestion information is a response time from when the control unit transmits the congestion information collection packet until when the control unit receives the congestion information collection response packet.

Appendix 10) The information processing apparatus according to appendix 9, wherein a route which the arithmetic processing device specifies to the control unit when issuing an instruction for the communication is specified by any rank order of when routes for which the congestion information are collected are listed by the response time.

Appendix 11) The information processing apparatus according to appendix 1 or 2, wherein the congestion information is a buffer usage amount of a buffer in a switch through which the congestion information collection packet and the congestion information collection response packet go.

Appendix 12) The information processing apparatus according to appendix 11, wherein the congestion information collection packet and the congestion information collection response packet go through a route which is different from other packets in the switch.

Appendix 13) The information processing apparatus according to appendix 11, wherein a buffer usage amount of the buffer in the switch is collected separately for an outbound route to a destination information processing apparatus through which the congestion information collection packet goes and for an inbound route to the information processing apparatus which receives the congestion information collection response packet.

Appendix 14) The information processing apparatus according to appendix 13, wherein a route specified to the control unit when the arithmetic processing device issues an instruction for the communication is specified by any rank order of when routes for which the congestion information has been collected are listed by the buffer usage amount.

Appendix 15) The information processing apparatus according to appendix 13, wherein a route specified to the control unit when the arithmetic processing device issues an instruction for the communication is specified by an order of the buffer usage amount and a type of the communication, and the control unit decides a route based on an order of when the buffer usage amounts regarding the outbound route are listed in a case in which the information processing apparatus sends a message to the destination information processing apparatus, and decides a route based on an order of when the buffer usage amounts regarding the inbound route are listed in a case in which the destination information processing apparatus sends a message to the information processing apparatus.

Appendix 16) The information processing apparatus according to appendix 1, wherein the arithmetic processing device issues an instruction to the control unit to repeat collection of congestion information at a predetermined interval, and the control unit sends the congestion information collection packet repeatedly at the instructed predetermined interval, writes congestion information included in a received congestion information collection response packet into the route information holding unit, and selects a route in communication again after writing the congestion information when the information processing apparatus is in communication.

Appendix 17)The information processing apparatus according to appendix 1, wherein the arithmetic processing device specifies, when starting the instruction for collecting congestion information, a number of congestion information collection response packets received by the control unit and a timeout period from when the congestion information collection packet is transmitted until when the congestion information collection response packet is received; and the control unit finishes collection of congestion information when the specified number of congestion information collection response packets are received or when the timeout period has passed since when collection of congestion information started.

Appendix 18) A parallel computer system in which a plurality of information processing apparatuses are connected, the information processing apparatus comprising:

an arithmetic processing device to issue an instruction for collection of congestion information and an instruction for communication in the parallel computer system;

a route information holding unit to hold route information to perform communication with another information processing apparatus;

a transmission unit to transmit a congestion information collection packet for collecting congestion information to another information processing apparatus;

a reception unit to receive a congestion information collection packet from another information processing apparatus and a congestion information collection response packet, from another information processing apparatus, corresponding to a congestion information collection packet sent from the transmission unit; and a control unit to cause the transmission unit to transmit a congestion information collection packet when the arithmetic processing device issue an instruction for collecting congestion information, to select route information from the route information holding unit based on congestion information included in a congestion information collection response packet received by the reception unit, and to cause the transmission unit to perform communication instructed by the arithmetic processing device based on the selected route information, and generate a corresponding congestion information collection response packet when receiving a congestion information collection packet from another information processing apparatus, and to cause the transmission unit to transmit the generated congestion information collection response packet to another information processing apparatus.

Appendix 19) A control method of a parallel computer system in which a plurality of information processing apparatuses including a first information processing apparatus and a second information processing apparatus are connected via a plurality of routes, comprising:

issuing an instruction for collecting congestion information by an arithmetic processing device which the first information processing apparatus has;

generating a congestion information collection packet for collecting congestion information by a first control unit which the first information processing apparatus has when the arithmetic processing device issues an instruction for collecting congestion information;

transmitting the congestion information collection packet generated by the first control unit to any of the plurality of routes by a first transmission unit which the first information processing apparatus has;

receiving the congestion information collection packet via any of the plurality of routes by a second reception unit which the second information processing apparatus has;

generating a congestion information collection response packet corresponding to the congestion information collection packet by a second control unit which the second information processing apparatus has;

transmitting the congestion information collection response packet generated by the second control unit to any of the plurality of routes by a second transmission unit which the second information processing apparatus has;

receiving the congestion information collection response packet corresponding to the congestion information collection packet from any of the plurality of routes by a first reception unit which the first information processing apparatus has;

overwriting by the first control unit route information held by a route information holding unit which the first information processing apparatus has, based on congestion information included in the congestion information collection response packet received by the reception unit; and causing the first transmission unit to perform communication instructed by the arithmetic processing device, based on the overwritten route information by the first control unit.

Appendix 20) A parallel computer system in which a plurality of information processing apparatuses are connected, the information processing apparatus comprising:

an arithmetic processing device to issue an instruction for collecting congestion information and an instruction for communication;

a transmission unit to transmit a congestion information collection instruction packet for performing a collection instruction for the congestion information, a route selection packet for performing a route instruction upon starting the communication, and a completion notification packet for indicating completion of the communication to another information processing apparatus which collects congestion information and which is set in an information processing group which starts communication and to which the information processing apparatus belong, and when the information processing apparatus is set as an information processing apparatus to collect congestion information, to transmit a congestion information collection packet for collecting congestion information to an information processing apparatus which belongs to an information processing apparatus group which receives communication using any of the plurality of routes, and to transmit a route packet including route information selected based on the route selection packet to an information processing apparatus which has issued an instruction for communication;

a reception unit to receive a route packet corresponding to the route selection packet from another information apparatus which collects congestion information, and when the information processing apparatus is set as an information processing apparatus to collect congestion information, to receive a congestion information collection instruction packet from an instruction processing apparatus which has issued an instruction for collecting congestion information, to receive a congestion information collection response packet corresponding to the congestion information collection packet from an information processing apparatus which belongs to an information processing apparatus group which receives communication, and to receive a route selection packet and a completion notification packet from an information processing apparatus which has issued an instruction for communication; and a control unit to generate a congestion information collection instruction packet based on an instruction for collecting the congestion information from the arithmetic processing device, to cause the transmission unit to transmit the generated congestion information collection instruction packet, to generate a route selection packet based on an instruction for communication from the arithmetic processing device, to cause the transmission unit to transmit the generated route selection packet, to cause the transmission unit to perform communication instructed by the arithmetic processing device based on a route included in a route packet received by the reception unit, and to generate a completion notification packet when the communication is completed, to cause the transmission unit to transmit the generated completion notification packet, and when the information processing unit is set as an information processing unit to collect congestion information, to generate a congestion information collection packet based on a congestion information collection instruction packet received by the reception unit, to cause the transmission unit to transmit the generated congestion information collection packet, to overwrite route information held by the route information holding unit based on congestion information included in a congestion information collection response packet received by the reception unit, to select a route based on a route selection packet received by a reception unit and route information held by the route information holding unit, to transmit a route packet including the selected route to an information processing apparatus which has issued an instruction for communication and cause the route information holding unit to hold information which indicates that the information processing apparatus which has issued an instruction for communication is in communication by the selected route, and to delete the information indicating that the information processing apparatus which has issued an instruction for communication is in communication held by the route information holding unit when the reception unit receives a completion notification packet.

Appendix 21) A control method of parallel computer system in which a plurality of information processing apparatuses are connected via a plurality of routes, comprising:

issuing an instruction for collecting congestion information by an arithmetic processing device which a first information processing apparatus in an information processing apparatus group has, the information processing apparatus group starting communication set for the plurality of information processing apparatuses;

generating a congestion information collection instruction packet for performing a collection instruction of the congestion information by a first control unit which the first information processing apparatus has when the arithmetic processing device issues an instruction for collecting the congestion information;

transmitting the congestion information collection instruction packet to an information processing apparatus which collects congestion information and which is set in the information processing apparatus group which starts the communication, by a first transmission unit which the first information processing apparatus has;

receiving the congestion information collection instruction packet by a second reception unit which the information apparatus collecting the congestion information has;

generating a congestion information collection packet for collecting the congestion information by a second control unit which the information processing apparatus collecting congestion information has;

transmitting the congestion information collection packet generated by the first control unit to a second information processing apparatus in an information processing apparatus group which receives communication and which is set for the plurality of information processing apparatuses using any of the plurality of routes by a second transmission unit which the information processing apparatus collecting congestion information has;

receiving a congestion information collection response packet corresponding to the congestion information collection packet from the second information processing apparatus using any of the plurality of routes by the second reception unit which the information processing apparatus collecting congestion information has;

overwriting by the second control unit route information held by a route information holding unit which the information processing unit collecting congestion information has, based on congestion information included in the congestion information collection response packet received by the second reception unit;

causing the first transmission unit to transmit a route selection packet for selecting a route based on route information held by the route information holding unit by the first control unit when the arithmetic processing device issues an instruction for starting the communication;

receiving the route packet by the second reception unit;

selecting by the second control unit a route based on route information held by the route holding unit, generating a route packet including route information of the selected route, causing the route holding unit to hold information indicating that the selected route is being used for communication of the first information processing apparatus;

transmitting the route packet to the first information processing apparatus by the second transmission unit;

receiving the route packet by the first reception unit which the first information processing apparatus has;

causing the first transmission unit to perform the communication instructed by the arithmetic processing device, based on the route information included in the route packet by the first control unit;

generating the completion notification packet for indicating completion of communication by the first control unit when the communication is completed;

transmitting the notification completion packet to the information processing apparatus collecting congestion information by the first transmission unit;

receiving the completion notification packet by the second reception unit; and deleting by the second control unit the information indicating that the selected route is being used for communication of the first information processing apparatus from the route holding unit based on the completion notification.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus included in a parallel computer system in which a plurality of information processing apparatuses are connected, the information processing apparatus comprising:

an arithmetic processing device that issues an instruction for collection of congestion information and an instruction for communication;

a transmission unit that transmits a congestion information collection instruction packet for performing a collection instruction for the congestion information, a route selection packet for performing a route instruction upon starting the communication, and a completion notification packet for indicating completion of the communication to another information processing apparatus which collects congestion information and which is set in an information processing group which starts communication and to which the information processing apparatus belong, and when the information processing apparatus is set as an information processing apparatus to collect congestion information, transmits a congestion information collection packet for collecting congestion information to an information processing apparatus which belongs to an information processing apparatus group which receives communication using any of the plurality of routes, and transmits a route packet including route information selected based on the route selection packet to an information processing apparatus which has issued an instruction for communication;

a reception unit that receives a route packet corresponding to the route selection packet from another information apparatus which collects congestion information, and when the information processing apparatus is set as an information processing apparatus to collect congestion information, receives a congestion information collection instruction packet from an information processing apparatus which has issued an instruction for collecting congestion information, receives a congestion information collection response packet corresponding to the congestion information collection packet from an information processing apparatus which belongs to an information processing apparatus group which receives communication, and receives a route selection packet and a completion notification packet from an information processing apparatus which has issued an instruction for communication; and a control unit that generates the congestion information collection instruction packet based on the instruction for collecting the congestion information from the arithmetic processing device, causes the transmission unit to transmit the generated congestion information collection instruction packet, generates a route selection packet based on an instruction for communication from the arithmetic processing device, causes the transmission unit to transmit the generated route selection packet, causes the transmission unit to perform communication instructed by the arithmetic processing device based on a route included in a route packet received by the reception unit, and generates a completion notification packet when the communication is completed, causes the transmission unit to transmit the generated completion notification packet, and when the information processing unit is set as an information processing unit to collect congestion information, generates a congestion information collection packet based on a congestion information collection instruction packet received by the reception unit, causes the transmission unit to transmit the generated congestion information collection packet, overwrites route information held by the route information holding unit based on congestion information included in a congestion information collection response packet received by the reception unit, selects a route based on a route selection packet received by a reception unit and route information held by the route information holding unit, transmits a route packet including the selected route to an information processing apparatus which has issued an instruction for communication and causes the route information holding unit to hold information which indicates that the information processing apparatus which has issued an instruction for communication is in communication by the selected route, and deletes the information indicating that the information processing apparatus which has issued an instruction for communication is in communication held by the route information holding unit when the reception unit receives a completion notification packet.

2. The information processing apparatus according to claim 1, wherein the control unit collects congestion information when the arithmetic processing device issues an instruction to the control unit to start communication.

3. The information processing apparatus according to claim 1, wherein the congestion information is a returning order in which the control unit receives the congestion information collection response packet.

4. The information processing apparatus according to claim 1, wherein the arithmetic processing device specifies an outbound route through which the congestion information collection packet goes to a destination information processing apparatus and an inbound route from the information processing apparatus to receive the congestion information collection response packet.

5. The information processing apparatus according to claim 1, wherein the congestion information is a response time from when the control unit transmits the congestion information collection packet until when the control unit receives the congestion information collection response packet.

6. The information processing apparatus according to claim 1, wherein the congestion information is a buffer usage amount of a buffer in a switch through which the congestion information collection packet and the congestion information collection response packet go.

7. The information processing apparatus according to claim 1, wherein
the arithmetic processing device issues an instruction to the control unit to repeat collection of congestion information at a predetermined interval, and
the control unit sends the congestion information collection packet repeatedly at the instructed predetermined interval, writes congestion information included in a received congestion information collection response packet into the route information holding unit, and selects a route in communication again after writing the congestion information when the information processing apparatus is in communication.

8. The information processing apparatus according to claim 1, wherein
the arithmetic processing device specifies, upon starting the instruction for collecting congestion information, a number of congestion information collection response packets received by the control unit and a timeout period from when the congestion information collection packet is transmitted until when the congestion information collection response packet is received; and the control unit finishes collection of congestion information when the specified number of congestion information collection response packets are received or when the timeout period has passed since when collection of congestion information started.

9. A parallel computer system in which a plurality of information processing apparatuses are connected, the information processing apparatus comprising:
an arithmetic processing device that issues an instruction for collection of congestion information and an instruction for communication;
a transmission unit that transmits a congestion information collection instruction packet for performing a collection instruction for the congestion information, a route selection packet for performing a route instruction upon starting the communication, and a completion notification packet for indicating completion of the communication to another information processing apparatus which collects congestion information and which is set in an information processing group which starts communication and to which the information processing apparatus belong, and when the information processing apparatus is set as an information processing apparatus to collect congestion information, transmits a congestion information collection packet for collecting congestion information to an information processing apparatus which belongs to an information processing apparatus group which receives communication using any of the plurality of routes, and transmits a route packet including route information selected based on the route selection packet to an information processing apparatus which has issued an instruction for communication;
a reception unit that receives a route packet corresponding to the route selection packet from another information apparatus which collects congestion information, and when the information processing apparatus is set as an information processing apparatus to collect congestion information, receives a congestion information collection instruction packet from an information processing apparatus which has issued an instruction for collecting congestion information, receives a congestion information collection response packet corresponding to the congestion information collection packet from an information processing apparatus which belongs to an information processing apparatus group which receives communication, and receives a route selection packet and a completion notification packet from an information processing apparatus which has issued an instruction for communication; and
a control unit that generates the congestion information collection instruction packet based on the instruction for collecting the congestion information from the arithmetic processing device, causes the transmission unit to transmit the generated congestion information collection instruction packet, generates a route selection packet based on an instruction for communication from the arithmetic processing device, causes the transmission unit to transmit the generated route selection packet, causes the transmission unit to perform communication instructed by the arithmetic processing device based on a route included in a route packet received by the reception unit, and generates a completion notification packet when the communication is completed, causes the transmission unit to transmit the generated completion notification packet, and when the information processing unit is set as an information processing unit to collect congestion information, generates a congestion information collection packet based on a congestion information collection instruction packet received by the reception unit, causes the transmission unit to transmit the generated congestion information collection packet, overwrites route information held by the route information holding unit based on congestion information included in a congestion information collection response packet received by the reception unit, selects a route based on a route selection packet received by a reception unit and route information held by the route information holding unit, transmits a route packet including the selected route to an information processing apparatus which has issued an instruction for communication and causes the route information holding unit to hold information which indicates that the information processing apparatus which has issued an instruction for communication is in communication by the selected route, and deletes the information indicating that the information processing apparatus which has issued an instruction for communication is in communication held by the route information holding unit when the reception unit receives a completion notification packet.

10. A control method of a parallel computer system in which a plurality of information processing apparatuses are connected via a plurality of routes, the control method comprising:

issuing an instruction for collecting congestion information by an arithmetic processing device which a first information processing apparatus in an information processing apparatus group has, the information processing apparatus group starting communication set for the plurality of information processing apparatuses;

generating a congestion information collection instruction packet for performing a collection instruction of the congestion information by a first control unit which the first information processing apparatus has when the arithmetic processing device issues the instruction for collecting the congestion information;

transmitting the congestion information collection packet to an information processing apparatus which collects congestion information and which is set in the information processing apparatus group which starts the communication, by a first transmission unit which the first information processing apparatus has;

receiving the congestion information collection instruction packet by a second reception unit which the information processing apparatus collecting the congestion information has;

generating a congestion information collection packet for collecting the congestion information by a second control unit which the information processing apparatus collecting congestion information has;

transmitting the congestion information collection packet generated by the first control unit to a second information processing apparatus in an information processing apparatus aroup which receives communication and which is set for the plurality of information processing apparatuses using any of the plurality of routes by a second transmission unit which the information processing apparatus collecting congestion information has;

receiving a congestion information collection response packet corresponding to the congestion information collection packet from the second information processing apparatus using any of the plurality of routes by the second reception unit which the information processing apparatus collecting congestion information has;

overwriting by the second control unit route information held by a route information holding unit which the information processing apparatus collecting the congestion information has, based on the congestion information included in the congestion information collection response packet received by the second reception unit;

causing the first transmission unit to transmit a route selection packet for selecting a route based on route information held by the route information holding unit by the first control unit when the arithmetic processing device issues an instruction for starting the communication;

receiving the route packet by the second reception unit;

selecting by the second control unit a route based on route information held by the route holding unit, generating a route packet including route information of the selected route, causing the route holding unit to hold information indicating that the selected route is being used for communication of the first information processing apparatus;

transmitting the route packet to the first information processing apparatus by the second transmission unit;

receiving the route packet by the first reception unit which the first information processing apparatus has;

causing the first transmission unit to perform the communication instructed by the arithmetic processing device, based on the route information included in the route packet by the first control unit;

generating the completion notification packet for indicating completion of communication by the first control unit when the communication is completed;

transmitting the notification completion packet to the information processing apparatus collecting congestion information by the first transmission unit;

receiving the completion notification packet by the second reception unit; and deleting by the second control unit the information indicating that the selected route is being used for communication of the first information processing apparatus from the route holding unit based on the completion notification.

* * * * *